(12) United States Patent
Deng et al.

(10) Patent No.: US 11,483,359 B2
(45) Date of Patent: Oct. 25, 2022

(54) VOICE CALL METHOD, ELECTRONIC DEVICE, AND SYSTEM

(71) Applicant: Huawei Technologies Co., Ltd., Shenzhen (CN)

(72) Inventors: Yu Deng, Dongguan (CN); Wenguo Zhong, Shanghai (CN); Xingmin Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/284,631

(22) PCT Filed: Oct. 15, 2018

(86) PCT No.: PCT/CN2018/110307
§ 371 (c)(1),
(2) Date: Apr. 12, 2021

(87) PCT Pub. No.: WO2020/077512
PCT Pub. Date: Apr. 23, 2020

(65) Prior Publication Data
US 2021/0400091 A1    Dec. 23, 2021

(51) Int. Cl.
*H04L 65/1069* (2022.01)
*H04L 65/1094* (2022.01)
(Continued)

(52) U.S. Cl.
CPC ...... *H04L 65/1096* (2013.01); *H04L 65/1059* (2013.01); *H04L 65/1069* (2013.01);
(Continued)

(58) Field of Classification Search
CPC ............. H04L 65/1083; H04L 65/1059; H04L 65/1069; H04L 65/1094; H04L 65/1095;
(Continued)

(56) References Cited

U.S. PATENT DOCUMENTS 7,313,228 B1 * 12/2007 Sorice ................. H04M 7/0033
379/215.01
9,131,332 B2    9/2015 Newham et al.
(Continued)

FOREIGN PATENT DOCUMENTS

CN    102131305 A    7/2011
CN    102215369 A    10/2011
(Continued)

OTHER PUBLICATIONS

Zheng, L., "Control Design of Modular Robot Based on Android Platform," Beijing University of Posts and Telecommunications, 2015, Issue 08, 2 pages (with English Abstract).

*Primary Examiner* — Kostas J Katsikis
(74) *Attorney, Agent, or Firm* — Slater Matsil, LLP

(57) ABSTRACT

A voice call method, device and system, the method including establishing, by a first device, a Bluetooth link to a second device, receiving, by the first device, call request information sent by a third device, sending the call request information to a second device through the Bluetooth link, sending, by the first device in response to an answer command from the second device, the answer command to the third device, establishing, by the first device, a call with the third device, sending a downlink audio signal received from the third device to the second device, or sending and uplink audio signal received from the second device to the third device, and converting, by the first device, in response to a sound channel switching command and receiving a downlink audio signal sent by the third device, the downlink audio signal into a sound signal, and playing the sound signal.

18 Claims, 36 Drawing Sheets

(51) Int. Cl.
*H04L 65/1095* (2022.01)
*H04L 65/1096* (2022.01)
*H04M 1/72412* (2021.01)
*H04L 65/1059* (2022.01)
*H04L 67/148* (2022.01)
*H04M 1/00* (2006.01)

(52) U.S. Cl.
CPC ...... *H04L 67/148* (2013.01); *H04M 1/72412* (2021.01); *H04M 1/006* (2013.01); *H04M 2250/02* (2013.01); *H04M 2250/06* (2013.01)

(58) Field of Classification Search
CPC .......... H04L 65/1096; H04M 2250/02; H04M 2250/06
See application file for complete search history.

(56) References Cited

U.S. PATENT DOCUMENTS

| | | | |
|---|---|---|---|
| 9,497,575 | B2 | 11/2016 | Guo |
| 9,509,743 | B1* | 11/2016 | Mulcahy ................ H04W 8/04 |
| 9,622,057 | B1* | 4/2017 | Qu ...................... H04L 65/1096 |
| 10,154,539 | B2 | 12/2018 | Mohan et al. |
| 10,834,252 | B2 | 11/2020 | Pakidko et al. |
| 10,931,828 | B2* | 2/2021 | Rodriguez .......... H04M 1/0289 |
| 2002/0146105 | A1* | 10/2002 | McIntyre ................ H04M 3/54 |
| | | | 379/212.01 |
| 2005/0032509 | A1* | 2/2005 | Benco ................... H04M 3/543 |
| | | | 455/403 |
| 2011/0059768 | A1 | 3/2011 | Pandruvada |
| 2012/0099719 | A1* | 4/2012 | Erb ........................ H04M 3/436 |
| | | | 379/211.01 |
| 2012/0244814 | A1* | 9/2012 | Okayasu ............. H04M 1/6066 |
| | | | 455/41.3 |
| 2018/0084223 | A1 | 3/2018 | Abe |
| 2020/0015308 | A1* | 1/2020 | Takayama ............. H04W 76/14 |

FOREIGN PATENT DOCUMENTS

| | | |
|---|---|---|
| CN | 103391293 A | 11/2013 |
| CN | 103780751 A | 5/2014 |
| CN | 104363557 A | 2/2015 |
| CN | 104604259 A | 5/2015 |
| CN | 105101470 A | 11/2015 |
| CN | 105491513 A | 4/2016 |
| CN | 205377907 U | 7/2016 |
| CN | 107465832 A | 12/2017 |
| CN | 206865562 U | 1/2018 |
| CN | 107666534 A | 2/2018 |
| CN | 108307445 A | 7/2018 |
| EP | 2997669 A1 | 3/2016 |
| WO | 2009125208 A1 | 10/2009 |
| WO | 2014185712 A1 | 11/2014 |
| WO | 2015158266 A1 | 10/2015 |

* cited by examiner

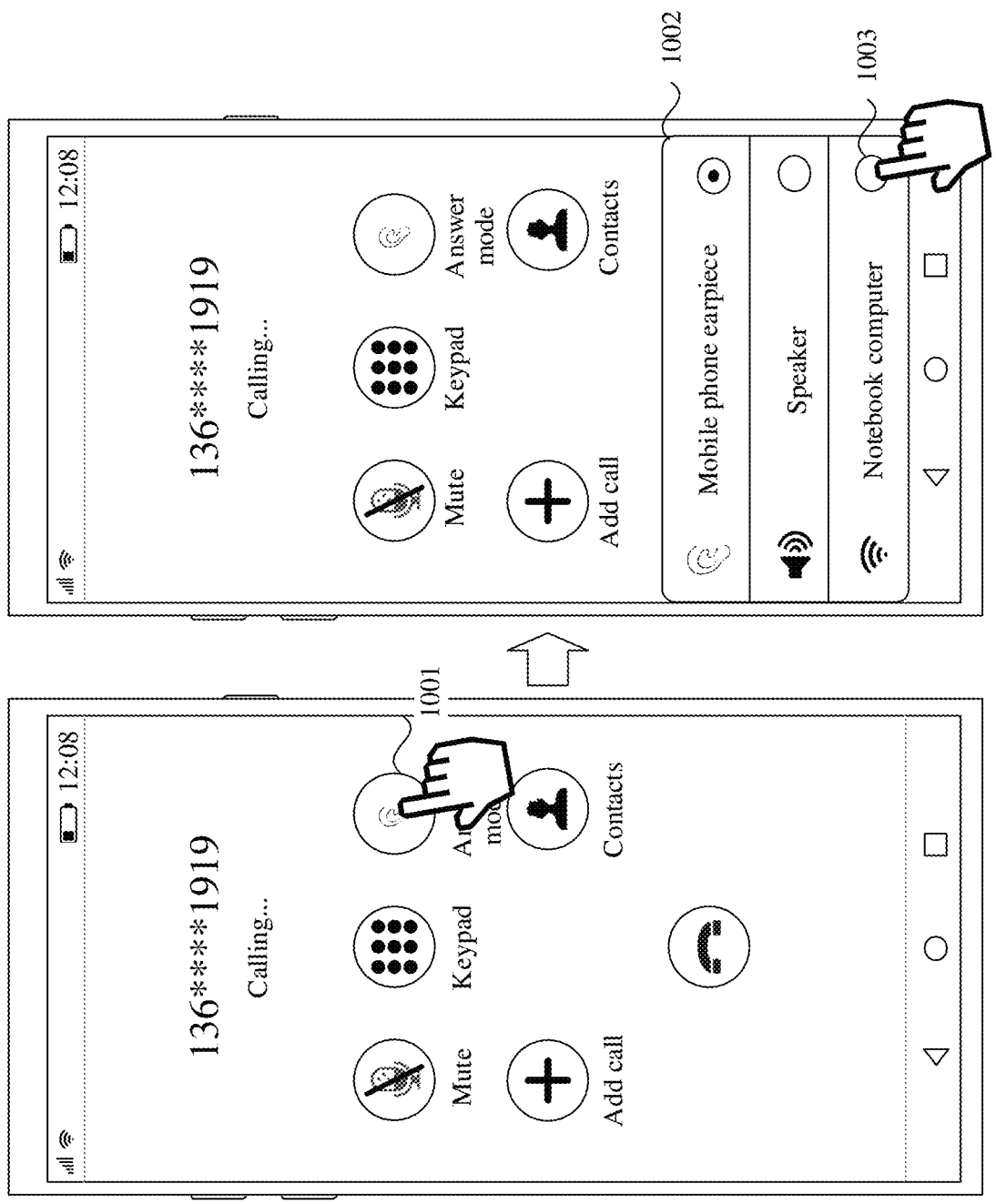

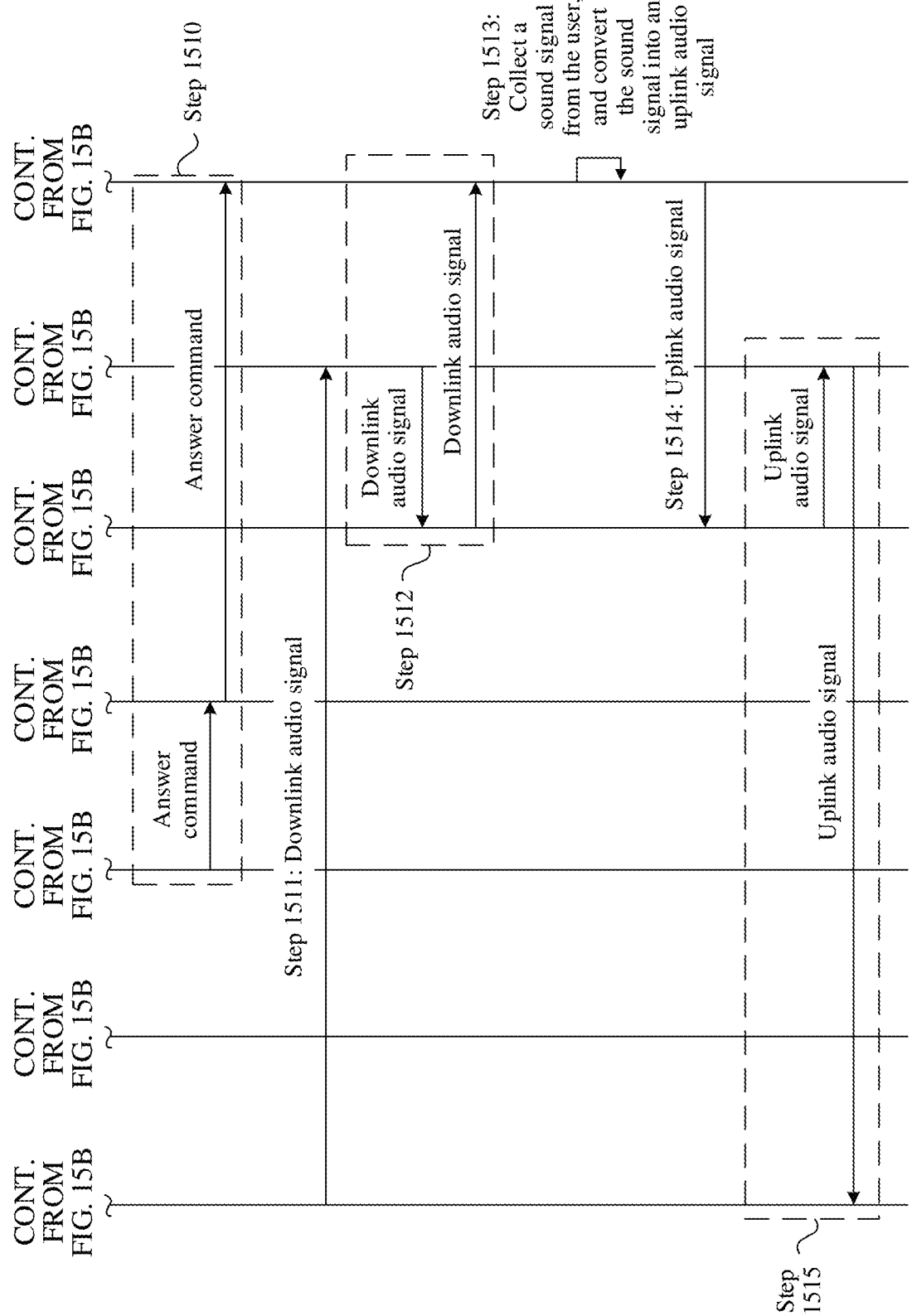

CONT. FROM FIG. 20A

CONT. FROM FIG. 20A

Step 2009: The first electronic device sends the downlink audio signal to the second electronic device through the Wi-Fi link Step 2010: The second electronic device converts the downlink audio signal into a sound signal and plays the sound signal Step 2011: The second electronic device collects a sound signal from the user, and converts the sound signal into an uplink audio signal Step 2012: The first electronic device receives the uplink audio signal sent by the second electronic device through the Wi-Fi link Step 2013: The first electronic device sends the uplink audio signal to the third electronic device

FIG. 20B

VOICE CALL METHOD, ELECTRONIC DEVICE, AND SYSTEM

CROSS REFERENCE TO RELATED APPLICATIONS

This application is a National Stage of International Application No. PCT/CN2018/110307, filed on Oct. 15, 2018, which is hereby incorporated by reference in its entirety.

TECHNICAL FIELD

This application relates to the field of mobile communications, and in particular, to a voice call method, an electronic device, and a system.

BACKGROUND

With progress of science and technology and improvement of people's living standards, mobile phones have become necessary in people's daily life and work. Calling is the most primitive and basic function of a mobile phone, and can meet a basic communication requirement between people. Currently, if it is inconvenient for a user to hold a mobile phone on a call, the user may switch the call from the mobile phone to a peripheral device (such as a headset or a speaker) connected to the mobile phone, that is, use an earpiece and a microphone of the peripheral device for the call, to free both hands.

In the prior art, an audio signal in a call process is usually transmitted between the mobile phone and the peripheral device through a voice link established by using a Bluetooth technology. Specifically, the mobile phone and the peripheral device establish the voice link by using the Bluetooth technology. After receiving a downlink audio signal from a network device, the mobile phone transmits the downlink audio signal to the peripheral device through the established voice link, so that the peripheral device converts the received downlink audio signal into a sound signal and plays the sound signal through the earpiece. When the user speaks, the microphone of the peripheral device may collect a corresponding sound signal. The peripheral device converts the collected sound signal into an uplink audio signal, and transmits the uplink audio signal to the mobile phone through the established voice link, so that the mobile phone forwards the received uplink audio signal to a peer end of the call through the network device, to implement the call.

At least the following problem exists in the prior art. An amount of data of an audio signal that can be transmitted through the voice link established between the mobile phone and the peripheral device by using the Bluetooth technology is limited, and a call requirement in a scenario in which a relatively large amount of data needs to be transmitted cannot be met.

SUMMARY OF THE INVENTION

An objective of this application is to provide a voice call method, an electronic device, and a system, to resolve a problem that an amount of data of an audio signal that can be transmitted through a voice link established between a mobile phone and a peripheral device by using a Bluetooth technology is limited, and a call requirement in a scenario in which a relatively large amount of data needs to be transmitted cannot be met.

The foregoing objective and another objective may be achieved by using features in independent claims. Further implementations are reflected in the dependent claims, the specification, and the accompanying drawings.

The voice call method provided in this application may include a call answer method and a calling method. Details are described below.

According to a first aspect, a call answer method is provided, applied to a first electronic device (for example, a mobile phone). The method may include the first electronic device establishes a Bluetooth link to a second electronic device (for example, a notebook computer) according to a Bluetooth protocol. The first electronic device receives call request information sent by a third electronic device. The first electronic device sends the received call request information to the second electronic device through the Bluetooth link. In addition, the first electronic device may establish a Wi-Fi link to the second electronic device according to a Wi-Fi protocol. The Wi-Fi link may be used to transmit voice in a call process. If the first electronic device receives an answer command sent by the second electronic device through the Bluetooth link, the first electronic device may send the answer command to the third electronic device. In this way, the first electronic device may establish a call with the third electronic device. If the first electronic device receives a downlink audio signal sent by the third electronic device, the first electronic device may send the received downlink audio signal to the second electronic device through the Wi-Fi link. Alternatively, if the first electronic device receives an uplink audio signal sent by the second electronic device through the Wi-Fi link, the first electronic device may send the uplink audio signal to the third electronic device.

In the technical solutions of the first aspect, after a user chooses to answer an incoming call on the second electronic device, the first electronic device may transmit an audio signal in a call process to the second electronic device through the Wi-Fi link established between the first electronic device and the second electronic device. The call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference to the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

In a possible implementation, the method may further include if the call is implemented through the second electronic device, when a user expects to switch a call device, the user may perform a device switching operation on the second electronic device. In this way, the first electronic device may receive a sound channel switching command sent by the second electronic device through the Bluetooth link. In response to the sound channel switching command, the call can be switched from the second electronic device to the first electronic device. To be specific, if the first electronic device receives a downlink audio signal sent by the third electronic device, the first electronic device may convert the downlink audio signal into a sound signal and play the sound signal. Alternatively, the first electronic device may collect a sound signal from the user, convert the sound signal into an uplink audio signal, and send the uplink audio signal to the third electronic device. In this way, in a call process, the user may flexibly select, based on a requirement of the user, a call channel that the user expects to use between the first electronic device and the second electronic device, so that user experience is improved.

In another possible implementation, the method may farther include if the first electronic device receives an incoming call answer operation of the user, the first electronic device may send an answer command to the third electronic device in response to the incoming call answer operation. The first electronic device establishes a call with the third electronic device. The first electronic device may further send the answer command to the second electronic device through the Bluetooth link. In this way, a call status on the first electronic device may be synchronized with a call status on the second electronic device.

In another possible implementation, the method may further include if the call is implemented through the first electronic device, when a user expects to switch a call device, the user may perform a device switching operation on the first electronic device. In this way, the first electronic device may receive the device switching operation of the user. In response to the device switching operation, the call can be switched from the first electronic device to the second electronic device. To be specific, if the first electronic device receives a downlink audio signal sent by the third electronic device, the first electronic device may send the downlink audio signal to the second electronic device through the Wi-Fi link. Alternatively, the first electronic device may receive an uplink audio signal sent by the second electronic device through the Wi-Fi link, and may send the uplink audio signal to the third electronic device. In this way, in a call process, the user may flexibly select, based on a requirement of the user, a call channel that the user expects to use between the first electronic device and the second electronic device, so that user experience is improved.

In another possible implementation, the method may further include the first electronic device may display a first interface in response to the incoming call answer operation, where the first interface includes a device switching button. That the first electronic device receives the device switching operation of the user may specifically include the first electronic device receives a trigger operation performed by the user on the device switching button.

In another possible implementation, the method may further include if the first electronic device receives a reject command sent by the second electronic device through the Bluetooth link, the first electronic device may send the reject command to the third electronic device. In this way, when the user chooses to reject the incoming call on the second electronic device, the second electronic device can send the reject command to the third electronic device through the first electronic device. Control signaling is transmitted through the Bluetooth link, so that signaling transmission reliability is improved.

In another possible implementation, the method may further include if the first electronic device receives an incoming call reject operation of the user, the first electronic device may send a reject command to the third electronic device in response to the incoming call reject operation. The first electronic device may further send the reject command to the second electronic device through the Bluetooth link. In this way, a call status on the first electronic device may be synchronized with a call status on the second electronic device.

According to a second aspect, a call answer method is further provided. The method may be applied to a second electronic device, and the method may include the second electronic device establishes a Bluetooth link to a first electronic device according to a Bluetooth protocol. The second electronic device receives call request information sent by the first electronic device through the Bluetooth link. The second electronic device establishes a Wi-Fi link to the first electronic device according to a Wi-Fi protocol. If the second electronic device receives an incoming call answer operation of a user, the second electronic device may send an answer command to the first electronic device through the Bluetooth link in response to the incoming call answer operation. The second electronic device receives a downlink audio signal sent by the first electronic device through the Wi-Fi link, converts the downlink audio signal into a sound signal, and plays the sound signal. Alternatively, the second electronic device collects a sound signal from the user, converts the sound signal into an uplink audio signal, and sends the uplink audio signal to the first electronic device through the Wi-Fi link.

In the technical solutions of the second aspect, after the user chooses to answer an incoming call on the second electronic device, the first electronic device may transmit an audio signal in a call process to the second electronic device through the Wi-Fi link established between the first electronic device and the second electronic device. The call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference with the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

In a possible implementation, the method may further include if a call is implemented through the second electronic device, when the user expects to switch a call device, the user may perform a device switching operation on the second electronic device. In this way, the second electronic device receives the device switching operation of the user. In response to the device switching operation, the second electronic device sends a sound channel switching command to the first electronic device through the Bluetooth link. In this way, in a call process, the user may flexibly select, based on a requirement of the user, a call channel that the user expects to use between the first electronic device and the second electronic device, so that user experience is improved.

In another possible implementation, the method may further include the second electronic device may display a first interface in response to the incoming call answer operation, where the first interface includes a device switching button. That the second electronic device receives the device switching operation of the user may specifically include the second electronic device receives a trigger operation performed by the user on the device switching button.

In another possible implementation, the method may further include if the second electronic device receives an incoming call reject operation of the user, the second electronic device sends a reject command to the first electronic device through the Bluetooth link in response to the incoming call reject operation. In this way, when the user chooses to reject the incoming call on the second electronic device, the second electronic device can send the reject command to a third electronic device through the first electronic device. Control signaling is transmitted through the Bluetooth link, so that signaling transmission reliability is improved.

According to a third aspect, a calling method is provided. The method may be applied to a first electronic device, and the method may include the first electronic device establishes a Bluetooth link to a second electronic device according to a Bluetooth protocol. The first electronic device receives a dialing command sent by the second electronic device through the Bluetooth link. The first electronic device sends call request information to a third electronic device in response to the dialing command. The first electronic device establishes a Wi-Fi link to the second electronic device according to a Wi-Fi protocol. If the first electronic device receives an answer command sent by the third electronic device, the first electronic device establishes a call with the third electronic device in response to the answer command. If the first electronic device receives a downlink audio signal sent by the third electronic device, the first electronic device may send the downlink audio signal to the second electronic device through the Wi-Fi link. Alternatively, the first electronic device may receive an uplink audio signal sent by the second electronic device through the Wi-Fi link, and send the uplink audio signal to the third electronic device.

In the technical solutions of the third aspect, the first electronic device may transmit an audio signal in a call process to the second electronic device through the Wi-Fi link established between the first electronic device and the second electronic device. The call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference to the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

In a possible implementation, the method may further include the first electronic device sends the answer command to the second electronic device through the Bluetooth link. In this way, a call status on the first electronic device may be synchronized with a call status on the second electronic device.

In another possible implementation, the method may further include if the call is implemented through the second electronic device, when a user expects to switch a call device, the user may perform a device switching operation on the second electronic device. In this way, the first electronic device may receive a sound channel switching command sent by the second electronic device through the Bluetooth link. In response to the sound channel switching command, the call can be switched from the second electronic device to the first electronic device. To be specific, if the first electronic device receives a downlink audio signal sent by the third electronic device, the first electronic device may convert the downlink audio signal into a sound signal and play the sound signal. Alternatively, the first electronic device may collect a sound signal from the user, convert the sound signal into an uplink audio signal, and send the uplink audio signal to the third electronic device. In this way, in a call process, the user may flexibly select, based on a requirement of the user, a call channel that the user expects to use between the first electronic device and the second electronic device, so that user experience is improved.

In another possible implementation, the method may further include if the first electronic device receives a reject command sent by the second electronic device, the first electronic device may send the reject command to the second electronic device through the Bluetooth link in response to the reject command. In this way, a call status on the first electronic device may be synchronized with a call status on the second electronic device.

According to a fourth aspect, a calling method is farther provided. The method may be applied to a second electronic device, and the method may include the second electronic device establishes a Bluetooth link to a first electronic device according to a Bluetooth protocol. The second electronic device receives a dialing operation of a user. In response to the dialing operation, the second electronic device may send a dialing command to the first electronic device through the Bluetooth link. The second electronic device establishes a Wi-Fi link to the first electronic device according to a Wi-Fi protocol. The second electronic device receives a downlink audio signal sent by the first electronic device through the Wi-Fi link, converts the downlink audio signal into a sound signal, and plays the sound signal. Alternatively, the second electronic device may collect a sound signal from the user, convert the sound signal into an uplink audio signal, and send the uplink audio signal to the first electronic device through the Wi-Fi link.

In the technical solutions of the fourth aspect, the first electronic device may transmit an audio signal in a call process to the second electronic device through the Wi-Fi link established between the first electronic device and the second electronic device. A call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference to the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

In a possible implementation, the method may further include if a call is implemented through the second electronic device, when the user expects to switch a call device, the user may perform a device switching operation on the second electronic device. In this way, the second electronic device receives the device switching operation of the user. In response to the device switching operation, the second electronic device sends a sound channel switching command to the first electronic device through the Bluetooth link. In this way, in a call process, the user may flexibly select, based on a requirement of the user, a call channel that the user expects to use between the first electronic device and the second electronic device, so that user experience is improved.

According to a fifth aspect, a call answer method is further provided. The method may be applied to a first electronic device, and the method may include the first electronic device receives call request information sent by a third electronic device. The first electronic device establishes a call with the third electronic device in response to the call request information. The first electronic device receives a first downlink audio signal sent by the third electronic device. The first electronic device converts the first downlink audio signal into a sound signal, and plays the sound signal. Alternatively, the first electronic device collects a sound signal from a user, converts the sound signal into a first uplink audio signal, and sends the first uplink audio signal to the third electronic device. The first electronic device receives a device switching operation of the user. The first electronic device establishes a Wi-Fi link to a second electronic device according to a Wi-Fi protocol in response to the device switching operation. Then, if the first electronic device receives a second downlink audio signal sent by the third electronic device, the first electronic device may send the second downlink audio signal to the second electronic device through the Wi-Fi link. Alternatively, the first electronic device may receive a second uplink audio signal sent by the second electronic device through the Wi-Fi link, and send the second uplink audio signal to the third electronic device.

In the technical solutions of the fifth aspect, the first electronic device may transmit an audio signal in a call process to the second electronic device through the Wi-Fi link established between the first electronic device and the second electronic device. The call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference to the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

According to a sixth aspect, an electronic device is provided. The electronic device may be the foregoing first electronic device, and the electronic device may include a Bluetooth establishment unit, configured to establish a Bluetooth link to a second electronic device according to a Bluetooth protocol, a receiving unit, configured to receive call request information sent by a third electronic device, a sending unit, configured to send the call request information received by the receiving unit to the second electronic device through the Bluetooth link established by the Bluetooth establishment unit, a wireless fidelity (Wi-Fi) establishment unit, configured to establish a Wi-Fi link to the second electronic device according to a Wi-Fi protocol, where the sending unit is further configured to if the receiving unit receives an answer command sent by the second electronic device through the Bluetooth link established by the Bluetooth establishment unit, send the answer command received by the receiving unit to the third electronic device, and a call establishment unit, configured to establish a call with the third electronic device. The receiving unit is further configured to receive a downlink audio signal sent by the third electronic device, and the sending unit is further configured to send the downlink audio signal received by the receiving unit to the second electronic device through the Wi-Fi link established by the Wi-Fi establishment unit. Alternatively, the receiving unit is further configured to receive an uplink audio signal sent by the second electronic device through the Wi-Fi link established by the Wi-Fi establishment unit, and the sending unit is further configured to send the uplink audio signal received by the receiving unit to the third electronic device.

In a possible implementation, the electronic device may further include a conversion and playing unit and a collection and conversion unit. The receiving unit is further configured to receive a sound channel switching command sent by the second electronic device through the Bluetooth link established by the Bluetooth establishment unit. The conversion and playing unit is configured to in response to the sound channel switching command received by the receiving unit, if the receiving unit receives a downlink audio signal sent by the third electronic device, convert the downlink audio signal received by the receiving unit into a sound signal, and play the sound signal. Alternatively, in response to the sound channel switching command received by the receiving unit, the collection and conversion unit is configured to collect a sound signal from a user, and convert the sound signal into an uplink audio signal, and the sending unit is further configured to send the uplink audio signal obtained by the collection and conversion unit to the third electronic device.

In another possible implementation, the electronic device may further include an input unit. The sending unit is further configured to if the input unit receives an incoming call answer operation of the user, send an answer command to the third electronic device in response to the incoming call answer operation received by the input unit. The call establishment unit is configured to establish a call with the third electronic device. The sending unit is further configured to send the answer command to the second electronic device through the Bluetooth link established by the Bluetooth establishment unit.

In another possible implementation, the input unit is further configured to receive a device switching operation of the user. The sending unit is further configured to in response to the device switching operation received by the input unit, if the receiving unit receives a downlink audio signal sent by the third electronic device, send the downlink audio signal received by the receiving unit to the second electronic device through the Wi-Fi link established by the Wi-Fi establishment unit. Alternatively, in response to the device switching operation received by the input unit, the receiving unit is further configured to receive an uplink audio signal sent by the second electronic device through the Wi-Fi link established by the Wi-Fi establishment unit, and the sending unit is further configured to send the uplink audio signal received by the receiving unit to the third electronic device.

In another possible implementation, the electronic device may further include a display unit. The display unit is configured to display a first interface in response to the incoming call answer operation received by the input unit, where the first interface includes a device switching button. The input unit is specifically configured to receive a trigger operation performed by the user on the device switching button included in the first interface displayed by the display unit.

In another possible implementation, the sending unit is further configured to if the receiving unit receives a reject command sent by the second electronic device through the Bluetooth link established by the Bluetooth establishment unit, send the reject command received by the receiving unit to the third electronic device.

In another possible implementation, the sending unit is further configured to if the input unit receives an incoming call reject operation of the user, send a reject command to the third electronic device in response to the incoming call reject operation received by the input unit. The sending unit is further configured to send the reject command to the second electronic device through the Bluetooth link established by the Bluetooth establishment unit.

According to a seventh aspect, an electronic device is further provided. The electronic device may be the foregoing second electronic device, and the electronic device may include a Bluetooth establishment unit, configured to establish a Bluetooth link to a first electronic device according to a Bluetooth protocol, a receiving unit, configured to receive call request information sent by the first electronic device through the Bluetooth link established by the Bluetooth establishment unit, a Wi-Fi establishment unit, configured to establish a Wi-Fi link to the first electronic device according to a Wi-Fi protocol, a sending unit, configured to if an input unit of the electronic device receives an incoming call answer operation of a user, in response to the incoming call answer operation received by the input unit, send an answer command to the first electronic device through the Bluetooth link established by the Bluetooth establishment unit, where the receiving unit is further configured to receive a downlink audio signal sent by the first electronic device through the Wi-Fi link established by the Wi-Fi establishment unit, and a conversion and playing unit, configured to convert the downlink audio signal received by the receiving unit into a sound signal, and play the sound signal, or a collection and conversion unit, configured to collect a sound signal from the user, and convert the sound signal into an uplink audio signal, where the sending unit is further configured to send the uplink audio signal obtained by the collection and conversion unit to the first electronic device through the Wi-Fi link established by the Wi-Fi establishment unit.

In a possible implementation, the input unit is further configured to receive a device switching operation of the user. The sending unit is further configured to in response to the device switching operation received by the input unit, send a sound channel switching command to the first electronic device through the Bluetooth link established by the Bluetooth establishment unit.

In another possible implementation, the electronic device may further include a display unit. The display unit is configured to display a first interface in response to the incoming call answer operation received by the input unit, where the first interface includes a device switching button. The input unit is specifically configured to receive a trigger operation performed by the user on the device switching button included in the first interface displayed by the display unit.

In another possible implementation, the sending unit is further configured to if the input unit receives an incoming call reject operation of the user, in response to the incoming call reject operation received by the input unit, send a reject command to the first electronic device through the Bluetooth link established by the Bluetooth establishment unit.

According to an eighth aspect, an electronic device is further provided. The electronic device may be the foregoing first electronic device, and the electronic device may include a Bluetooth establishment unit, configured to establish a Bluetooth link to a second electronic device according to a Bluetooth protocol, a receiving unit, configured to receive a dialing command sent by the second electronic device through the Bluetooth link established by the Bluetooth establishment unit, a sending unit, configured to send call request information to a third electronic device in response to the dialing command received by the receiving unit, a Wi-Fi establishment unit, configured to establish a Wi-Fi link to the second electronic device according to a Wi-Fi protocol, and a call establishment unit, configured to if the receiving unit receives an answer command sent by the third electronic device, establish a call with the third electronic device in response to the answer command received by the receiving unit. The receiving unit is further configured to receive a downlink audio signal sent by the third electronic device, and the sending unit is further configured to send the downlink audio signal received by the receiving unit to the second electronic device through the Wi-Fi link established by the Wi-Fi establishment unit. Alternatively, the receiving unit is further configured to receive an uplink audio signal sent by the second electronic device through the Wi-Fi link established by the Wi-Fi establishment unit, and the sending unit is further configured to send the uplink audio signal received by the receiving unit to the third electronic device.

In a possible implementation, the sending unit is farther configured to send the answer command to the second electronic device through the Bluetooth link established by the Bluetooth establishment unit.

In another possible implementation, the electronic device may further include a conversion and playing unit and a collection and conversion unit. The receiving unit is further configured to receive a sound channel switching command sent by the second electronic device through the Bluetooth link established by the Bluetooth establishment unit. In response to the sound channel switching command received by the receiving unit, if the receiving unit receives a downlink audio signal sent by the third electronic device, the conversion and playing unit is configured to convert the downlink audio signal received by the receiving unit into a sound signal, and play the sound signal. Alternatively, in response to the sound channel switching command received by the receiving unit, the collection and conversion unit is configured to collect a sound signal from a user, and convert the sound signal into an uplink audio signal, and the sending unit is further configured to send the uplink audio signal obtained by the collection and conversion unit to the third electronic device.

In another possible implementation, if the receiving unit receives a reject command sent by the second electronic device, in response to the reject command received by the receiving unit, the sending unit is further configured to send the reject command to the second electronic device through the Bluetooth link established by the Bluetooth establishment unit.

According to a ninth aspect, an electronic device is further provided. The electronic device may be the foregoing second electronic device, and the electronic device may include a Bluetooth establishment unit, configured to establish a Bluetooth link to a first electronic device according to a Bluetooth protocol, an input unit, configured to receive a dialing operation of a user, a sending unit, configured to in response to the dialing operation received by the input unit, send a dialing command to the first electronic device through the Bluetooth link established by the Bluetooth establishment unit, a Wi-Fi establishment unit, configured to establish a Wi-Fi link to the first electronic device according to a Wi-Fi protocol, a receiving unit, configured to receive a downlink audio signal sent by the first electronic device through the Wi-Fi link established by the Wi-Fi establishment unit, and a conversion and playing unit, configured to convert the downlink audio signal received by the receiving unit into a sound signal, and play the sound signal, or a collection and conversion unit, configured to collect a sound signal from the user, and convert the sound signal into an uplink audio signal. The sending unit is further configured to send the uplink audio signal obtained by the collection and conversion unit to the first electronic device through the Wi-Fi link established by the Wi-Fi establishment unit.

In a possible implementation, the input unit is further configured to receive a device switching operation of the user. The sending unit is further configured to in response to the device switching operation received by the input unit, send a sound channel switching command to the first electronic device through the Bluetooth link established by the Bluetooth establishment unit.

According to a tenth aspect, an electronic device is further provided. The electronic device may be the foregoing first electronic device, and the electronic device may include a receiving unit, configured to receive call request information sent by a third electronic device, a call establishment unit, configured to establish a call with the third electronic device in response to the call request information received by the receiving unit, where the receiving unit is further configured to receive a first downlink audio signal sent by the third electronic device, a conversion and playing unit, configured to convert the first downlink audio signal received by the receiving unit into a sound signal, and play the sound signal, or a collection and conversion unit, configured to collect a sound signal from a user, and convert the sound signal into a first uplink audio signal, a sending unit, configured to send the first uplink audio signal obtained by the collection and conversion unit to the third electronic device, an input unit, configured to receive a device switching operation of the user, and a Wi-Fi establishment unit, configured to establish a Wi-Fi link to a second electronic device according to a Wi-Fi protocol in response to the device switching operation received by the input unit. The receiving unit is further configured to receive a second downlink audio signal sent by the third electronic device, and the sending unit is further configured to send the second downlink audio signal received by the receiving unit to the second electronic device through the Wi-Fi link established by the Wi-Fi establishment unit. Alternatively, the receiving unit is further configured to receive a second uplink audio signal sent by the second electronic device through the Wi-Fi link established by the Wi-Fi establishment unit, and the sending unit is further configured to send the second uplink audio signal received by the receiving unit to the third electronic device.

According to an eleventh aspect, an electronic device is further provided. The electronic device may include a memory, a processor, and a computer program that is stored in the memory and that can be run on the processor. When the processor executes the computer program, the electronic device can implement the call answer method according to any one of the first aspect or the possible implementations of the first aspect, the second aspect or the possible implementations of the second aspect, and the fifth aspect. Alternatively, when the processor executes the computer program, the electronic device can implement the calling method according to any one of the third aspect or the possible implementations of the third aspect.

According to a twelfth aspect, a computer program product including an instruction is provided. When the computer program product is run on an electronic device, the electronic device can perform the call answer method according to any one of the first aspect or the possible implementations of the first aspect, the second aspect or the possible implementations of the second aspect, and the fifth aspect, or the electronic device can perform the calling method according to any one of the third aspect or the possible implementations of the third aspect.

According to a thirteenth aspect, a computer-readable storage medium is provided, including an instruction. When the instruction is run on an electronic device, the electronic device can perform the call answer method according to any one of the first aspect or the possible implementations of the first aspect, the second aspect or the possible implementations of the second aspect, and the fifth aspect, or the electronic device can perform the calling method according to any one of the third aspect or the possible implementations of the third aspect.

According to a fourteenth aspect, a call answer system is provided. The system may include a first electronic device, a second electronic device, and a third electronic device. The first electronic device establishes a Bluetooth link to the second electronic device according to a Bluetooth protocol. The first electronic device receives call request information sent by the third electronic device. The first electronic device sends the call request information to the second electronic device through the Bluetooth link. The first electronic device establishes a Wi-Fi link to the second electronic device according to a Wi-Fi protocol. If the second electronic device receives an incoming call answer operation of a user, the second electronic device sends an answer command to the first electronic device through the Bluetooth link in response to the incoming call answer operation. The first electronic device sends the answer command to the third electronic device. The first electronic device establishes a call with the third electronic device. The first electronic device receives a downlink audio signal sent by the third electronic device and sends the downlink audio signal to the second electronic device through the Wi-Fi link, and the second electronic device converts the downlink audio signal into a sound signal and plays the sound signal. Alternatively, the second electronic device collects a sound signal from the user and converts the sound signal into an uplink audio signal, and the first electronic device receives the uplink audio signal sent by the second electronic device through the Wi-Fi link and sends the uplink audio signal to the third electronic device.

In a possible implementation, the second electronic device receives a device switching operation of the user. The second electronic device sends a sound channel switching command to the first electronic device through the Bluetooth link in response to the device switching operation. In response to the sound channel switching command, if the first electronic device receives a downlink audio signal sent by the third electronic device, the first electronic device converts the downlink audio signal into a sound signal and plays the sound signal. Alternatively, in response to the sound channel switching command, the first electronic device collects a sound signal from the user, converts the sound signal into an uplink audio signal, and sends the uplink audio signal to the third electronic device.

According to a fifteenth aspect, a calling system is provided. The system may include a first electronic device, a second electronic device, and a third electronic device. The first electronic device establishes a Bluetooth link to the second electronic device according to a Bluetooth protocol. The second electronic device receives a dialing operation of a user. The second electronic device sends a dialing command to the first electronic device through the Bluetooth link in response to the dialing operation. The first electronic device sends call request information to the third electronic device in response to the dialing command. The first electronic device establishes a Wi-Fi link to the second electronic device according to a Wi-Fi protocol. If the first electronic device receives an answer command sent by the third electronic device, the first electronic device establishes a call with the third electronic device in response to the answer command. The first electronic device receives a downlink audio signal sent by the third electronic device and sends the downlink audio signal to the second electronic device through the Wi-Fi link, and the second electronic device converts the downlink audio signal into a sound signal and plays the sound signal. Alternatively, the second electronic device collects a sound signal from the user and converts the sound signal into an uplink audio signal, and the first electronic device receives the uplink audio signal sent by the second electronic device through the Wi-Fi link and sends the uplink audio signal to the third electronic device.

It should be understood that descriptions of technical features, technical solutions, beneficial effects, or similar words in the embodiments do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may further be identified in a specific embodiment that does not reflect all the embodiments.

BRIEF DESCRIPTION OF THE DRAWINGS

FIG. 10A and FIG. 10B are a schematic diagram of some graphical user interfaces displayed on a first electronic device according to another embodiment;

FIG. 15A to FIG. 15C are a schematic flowchart of still another calling method according to another embodiment;

FIG. 20A and FIG. 20B are a schematic flowchart of still another calling method according to another embodiment;

DETAILED DESCRIPTION OF ILLUSTRATIVE EMBODIMENTS

It should be understood that although terms such as "first" and "second" may be used in the following embodiments to describe an electronic device, the electronic device should not be limited to these terms. These terms are merely used to distinguish between electronic devices. For example, without departing from the scope of the embodiments, a first electronic device may alternatively be referred to as a second electronic device. Similarly, a second electronic device may alternatively be referred to as a first electronic device.

The embodiments provide a call answer method and a calling method. When a user needs to use a peripheral device to make/answer a call, an electronic device may establish a Wi-Fi link to the peripheral device according to a Wi-Fi protocol to transmit an audio signal. Compared with a voice link established between the electronic device and the peripheral device by using a Bluetooth technology, the Wi-Fi link can be used to transmit an audio signal with a larger amount of data. In this way, call requirements in more scenarios can be met.

Figure 1:
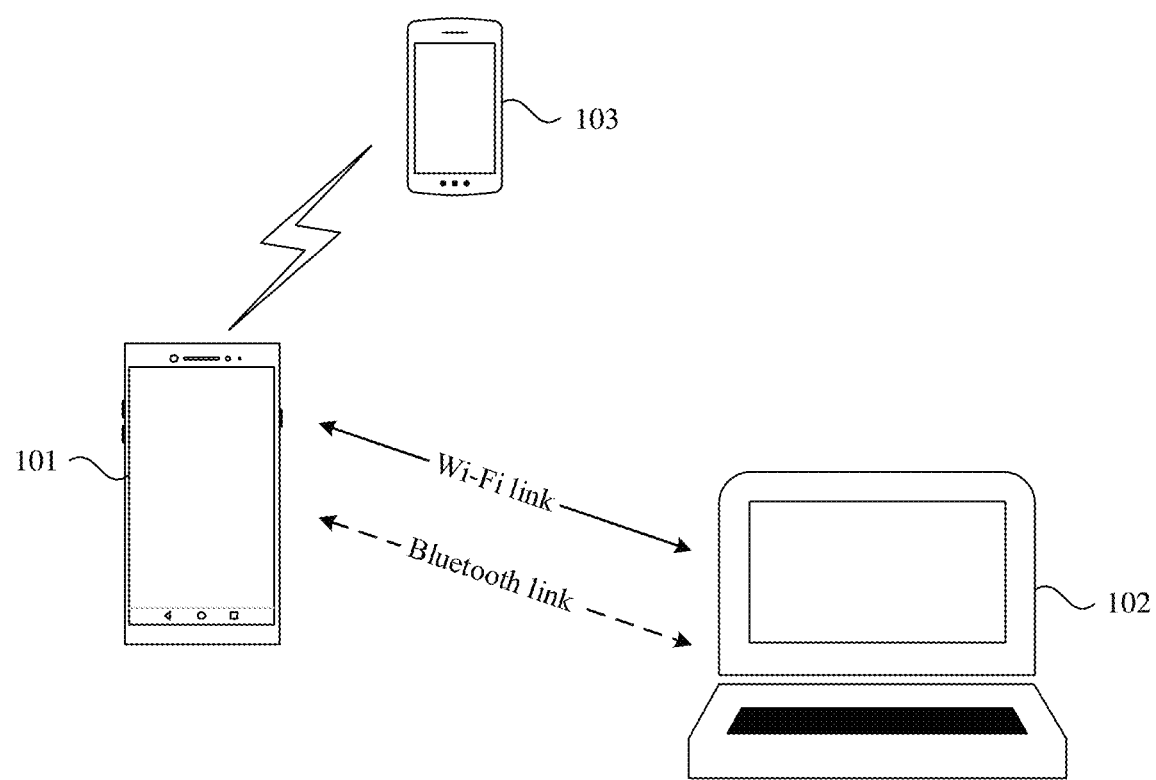
FIG. 1 is a schematic diagram of a system architecture according to an embodiment.

FIG. 1 is a schematic diagram of a system architecture to which the foregoing methods are applicable according to an embodiment. The system architecture may include at least two electronic devices, for example, a first electronic device 101 and a second electronic device 102.

The first electronic device 101 and the second electronic device 102 may establish a Wi-Fi link according to a Wi-Fi protocol. Based on the established Wi-Fi link, the first electronic device 101 and the second electronic device 102 may transmit audio signals in a call process.

For example, referring to FIG. 1, the system architecture may further include a third electronic device 103. The first electronic device 101 may serve as one end of a call to communicate with the third electronic device 103. The second electronic device 102 may serve as a peripheral device of the first electronic device 101. When it is inconvenient for a user to use the first electronic device 101 to make/answer a call to/from the third electronic device 103, the user may switch the call to the second electronic device 102 for implementation.

For example, the first electronic device 101 may receive a downlink audio signal transmitted by the third electronic device 103 through a network device. In some embodiments, if the user chooses to use the second electronic device 102 to make/answer a call, the first electronic device 101 may transmit the received downlink audio signal to the second electronic device 102 through the established Wi-Fi link. The second electronic device 102 may convert the received downlink audio signal into a sound signal, and play the sound signal through an earpiece or a speaker of the second electronic device 102. In addition, when the user speaks, a microphone of the second electronic device 102 may collect a corresponding sound signal, convert the sound signal into an uplink audio signal, and transmit the uplink audio signal to the first electronic device 101 through the established Wi-Fi link. After receiving the uplink audio signal from the second electronic device 102, the first electronic device 101 may transmit the uplink audio signal to the third electronic device 103 through the network device. In some other embodiments, if the user chooses to use the first electronic device 101 to make/answer a call, the first electronic device 101 may convert the received downlink audio signal into a sound signal, and directly play the sound signal through an earpiece or a speaker of the first electronic device 101. In addition, when the user speaks, the first electronic device 101 may collect a sound signal through a microphone of the first electronic device 101, convert the sound signal into a corresponding uplink audio signal, and send the uplink audio signal to the third electronic device 103 through the network device.

In some embodiments, the first electronic device 101 and the second electronic device 102 may farther establish a Bluetooth link according to a Bluetooth protocol. If the user chooses to use the second electronic device 102 to make/answer a call, based on the established Bluetooth link, the first electronic device 101 and the second electronic device 102 may transmit a control command to each other in a call process, for example, a call answer command, a call hang-up command, a call waiting command, or a call channel switching command. Certainly, the first electronic device 101 and the second electronic device 102 may alternatively establish no Bluetooth link, but transmit a control command in a call process based on the Wi-Fi link.

In some embodiments, the first electronic device 101 may be a mobile phone or the like, and the second electronic device 102 may be a mobile phone, a tablet computer, a notebook computer, a desktop computer, a smart headset, a smart sound box, a smartwatch, or the like. In some embodiments, the first electronic device 101 and the second electronic device 102 may be electronic devices of a same type. For example, both the first electronic device 101 and the second electronic device 102 are mobile phones. In some other embodiments, the first electronic device 101 and the second electronic device 102 may be electronic devices of different types. For example, the first electronic device 101 is a mobile phone, and the second electronic device 102 is a notebook computer. A specific structure of the first electronic device 101 may be shown in FIG. 2, and a specific structure of the second electronic device 102 may be shown in FIG. 3. Details are described in the following embodiments. The following describes an electronic device (for example, the first electronic device 101 or the second electronic device 102), a graphical user interface (which may be referred to as a GUI for short below) used for the electronic device, and an embodiment for using the electronic device.

Figure 2:
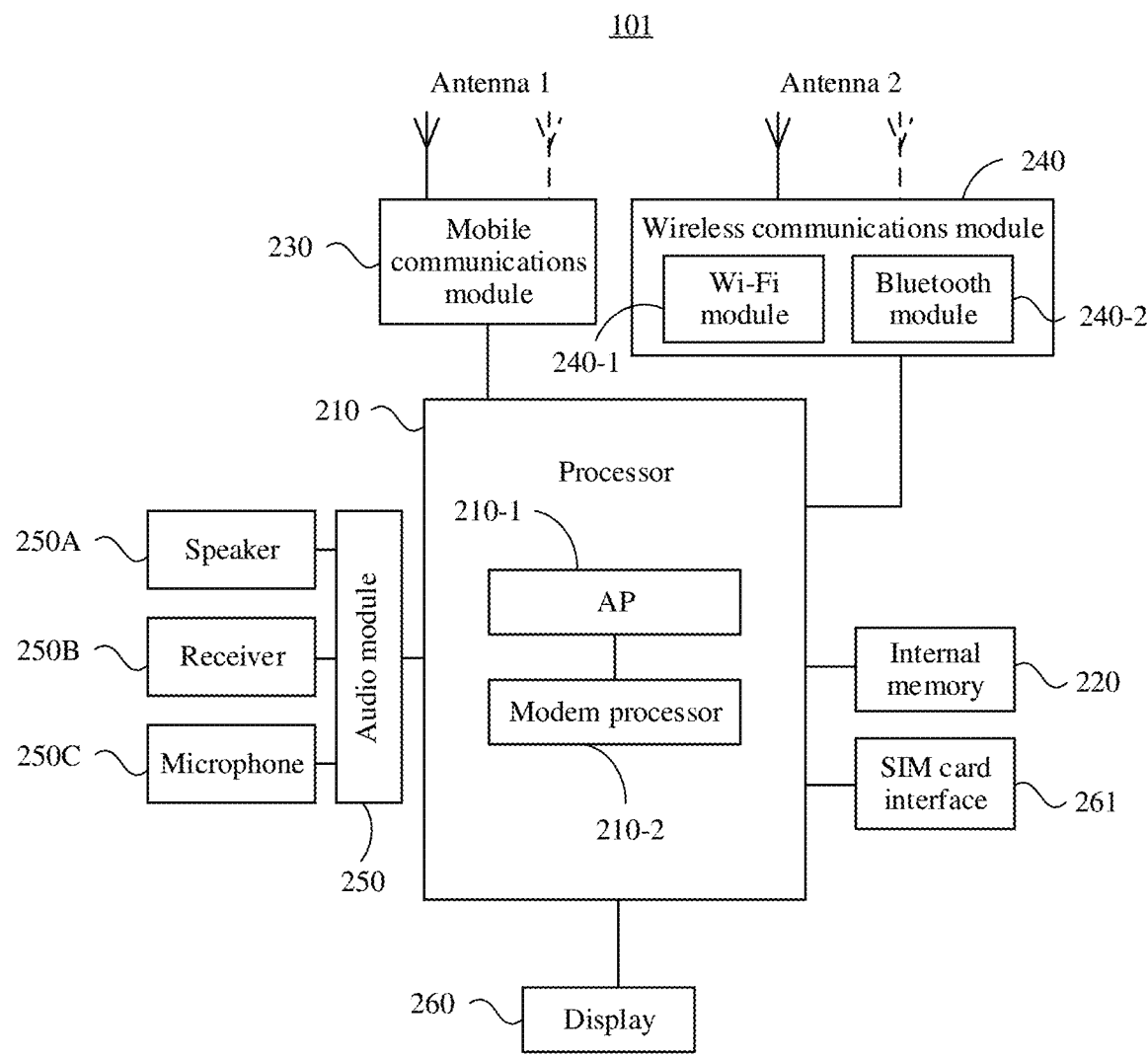
FIG. 2 is a schematic structural diagram of a first electronic device 101 according to an embodiment.

FIG. 2 is a schematic structural diagram of the first electronic device 101. As shown in FIG. 2, the first electronic device 101 may include a processor 210, an internal memory 220, an antenna 1, an antenna 2, a mobile communications module 230, a wireless communications module 240, an audio module 250, a speaker 250A, a receiver 250B, a microphone 250C, a display 260, a subscriber identification module (SIM) card interface 261, and the like.

The processor 210 may include one or more processing units. For example, the processor 210 may include an application processor (AP) 210-1, a modem processor 210-2, a graphics processing unit (GPU), an image signal processor (ISP), a controller, a memory, a video codec, a digital signal processor (DSP), a baseband processor, a neural-network processing unit (NPU), and/or the like. The first electronic device 101 may include one or more processors 210. Different processing units may be independent devices, or may be integrated into one or more processors.

The controller may be a nerve center and a command center of the first electronic device 101. The controller may generate an operation control signal based on instruction operation code and a time sequence signal, to complete control of instruction reading and instruction execution.

The memory may be further disposed in the processor 210, and is configured to store an instruction and data. In some embodiments, the memory in the processor 210 is a cache memory. The memory may store an instruction or data that is just used or cyclically used by the processor 210. If the processor 210 needs to use the instruction or the data again, the processor 210 may directly invoke the instruction or the data from the memory. This avoids repeated access and reduces a waiting time of the processor 210. Therefore, system efficiency is improved.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a universal serial bus (USB) interface, and/or the like.

The I2C interface is a two-way synchronization serial bus, and includes a serial data line (SDA) and a serial clock line (SCL). In some embodiments, the processor 210 may include a plurality of groups of I2C buses. The processor 210 may be coupled to a touch sensor, a charger, a flash light, a camera, and the like through different I2C bus interfaces. For example, the processor 210 may be coupled to the touch sensor through the I2C interface, so that the processor 210 communicates with the touch sensor through the I2C bus interface, to implement a touch function of the first electronic device 101.

The I2S interface may be configured to perform audio communication. In some embodiments, the processor 210 may include a plurality of groups of I2S buses. The processor 210 may be coupled to the audio module 250 through the I2S bus, to implement communication between the processor 210 and the audio module 250. In some embodiments, the audio module 250 may transfer an audio signal to the wireless communications module 240 through the I2S interface, to implement a function of answering a call through a Bluetooth headset.

The PCM interface may also be configured to perform audio communication, and sample, quantize, and code an analog signal. In some embodiments, the audio module 250 may be coupled to the wireless communications module 240 through the PCM bus interface. In some embodiments, the audio module 250 may alternatively transfer an audio signal to the wireless communications module 240 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 210 to the wireless communications module 240. For example, the processor 210 communicates with a Bluetooth module in the wireless communications module 240 through the UART interface, to implement a Bluetooth function. In some embodiments, the audio module 250 may transfer an audio signal to the wireless communications module 240 through the UART interface, to implement a function of playing music through a Bluetooth headset.

The MIPI interface may be configured to connect the processor 210 to a peripheral device, for example, the display 260 or a camera. The MIPI interface includes a camera serial interface (CSI), a display serial interface (DSI), or the like. In some embodiments, the processor 210 communicates with the camera through the CSI interface, to implement a photographing function of the first electronic device 101. The processor 210 communicates with the display 260 through the DSI interface, to implement a display function of the first electronic device 101.

The GPIO interface may be configured by software. The GPIO interface may be configured as a control signal or a data signal. In some embodiments, the GPIO interface may be configured to connect the processor 210 to the camera, the display 260, the wireless communications module 240, the audio module 250, a sensor module, and the like. The GPIO interface may also be configured as the I2C interface, the I2S interface, the UART interface, the MIPI interface, or the like.

The USB interface is an interface that conforms to a USB standard specification, and may be specifically a mini USB interface, a micro USB interface, a USB type-C interface, or the like. The USB interface may be configured to connect to the charger to charge the first electronic device 101, or may be configured to transmit data between the first electronic device 101 and a peripheral device, or may be configured to connect to a headset to play audio through the headset. The interface may be further configured to connect to another electronic device such as an AR device.

It may be understood that an interface connection relationship between the modules illustrated in this embodiment is merely an example for description, and does not constitute a limitation on a structure of the first electronic device 101. In some other embodiments, the first electronic device 101 may alternatively use an interface connection manner different from that in the foregoing embodiment, or use a combination of a plurality of interface connection manners.

The internal memory 220 may be configured to store one or more computer programs, and the one or more computer programs include an instruction. The processor 210 runs the instruction stored in the internal memory 220, so that the first electronic device 101 performs various function applications and data processing. The internal memory 220 may include a program storage area and a data storage area. The program storage area may store an operating system, and may further store one or more applications (such as "photos" and "contacts"). The data storage area may store data (for example, audio data or a phone book) created during use of the first electronic device 101, and the like. In addition, the internal memory 220 may include a high-speed random access memory, and may further include a nonvolatile memory, for example, at least one magnetic disk storage device, a flash memory device, or a universal flash storage (UFS).

A wireless communication function of the first electronic device 101 may be implemented by using the antenna 1, the antenna 2, the mobile communications module 230, the wireless communications module 240, the modem processor 210-2, the baseband processor, and the like.

The antenna 1 and the antenna 2 are configured to transmit and receive an electromagnetic wave signal. Each antenna in the first electronic device 101 may be configured to cover a single communication band or a plurality of communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 230 may provide a wireless communication solution that includes second generation, third generation, fourth generation, fifth generation communication (2G/3G/4G/5G) or the like and that is applied to the first electronic device 101. The mobile communications module 230 may include at least one filter, a switch, a power amplifier, a low noise amplifier (LNA), and the like. The mobile communications module 230 may receive an electromagnetic wave through the antenna 1, perform processing such as filtering or amplification on the received electromagnetic wave, and transmit the electromagnetic wave to the modem processor 210-2 for demodulation. The mobile communications module 230 may further amplify a signal modulated by the modem processor 210-2, and convert the signal into an electromagnetic wave for radiation through the antenna 1. In some embodiments, at least some function modules in the mobile communications module 230 may be disposed in the processor 210. In some embodiments, at least some function modules in the mobile communications module 230 may be disposed in a same device as at least some modules in the processor 210.

The modem processor 210-2 may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator outputs a sound signal through an audio device (not limited to the speaker 250A, the receiver 250B, and the like) based on the low-frequency baseband signal obtained after demodulation, or displays an image or a video through the display 260. In some embodiments, the modem processor 210-2 may be an independent device. In some other embodiments, the modem processor 210-2 may be independent of the processor 210, and is disposed in a same device as the mobile communications module 230 or another function module.

The wireless communications module 240 may provide a wireless communication solution that is applied to the first electronic device 101 and that includes a wireless local area network (WLAN) (such as a Wi-Fi local area network), Bluetooth (BT), a global navigation satellite system (GNSS), frequency modulation (FM), near field communication (NFC), infrared (IR), or the like. The wireless communications module 240 may be one or more devices integrating at least one communications processing module. The wireless communications module 240 receives an electromagnetic wave through the antenna 2, performs frequency modulation and filtering processing on an electromagnetic wave signal, and sends a processed signal to the processor 210. The wireless communications module 240 may further receive a to-be-sent signal from the processor 210, perform frequency modulation and amplification on the signal, and convert the signal into an electromagnetic wave for radiation through the antenna 2. For example, as shown in FIG. 2, the wireless communications module 240 may include a Wi-Fi module 240-1, a Bluetooth module 240-2, and the like. The Wi-Fi module 240-1 is configured to provide the first electronic device 101 with network access that complies with a Wi-Fi-related standard protocol. The first electronic device 101 may access a Wi-Fi access point through the Wi-Fi module 240-1, or the first electronic device 101 may establish, through the Wi-Fi module 240-1, a peer-to-peer (P2P) connection (or referred to as Wi-Fi direct (Wi-Fi Direct)) to another electronic device (for example, the second electronic device 102) that has a Wi-Fi module. The Bluetooth module 240-2 is configured to exchange data between the first electronic device 101 and another short-distance device (for example, the second electronic device 102). The Bluetooth module 240-2 in this embodiment may be an integrated circuit, a Bluetooth chip, or the like.

In some embodiments, the antenna 1 and the mobile communications module 230 in the first electronic device 101 are coupled, and the antenna 2 and the wireless communications module 240 in the first electronic device 101 are coupled, so that the first electronic device 101 can communicate with a network and another device by using a wireless communications technology. The wireless communications technology may include a global system for mobile communications (GSM), a general packet radio service (GPRS), code division multiple access (CDMA), wideband code division multiple access (WCDMA), time division-synchronous code division multiple access (time-division code division multiple access, TD-SCDMA), long term evolution (LTE), the BT, the GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The first electronic device 101 may implement an audio function through the audio module 250, the speaker 250A, the receiver 250B, the microphone 250C, a headset jack, the application processor, and the like, for example, playing music, recording, or playing voice during a call.

The audio module 250 is configured to convert a digital audio signal into an analog audio signal for output, and is also configured to convert analog audio signal input into a digital audio signal. The audio module 250 may be further configured to code and decode audio signals. In some embodiments, the audio module 250 may be disposed in the processor 210, or some function modules in the audio module 250 are disposed in the processor 210.

The speaker 250A, also referred to as a "horn", is configured to convert an audio electrical signal into a sound signal. The first electronic device 101 may be configured to listen to music or answer a hands-free call through the speaker 250A.

The receiver 250B, also referred to as an "earpiece", is configured to convert an audio electrical signal into a sound signal. When the first electronic device 101 is configured to answer a call or receive a voice message, the receiver 250B may be placed close to a human ear to listen to voice.

The microphone 250C, also referred to as a "mike" or a "microphone", is configured to convert a sound signal into an audio electrical signal. When sending a voice message or during a call, a user may place the mouth of the user near the microphone 250C to make a sound, to input a sound signal to the microphone 250C. At least one microphone 250C may be disposed in the first electronic device 101. In some other embodiments, two microphones 250C may be disposed in the first electronic device 101, to collect a sound signal and further implement a noise reduction function. In some other embodiments, three, four, or more microphones 250C may alternatively be disposed in the first electronic device 101, to collect a sound signal, reduce noise, identify a sound source, implement a directional recording function, and the like.

The headset jack is configured to connect to a wired headset. The headset jack may be a USB interface, or may be a 3.5 mm open mobile terminal platform (OMTP) standard interface or cellular telecommunications industry association of the USA (CTIA) standard interface.

The first electronic device 101 implements a display function through the GPU, the display 260, the application processor, and the like. The GPU is a microprocessor for image processing, and is connected to the display 260 and the application processor. The GPU is configured to perform mathematical and geometric calculation, and is configured to render an image. The processor 210 may include one or more GPUs that execute a program instruction to generate or change display information.

The display 260 is configured to display an image, a video, and the like. The display 260 includes a display panel. The display panel may be a liquid crystal display (LCD), an organic light-emitting diode (OLED), an active-matrix organic light emitting diode (AMOLED), a flexible light-emitting diode (flex light-emitting diode, FLED), a mini-LED, a micro-LED, a micro-OLED, a quantum dot light emitting diode (QLED), or the like. In some embodiments, the first electronic device 101 may include one or N displays 260, where N is a positive integer greater than 1.

The SIM card interface 261 is configured to connect to a SIM card. The SIM card may be inserted into the SIM card interface 261 or plugged from the SIM card interface 261, to implement contact with or separation from the first electronic device 101. The first electronic device 101 may support one or N SIM card interfaces, where N is a positive integer greater than 1. The SIM card interface 261 may support a nano-SIM card, a micro-SIM card, a SIM card, and the like. A plurality of cards may be inserted into a same SIM card interface 261 at the same time. The plurality of cards may be of a same type or different types. The SIM card interface 261 may also be compatible with different types of SIM cards. The SIM card interface 261 may also be compatible with an external storage card. The first electronic device 101 interacts with a network through the SIM card, to implement a call function, a data communication function, and the like. In some embodiments, the first electronic device 101 uses an eSIM, namely, an embedded SIM card. The eSIM card may be embedded in the first electronic device 101 and cannot be separated from the first electronic device 101.

It may be understood that a structure shown in this embodiment does not constitute a specific limitation on the first electronic device 101. In some other embodiments, the first electronic device 101 may include more or fewer components than those shown in the figure, or combine some components, or split some components, or have different component arrangements. The components shown in the figure may be implemented by hardware, software, or a combination of software and hardware.

In some embodiments, the first electronic device 101 may further include an indicator, an external memory interface, a USB interface, a charging management module, a power management module, a battery, a sensor module, a button, a motor, a camera, and the like. The sensor module may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

The indicator may be an indicator light, may be configured to indicate a message, a missed call, a notification, and the like, and may be configured to indicate a charging status and a battery level change.

The external memory interface may be configured to connect to an external storage card such as a micro SD card, to extend a storage capability of the first electronic device 101. The external storage card communicates with the processor 210 through the external memory interface, to implement a data storage function. For example, files such as music and a video may be stored in the external storage card.

The charging management module is configured to receive charging input from a charger. The charger may be a wireless charger or a wired charger. In some embodiments of wired charging, the charging management module may receive charging input from the wired charger through the USB interface. In some embodiments of wireless charging, the charging management module may receive wireless charging input via a wireless charging coil of the first electronic device 101. When charging the battery, the charging management module may further supply power to the electronic device through the power management module.

The power management module is configured to connect the battery, the charging management module, and the processor 210. The power management module receives input of the battery and/or the charging management module, and supplies power to the processor 210, the internal memory 220, an external memory, the display 260, the camera, the wireless communications module 240, and the like. The power management module may be further configured to monitor parameters such as a battery capacity, a battery cycle count, and a status of battery health (electric leakage or impedance). In some other embodiments, the power management module may alternatively be disposed in the processor 210. In some other embodiments, the power management module and the charging management module may alternatively be disposed in a same device.

The button includes a power button, a volume button, and the like. The button may be a mechanical button, or may be a touch button. The first electronic device 101 may receive key input, and generate key signal input related to a user setting and function control of the first electronic device 101.

The motor may generate a vibration prompt. The motor may be used for an incoming call vibration prompt, or may be used for a touch vibration feedback. For example, touch operations performed on different applications (for example, a photographing application and an audio playing application) may correspond to different vibration feedback effects. The motor may also correspond to different vibration feedback effects for touch operations performed on different areas of the display 260. Different application scenarios (for example, a time reminder, information receiving, an alarm clock, a game, and the like) may also correspond to different vibration feedback effects. The touch vibration feedback effect may also be customized.

The first electronic device 101 may implement a photographing function through the ISP, the camera, the video codec, the GPU, the display 260, the application processor, and the like.

The ISP is configured to process data fed back by the camera. For example, during photographing, a shutter is opened, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera.

The camera is configured to capture a static image or a video. An object is projected to the photosensitive element through the lens to generate an optical image. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the first electronic device 101 may include one or N cameras, where N is a positive integer greater than 1.

The pressure sensor is configured to sense a pressure signal, and can convert the pressure signal into an electrical signal. In some embodiments, the pressure sensor may be disposed on the display 260. There are many types of pressure sensors such as a resistive pressure sensor, an inductive pressure sensor, a capacitive pressure sensor, and the like. The capacitive pressure sensor may include at least two parallel plates made of conductive materials. Capacitance between electrodes changes when force is applied to the pressure sensor. The first electronic device 101 determines an intensity of pressure based on the change in the capacitance. When a touch operation is performed on the display 260, the first electronic device 101 detects strength of the touch operation through the pressure sensor. The first electronic device 101 may also calculate a touch position based on a detection signal of the pressure sensor. In some embodiments, touch operations that are performed at a same touch location but have different touch operation intensity may correspond to different operation instructions. For example, when a touch operation whose touch operation intensity is less than a first pressure threshold is performed on a "messaging" icon, an instruction for viewing a text message is executed. When a touch operation whose touch operation intensity is greater than or equal to a first pressure threshold is performed on a "messaging" icon, an instruction for creating a new text message is executed.

The gyroscope sensor may be configured to determine a motion posture of the first electronic device 101. In some embodiments, an angular velocity of the first electronic device 101 around three axes (namely, axes x, y, and z) may be determined through the gyroscope sensor. The gyroscope sensor may be used for image stabilization during photographing. For example, when the shutter is opened, the gyroscope sensor detects an angle at which the first electronic device 101 jitters, obtains, through calculation based on the angle, a distance for which a lens module needs to compensate, and allows the lens to cancel the jitter of the first electronic device 101 through reverse motion, to implement image stabilization. The gyroscope sensor may also be used for navigation and a somatic game scenario.

The barometric pressure sensor is configured to measure atmospheric pressure. In some embodiments, the first electronic device 101 calculates an altitude through a barometric pressure value measured by the barometric pressure sensor, to assist positioning and navigation.

The magnetic sensor includes a Hall sensor. The first electronic device 101 may detect opening and closing of a flip leather case through the magnetic sensor. In some embodiments, when the first electronic device 101 is a clamshell phone, the first electronic device 101 may detect opening and closing of a flip cover through the magnetic sensor. Further, a feature such as automatic unlocking of the flip cover is set based on a detected opening/closing state of the leather case or a detected opening/closing state of the flip cover.

The acceleration sensor may detect magnitude of accelerations of the first electronic device 101 in all directions (usually on three axes), and may detect magnitude and a direction of gravity when the first electronic device 101 is static. The acceleration sensor may be further configured to identify a posture of the electronic device, and is applied to an application such as switching between landscape mode and portrait mode or a pedometer.

The range sensor is configured to measure a distance. The first electronic device 101 may measure the distance through infrared or a laser. In some embodiments, in a photographing scenario, the first electronic device 101 may use the range sensor to measure a distance, to implement quick focusing.

For example, the optical proximity sensor may include a light-emitting diode (LED) and an optical detector, for example, a photodiode. The light emitting diode may be an infrared light-emitting diode. The first electronic device 101 emits infrared light through the light-emitting diode. The first electronic device 101 detects infrared reflected light from a nearby object through the photodiode. When detecting sufficient reflected light, the first electronic device 101 may determine that there is an object near the first electronic device 101. When detecting insufficient reflected light, the first electronic device 101 may determine that there is no object near the first electronic device 101. The first electronic device 101 may detect, through the optical proximity sensor, that the user holds the first electronic device 101 close to an ear during a call, so that the first electronic device 101 automatically turns off a screen for power saving. The optical proximity sensor may also be used in a smart cover mode or a pocket mode to automatically unlock or lock the screen.

The ambient light sensor is configured to sense ambient light luminance. The first electronic device 101 may adaptively adjust luminance of the display 260 based on the sensed ambient light luminance. The ambient light sensor may also be configured to automatically adjust a white balance during photographing. The ambient light sensor may also cooperate with the optical proximity sensor to detect whether the first electronic device 101 is in a pocket, to prevent a false touch.

The fingerprint sensor is configured to collect a fingerprint. The first electronic device 101 may use a feature of the collected fingerprint to implement fingerprint-based unlocking, application lock accessing, fingerprint-based photographing, fingerprint-based call answering, and the like.

The temperature sensor is configured to detect a temperature. In some embodiments, the first electronic device 101 executes a temperature processing policy based on the temperature detected by the temperature sensor. For example, when the temperature reported by the temperature sensor exceeds a threshold, the first electronic device 101 lowers performance of a processor located near the temperature sensor, to reduce power consumption to implement thermal protection. In some other embodiments, when the temperature is less than another threshold, the first electronic device 101 heats the battery, to avoid a case in which the first electronic device 101 is shut down abnormally due to a low temperature. In some other embodiments, when the temperature is less than still another threshold, the first electronic device 101 boosts an output voltage of the battery, to avoid an abnormal shutdown caused by a low temperature.

The touch sensor may also be referred to as a touch panel or a touch-sensitive surface. The touch sensor may be disposed on the display 260. The touch sensor and the display 260 form a touchscreen that is also referred to as a "touchscreen". The touch sensor is configured to detect a touch operation performed on or near the touch sensor. The touch sensor may transfer a detected touch operation to the application processor, to determine a type of a touch event. Visual output related to the touch operation may be provided through the display 260. In some other embodiments, the touch sensor may also be disposed on a surface of the first electronic device 101 at a location different from that of the display 260.

The bone conduction sensor may obtain a vibration signal. In some embodiments, the bone conduction sensor may obtain a vibration signal of a vibration bone of a human vocal-cord part. The bone conduction sensor may also contact a body pulse to receive a blood pressure beating signal. In some embodiments, the bone conduction sensor may also be disposed in the headset, to obtain a bone conduction headset. The audio module 250 may obtain, based on the vibration signal that is of the vibration bone of the vocal-cord part and that is obtained by the bone conduction sensor, a voice signal through parsing, to implement a voice function. The application processor may parse heart rate information based on the blood pressure beating signal obtained by the bone conduction sensor, to implement a heart rate detection function.

Figure 3:
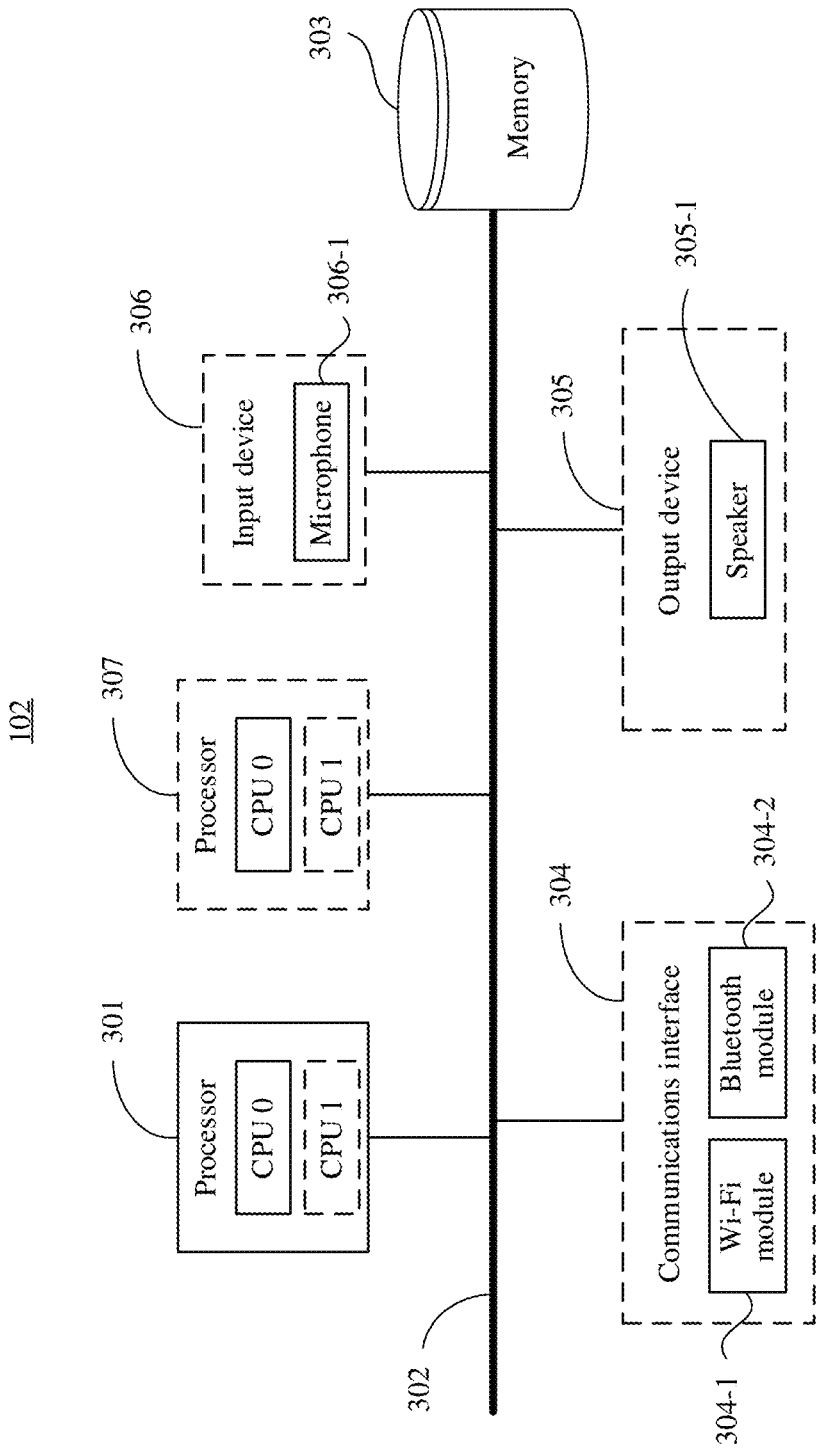
FIG. 3 is a schematic structural diagram of a second electronic device 102 according to an embodiment.

Referring to FIG. 3, in this embodiment, an example in which the second electronic device 102 is a notebook computer is used to describe the second electronic device 102 provided in the embodiments. As shown in FIG. 3, the second electronic device 102 may include at least one processor 301, a communications bus 302, a memory 303, a communications interface 304, an input device 305, and an output device 306.

It may be understood that a structure shown in this embodiment does not constitute a specific limitation on the second electronic device 102. In some other embodiments, the second electronic device 102 may include more or fewer components than those shown in the figure, or combine some components, or split some components, or have different component arrangements. The components shown in the figure may be implemented by hardware, software, or a combination of software and hardware.

The processor 301 may be a general-purpose central processing unit (CPU), a microprocessor, an application-specific integrated circuit (ASIC), or one or more integrated circuits configured to control program execution in the solutions of the embodiments.

In specific implementation, in an embodiment, the processor 301 may include one or more CPUs, for example, a CPU 0 and a CPU 1 in FIG. 3. Each CPU may support a plurality of virtual CPUs, and the virtual CPU is also referred to as a VCPU.

In specific implementation, in an embodiment, the second electronic device 102 may include a plurality of processors, for example, the processor 301 and a processor 307 shown in FIG. 3. Each of the processors may be a single-core (single-CPU) processor or may be a multi-core (multi-CPU) processor. The processor herein may refer to one or more devices, circuits, and/or processing cores configured to process data (for example, a computer program instruction).

The communications bus 302 may include a path, used to transmit information between the foregoing components.

The memory 303 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory 303 may exist independently and is connected to the processor 301 via the communications bus 302. Alternatively, the memory 303 may be integrated with the processor 301.

The memory 303 may be configured to store one or more computer programs, and the one or more computer programs include an instruction. The processor 301 runs the instruction stored in the memory 303, so that the second electronic device 102 performs various function applications and data processing.

The communications interface 304 may provide a wireless communication solution such as a WLAN (for example, a Wi-Fi local area network) or Bluetooth, so that the second electronic device 102 can communicate with another device or a communications network. For example, as shown in FIG. 3, the communications interface 304 may include a Wi-Fi module 304-1, a Bluetooth module 304-2, and the like. The Wi-Fi module 304-1 is configured to provide the second electronic device 102 with network access that complies with a Wi-Fi-related standard protocol. The second electronic device 102 may access a Wi-Fi access point through the Wi-Fi module 304-1, or the second electronic device 102 may establish, through the Wi-Fi module 304-1, a P2P connection (or referred to as Wi-Fi direct) to another electronic device (for example, the first electronic device 101) that has a Wi-Fi module. The Bluetooth module 304-2 is configured to exchange data between the second electronic device 102 and another short-distance device (for example, the first electronic device 101). The Bluetooth module 304-2 in this embodiment may be an integrated circuit, a Bluetooth chip, or the like.

The output device 305 communicates with the processor 301, and may play a sound signal in a plurality of manners. For example, the output device 305 may be a speaker 305-1 or the like. The speaker 305-1, also referred to as a "horn", is configured to convert an audio electrical signal into a sound signal. The second electronic device 102 may be configured to listen to music or answer a hands-free call through the speaker 305-1. The output device 305 may also display information in a plurality of manners. For example, the output device 305 may be an LCD, a light emitting diode (LED) display device, or the like.

The input device 306 communicates with the processor 301, and may receive input of a user in a plurality of manners. For example, the input device 306 may be a microphone 306-1, a mouse, a keyboard, or a sensing device. The microphone 306-1, also referred to as a "mike" or a "microphone", is configured to convert a sound signal into an audio signal. During a call, the user may place the mouth of the user near the microphone 306-1 to make a sound, to input a sound signal to the microphone 306-1.

For example, with reference to the first electronic device 101 shown in FIG. 2, the second electronic device 102 shown in FIG. 3, and an application scenario, the following describes in detail the call answer method and the calling method in the embodiments by using an example in which the first electronic device 101 is a mobile phone and the second electronic device 102 is a notebook computer.

Referring to FIG. 4a and FIG. 4b to FIG. 8, the call answer method provided in the embodiments is described by using an example in which the first electronic device 101 (for example, a mobile phone 1) is used as a called device and a mobile phone 2 is used as a calling device. The method may include the following steps.

Step 401: The mobile phone 1 establishes a Bluetooth link to a notebook computer according to a Bluetooth protocol.

For example, when a user expects to use the notebook computer as a peripheral device of the mobile phone 1 to answer a call, the user may enable Bluetooth functions of the mobile phone 1 and the notebook computer. After both the Bluetooth function of the mobile phone 1 and the Bluetooth function of the notebook computer are enabled, a Bluetooth module 240-2 of the mobile phone 1 and a Bluetooth module 304-2 of the notebook computer may establish the Bluetooth link according to the Bluetooth protocol.

Step 402: The mobile phone 1 receives call request information sent by the mobile phone 2.

For example, when a user of the mobile phone 2 expects to make a call to the user of the mobile phone 1, the user of the mobile phone 2 may perform dialing on the mobile phone 2. In response to the dialing, the mobile phone 2 may send the call request information to the mobile phone 1. For example, the mobile phone 2 sends the call request information to the mobile phone 1 through a network device. A mobile communications module 230 of the mobile phone 1 may receive the call request information sent by the mobile phone 2.

In some embodiments, the mobile phone 1 may provide an incoming call reminder in response to the call request information. For example, after receiving the call request information, the mobile communications module 230 of the mobile phone 1 may transmit the call request information to a processor 210 of the mobile phone 1. After the processor 210 of the mobile phone 1 receives the call request information, in response to the call request information, the processor 210 of the mobile phone 1 may provide the incoming call reminder through a display 260, an indicator, or the like of the mobile phone 1. For example, the processor 210 of the mobile phone 1 may send indication information to the display 260 of the mobile phone 1, so that the display 260 displays an incoming call reminder interface according to the indication information. For example, the incoming call reminder interface is an interface 41 shown in FIG. 4c. The incoming call reminder interface 41 may include an "accept" button 42 and a "decline" button 43. In some embodiments, the incoming call reminder interface 41 may further include a peripheral device switching button 44 used to switch a call to a peripheral device such as the notebook computer. When the user expects to use the peripheral device such as the notebook computer to answer the call, the user may perform a trigger operation on the peripheral device switching button 44. In response to the trigger operation, the mobile phone 1 may automatically enable Bluetooth, then perform the foregoing step 401 (in other words, step 401 may be performed after step 402), the following step 403, and the following step 404, automatically enable a Wi-Fi function, and perform the following step 405. The processor 210 of the mobile phone 1 may further control the indicator of the mobile phone 1 to blink, control a motor of the mobile phone 1 to generate vibration, control a speaker of the mobile phone 1 to play an incoming call ringtone, and the like.

Step 403: The mobile phone 1 transmits the call request information to the notebook computer through the Bluetooth link.

The processor 210 of the mobile phone 1 may further transmit the call request information to the Bluetooth module 240-2 of the mobile phone 1. For example, when the processor 210 of the mobile phone 1 determines that the mobile phone 1 is connected to a peripheral device such as the notebook computer, the processor 210 of the mobile phone 1 may transmit the call request information received in step 402 to the Bluetooth module 240-2 of the mobile phone 1. Then, the Bluetooth module 240-2 transmits the call request information to the peripheral device, namely, the notebook computer, of the mobile phone 1 through the Bluetooth link.

Step 404: The notebook computer provides an incoming call reminder in response to the call request information.

In some embodiments, after the mobile phone 1 transmits the call request information to the notebook computer through the Bluetooth link, the Bluetooth module 304-2 of the notebook computer may receive the call request information. The Bluetooth module 304-2 of the notebook computer may transmit the call request information to a processor 301 of the notebook computer. In response to the received call request information, the processor 301 of the notebook computer may provide the incoming call reminder through an output device 305 of the notebook computer. For example, the processor 301 of the notebook computer may send indication information to a display device (for example, a display) of the notebook computer, so that the display device displays an incoming call reminder interface according to the indication information. The processor 301 of the notebook computer may also control a speaker 305-1 of the notebook computer to play an incoming call ringtone, and the like.

Step 405: The mobile phone 1 establishes a Wi-Fi link to the notebook computer according to a Wi-Fi protocol.

The Wi-Fi link may be used to transmit an audio signal in a call process. For example, in some embodiments, when the user expects to use the notebook computer as a peripheral device of the mobile phone 1 to answer the call, the user may enable Wi-Fi functions of the mobile phone 1 and the notebook computer. In some other embodiments, the Wi-Fi functions of the mobile phone 1 and the notebook computer may alternatively be automatically enabled when a specific condition is met, instead of being manually enabled by the user. For example, the mobile phone 1 and the notebook computer each may automatically enable the Wi-Fi function when receiving the call request information.

When both the Wi-Fi function of the mobile phone 1 and the Wi-Fi function of the notebook computer are enabled, the mobile phone 1 may establish the Wi-Fi link to the notebook computer according to the Wi-Fi protocol. For example, in some embodiments, that the Wi-Fi module 240-1 of the mobile phone 1 and the Wi-Fi module 304-1 of the notebook computer establish the Wi-Fi link according to the Wi-Fi protocol may specifically include the mobile phone 1 and the notebook computer may access a same Wi-Fi hotspot, that is, a same Wi-Fi local area network, by using respective Wi-Fi modules. The mobile phone 1 and the notebook computer can transmit audio signals through the Wi-Fi local area network. In some other embodiments, that the Wi-Fi module 240-1 of the mobile phone 1 and the Wi-Fi module 304-1 of the notebook computer establish the Wi-Fi link according to the Wi-Fi protocol may specifically include the mobile phone 1 may establish a P2P connection to the Wi-Fi module 304-1 of the notebook computer by using the Wi-Fi module 240-1. The mobile phone 1 and the notebook computer can transmit audio signals through the P2P connection. The mobile phone 1 may alternatively negotiate a voice path with the notebook computer, to determine whether to use a Wi-Fi local area network or a P2P connection to transmit an audio signal.

After the mobile phone 1 and the notebook computer provide the incoming call reminders, the user may choose to answer or reject an incoming call on the mobile phone 1, or the user may choose to answer or reject an incoming call on the notebook computer.

Figure 4A:
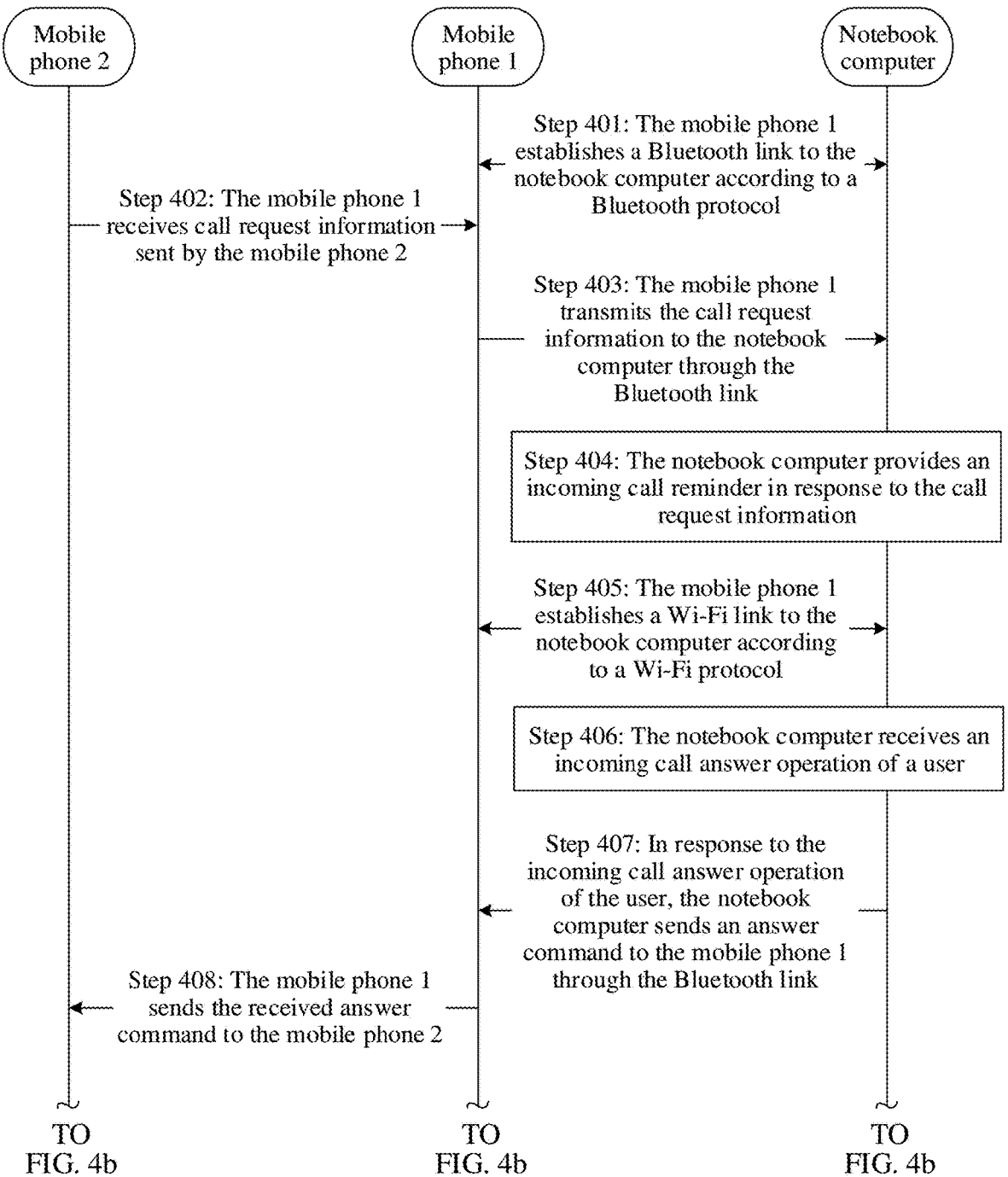
FIG. 4a and FIG. 4b are a schematic flowchart of a call answer method according to an embodiment.
Figure 4B:
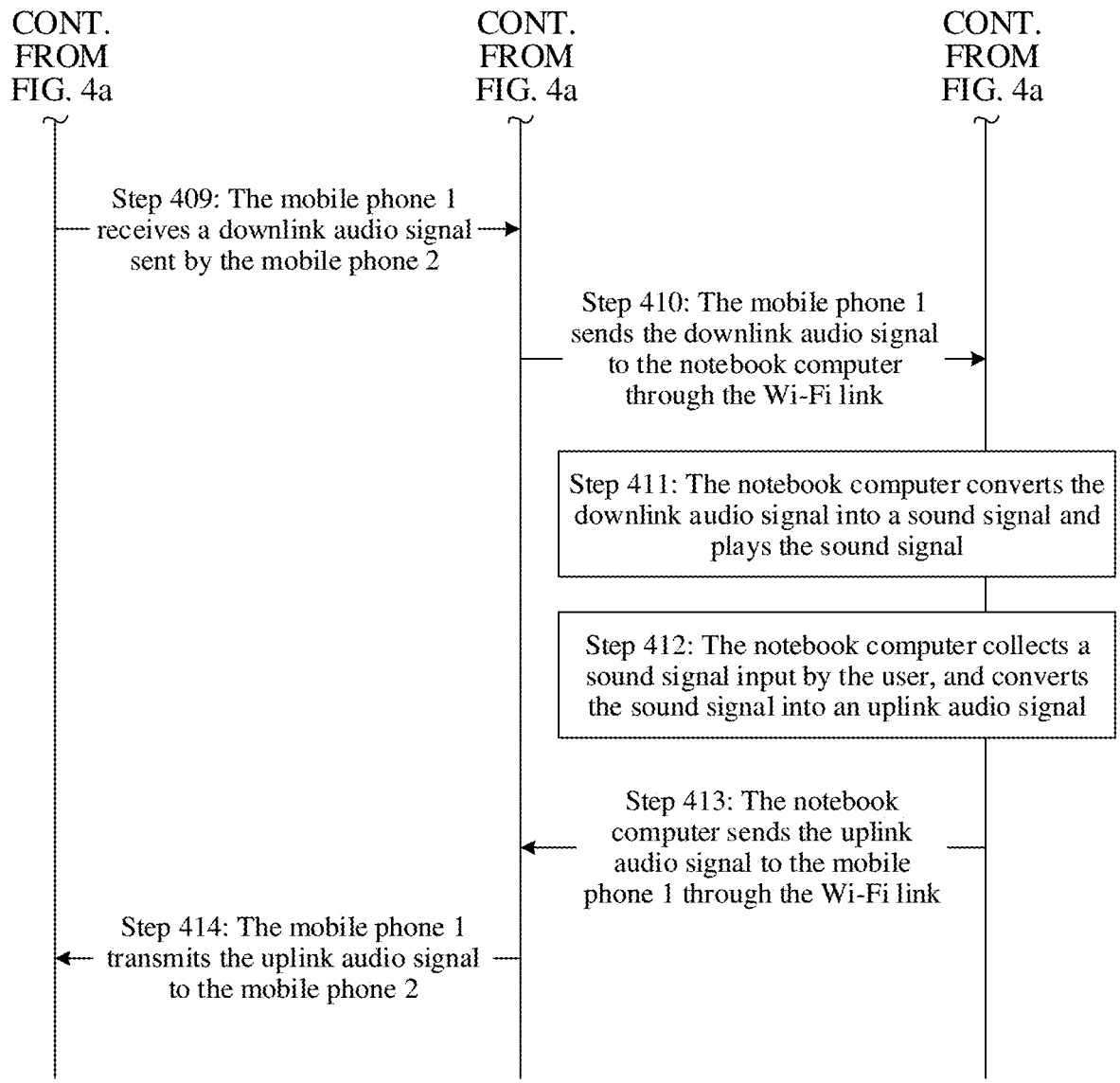
Figure 4C:
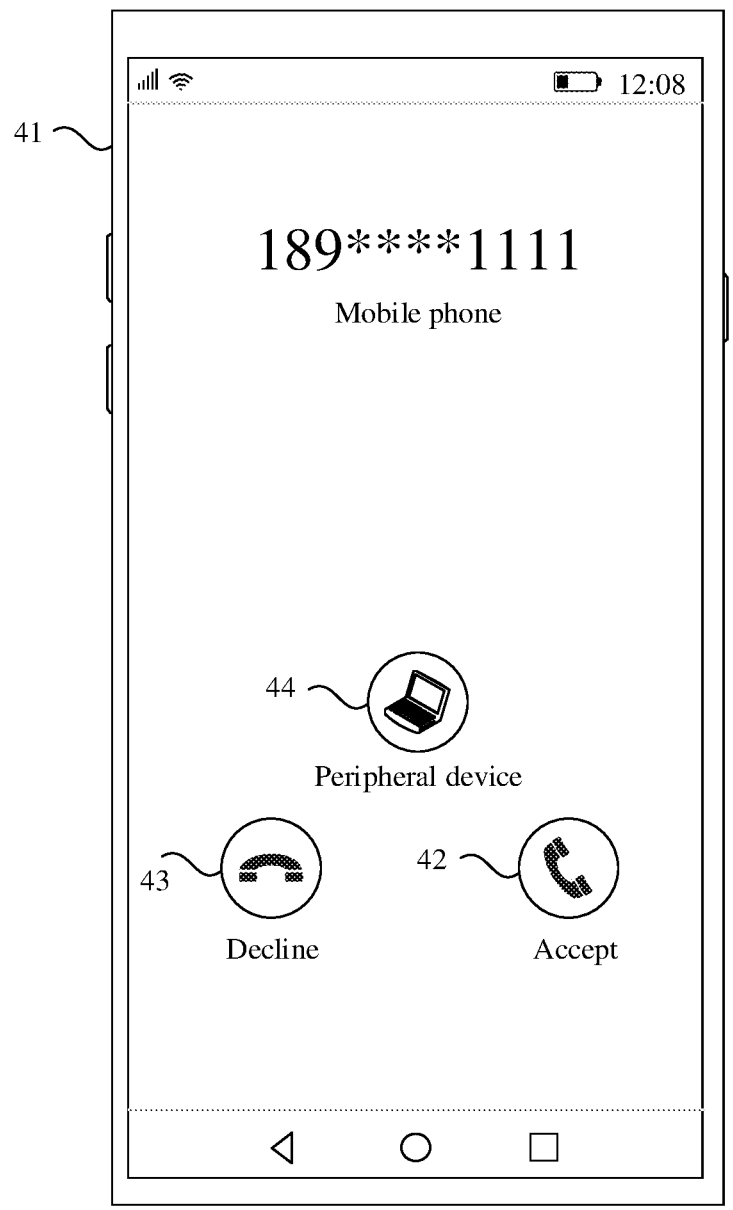
FIG. 4C is a schematic diagram of some graphical user interfaces displayed on a first electronic device according to an embodiment.

In some embodiments, if the user chooses to answer the incoming call on the notebook computer, as shown in FIG. 4*a* and FIG. 4*b*, the call answer method may further include the following steps.

Step 406: The notebook computer receives an incoming call answer operation of the user.

For example, the incoming call answer operation may be a trigger operation performed by the user on an "accept" button included in the incoming call reminder interface displayed on the display device of the notebook computer. Alternatively, the incoming call answer operation may be a trigger operation performed by the user on a predetermined physical button on the notebook computer, and the predetermined physical button is used to answer the incoming call.

Step 407: In response to the incoming call answer operation of the user, the notebook computer sends an answer command to the mobile phone 1 through the Bluetooth link.

For example, in response to the foregoing operation, the processor 301 of the notebook computer may generate the answer command and transmit the answer command to the Bluetooth module 304-2 of the notebook computer. The Bluetooth module 304-2 of the notebook computer sends the answer command to the mobile phone 1 through the Bluetooth link.

In some embodiments, in response to the incoming call answer operation of the user, the notebook computer may display a call interface through the display device.

Step 408: The mobile phone 1 sends the received answer command to the mobile phone 2.

For example, after the Bluetooth module 304-2 of the notebook computer sends the answer command to the mobile phone 1 through the Bluetooth link, the Bluetooth module 240-2 of the mobile phone 1 may receive the answer command. The Bluetooth module 240-2 of the mobile phone 1 may transmit the answer command to the mobile communications module 230 of the mobile phone 1 through the processor 210. The mobile communications module 230 of the mobile phone 1 may send the answer command to the mobile phone 2. For example, the mobile communications module 230 of the mobile phone 1 may send the answer command to the mobile phone 2 through the network device.

In some embodiments, in response to the received answer command, the mobile phone 1 may also display a call interface.

After the mobile phone 2 receives the answer command, the mobile phone 1 and the mobile phone 2 can establish a connection. Based on the established connection, the user of the mobile phone 1 and the user of the mobile phone 2 can talk to each other. For example, the method may further include the following steps.

Step 409: The mobile phone 1 receives a downlink audio signal sent by the mobile phone 2.

Step 410: The mobile phone 1 sends the downlink audio signal to the notebook computer through the Wi-Fi link.

For example, the mobile communications module 230 of the mobile phone 1 may receive the downlink audio signal sent by the mobile phone 2 through the network device. The mobile communications module 230 of the mobile phone 1 may transmit the downlink audio signal to a modem processor 210-2 of the mobile phone 1. The modem processor 210-2 of the mobile phone 1 transmits the downlink audio signal to the Wi-Fi module 240-1 of the mobile phone 1. The Wi-Fi module 240-1 of the mobile phone 1 may send the downlink audio signal to the Wi-Fi module 304-1 of the notebook computer through the Wi-Fi link. In some embodiments, the mobile phone 1 may decode the received downlink audio signal into a PCM coding format, and then transmit the decoded downlink audio signal to the Wi-Fi module 240-1 of the mobile phone 1.

In some embodiments, the modem processor 210-2 of the mobile phone 1 may be connected to a hardware pin of the Wi-Fi module 240-1 of the mobile phone 1. In this way, the modem processor 210-2 of the mobile phone 1 and the Wi-Fi module 240-1 of the mobile phone 1 can transmit audio signals through the connection pin.

In some other embodiments, an existing high-speed data channel between the modem processor 210-2 of the mobile phone 1 and an AP 210-1 of the mobile phone 1 may be used to transmit an audio signal between the modem processor 210-2 of the mobile phone 1 and the Wi-Fi module 240-1 of the mobile phone 1 through forwarding of the AP 210-1 of the mobile phone 1. In other words, that the modem processor 210-2 of the mobile phone 1 transmits the downlink audio signal to the Wi-Fi module 240-1 of the mobile phone 1 may specifically include the modem processor 210-2 of the mobile phone 1 transmits the downlink audio signal to the AP 210-1 of the mobile phone 1, and the AP 210-1 of the mobile phone 1 transmits the downlink audio signal to the Wi-Fi module 240-1 of the mobile phone 1.

In some embodiments, before sending the downlink audio signal to the notebook computer, the mobile phone 1 may further encrypt the downlink audio signal.

Step 411: The notebook computer converts the downlink audio signal into a sound signal and plays the sound signal.

For example, the Wi-Fi module 304-1 of the notebook computer may transmit the received downlink audio signal to the processor 301 of the notebook computer. The processor 301 of the notebook computer transmits the downlink audio signal to the speaker 305-1 of the notebook computer. The speaker 305-1 of the notebook computer converts the downlink audio signal into the sound signal and plays the sound signal. For example, the processor 301 of the notebook computer may decode the downlink audio signal, convert the decoded downlink audio signal from a digital audio signal to an analog audio signal, and transmit the analog audio signal to the speaker 305-1 of the notebook computer. The speaker 305-1 of the notebook computer may convert the received analog audio into the sound signal and play the sound signal.

In some embodiments, if the received downlink audio signal is encrypted, after receiving the downlink audio signal, the notebook computer may first decrypt the downlink audio signal, and then perform processing such as decoding and digital-to-analog conversion on the decrypted downlink audio signal.

In some other embodiments, the method may further include the following steps.

Step 412: The notebook computer collects a sound signal input by the user, and converts the sound signal into an uplink audio signal.

Step 413: The notebook computer sends the uplink audio signal to the mobile phone 1 through the Wi-Fi link.

For example, a microphone 306-1 of the notebook computer may collect the sound signal from the user, and convert the sound signal into the uplink audio signal. The microphone 306-1 of the notebook computer transmits the uplink audio signal to the processor 301 of the notebook computer. The processor 301 of the notebook computer transmits the uplink audio signal to the Wi-Fi module 304-1 of the notebook computer. For example, the processor 301 of the notebook computer may convert the received uplink audio signal from an analog audio signal to a digital audio signal, code the digital audio signal, and then transmit the coded uplink audio signal to the Wi-Fi module 304-1 of the notebook computer. The Wi-Fi module 304-1 of the notebook computer may send the uplink audio signal to the mobile phone 1 through the Wi-Fi link. In some embodiments, the notebook computer may encrypt the uplink audio signal and then send the encrypted uplink audio signal to the mobile phone 1.

Step 414: The mobile phone 1 transmits the uplink audio signal to the mobile phone 2.

The Wi-Fi module 240-1 of the mobile phone 1 transmits the received uplink audio signal to the modem processor 210-2 of the mobile phone 1. The modem processor 210-2 of the mobile phone 1 transmits the uplink audio signal to the mobile communications module 230 of the mobile phone 1. The mobile communications module 230 of the mobile phone 1 transmits the uplink audio signal to the mobile phone 2 through the network device. In some embodiments, if the uplink audio signal sent by the notebook computer is encrypted, after receiving the uplink audio signal, the mobile phone 1 may first decrypt the uplink audio signal, and then send the decrypted uplink audio signal to the mobile phone 2.

In some embodiments, the Wi-Fi module 240-1 of the mobile phone 1 may transmit the uplink audio signal to the modem processor 210-2 of the mobile phone 1 through a pin connecting the Wi-Fi module 240-1 of the mobile phone 1 to the modem processor 210-2 of the mobile phone 1. In some other embodiments, the modem processor 210-2 of the mobile phone 1 may transmit the uplink audio signal to the AP 210-1 of the mobile phone 1, and the AP 210-1 of the mobile phone 1 transmits the uplink audio signal to the modem processor 210-2 of the mobile phone 1 through an existing high-speed data channel between the AP 210-1 of the mobile phone 1 and the Wi-Fi module 240-1 of the mobile phone 1.

The modem processor 210-2 of the mobile phone 1 may modulate the received uplink audio signal, and transmit the modulated uplink audio signal to the mobile communications module 230 of the mobile phone 1. Therefore, the mobile communications module 230 of the mobile phone 1 may transmit the uplink audio signal to the mobile phone 2 through the network device.

In this way, after the user chooses to answer the incoming call on the notebook computer, the mobile phone 1 may transmit the audio signal in the call process to the notebook computer through the Wi-Fi link established between the mobile phone 1 and the notebook computer. The call is implemented through the peripheral device, and an audio signal with a larger amount of data can be transmitted through the Wi-Fi link. Therefore, call requirements in more scenarios are met. In addition, when the notebook computer further establishes a Bluetooth link to a peripheral device such as a Bluetooth headset or a Bluetooth keyboard according to a Bluetooth protocol to transmit data, the mobile phone 1 and the notebook computer transmit audio signals through the Wi-Fi link established according to the Wi-Fi protocol. This can avoid interference to the peripheral device such as the Bluetooth headset or the Bluetooth keyboard connected to the notebook computer.

Figure 5:
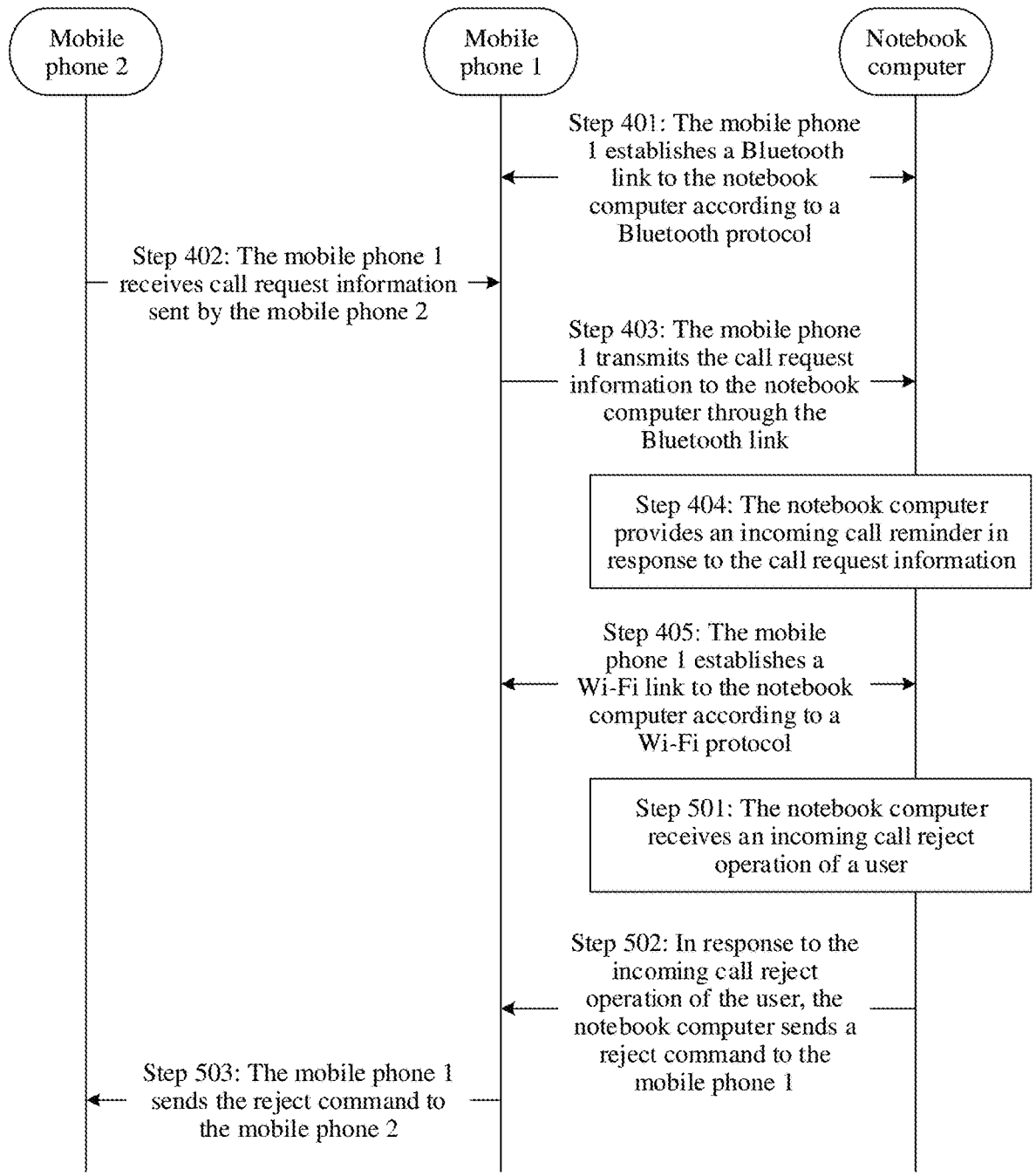
FIG. 5 is a schematic flowchart of another call answer method according to another embodiment.

In some other embodiments, if the user chooses to reject the incoming call on the notebook computer, as shown in FIG. 5, the call answer method may further include the following steps.

Step 501: The notebook computer receives an incoming call reject operation of the user.

Step 502: In response to the incoming call reject operation of the user, the notebook computer sends a reject command to the mobile phone 1.

For example, the incoming call reject operation may be a trigger operation performed by the user on a "decline" button included in the incoming call reminder interface displayed on the display device of the notebook computer, or the incoming call reject operation may be a trigger operation performed by the user on a predetermined physical button on the notebook computer, and the predetermined physical button is used to reject the incoming call. After the notebook computer receives the incoming call reject operation of the user, the processor 301 of the notebook computer may generate the reject command and transmit the reject command to the Bluetooth module 304-2 of the notebook computer. The Bluetooth module 304-2 of the notebook computer may send the reject command to the mobile phone 1, for example, the Bluetooth module 240-2 of the mobile phone 1, through the Bluetooth link.

In some embodiments, in response to the incoming call reject operation of the user, the notebook computer may inform, through the display device, a peer party that the incoming call is rejected and the call ends.

Step 503: The mobile phone 1 sends the reject command to the mobile phone 2.

For example, the Bluetooth module 240-2 of the mobile phone 1 may transmit the reject command to the mobile communications module 230 of the mobile phone 1 through the processor 210. The mobile communications module 230 of the mobile phone 1 sends the reject command to the mobile phone 2 through the network device.

In some embodiments, in response to the received reject command, the mobile phone 1 may display a corresponding interface on the display to inform the peer party that the incoming call is rejected and the call ends.

Figure 6:
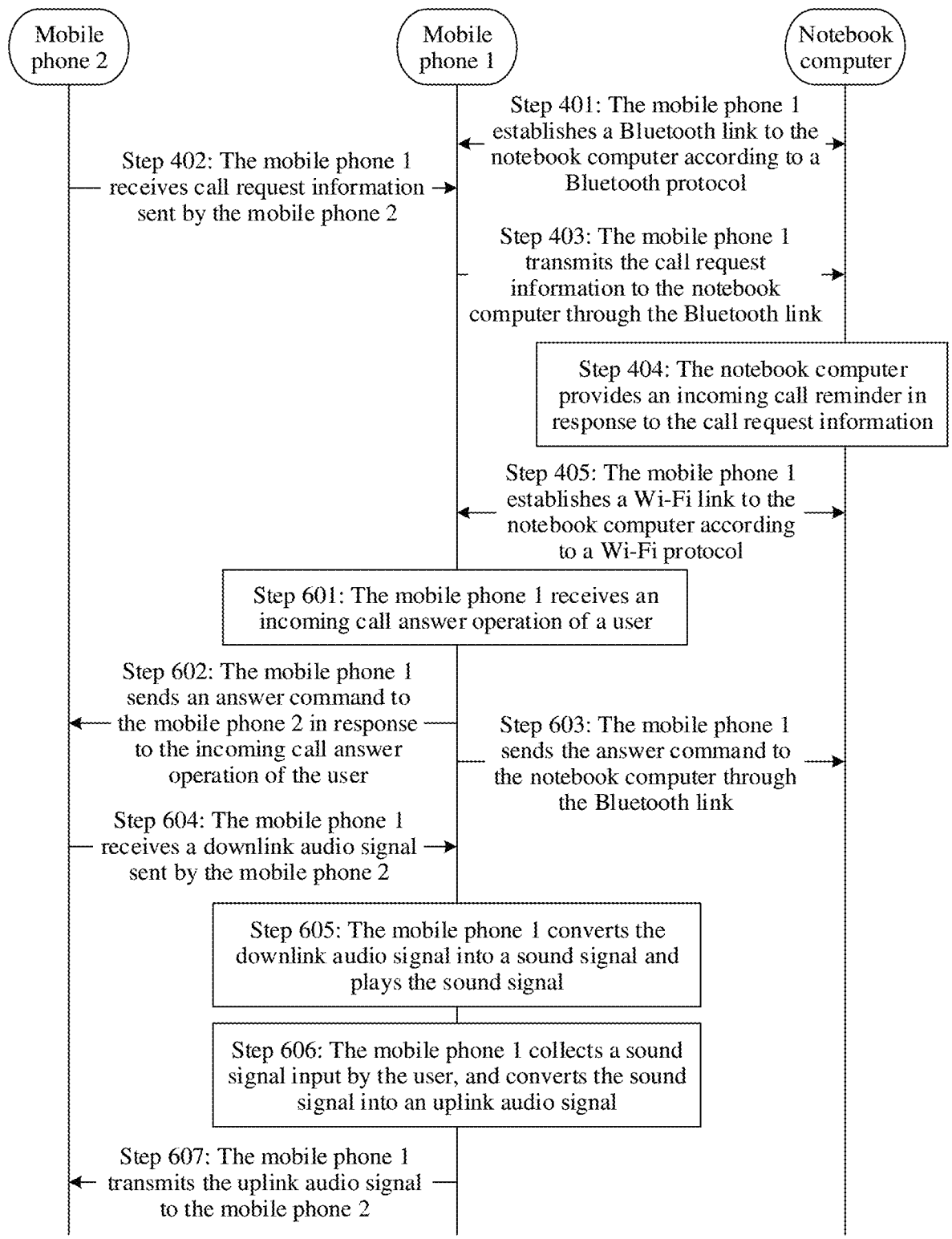
FIG. 6 is a schematic flowchart of still another call answer method according to another embodiment.

In some other embodiments, if the user chooses to answer the incoming call on the mobile phone 1, as shown in FIG. 6, the call answer method may further include the following steps.

Step 601: The mobile phone 1 receives an incoming call answer operation of the user.

For example, the incoming call answer operation may be a trigger operation performed by the user on an "accept" button included in the incoming call reminder interface displayed on the display of the mobile phone 1, or the incoming call answer operation may be a trigger operation performed by the user on a predetermined physical button on the mobile phone 1, and the predetermined physical button may be used to answer the incoming call.

Step 602: The mobile phone 1 sends an answer command to the mobile phone 2 in response to the incoming call answer operation of the user.

For example, in response to the incoming call answer operation of the user, the processor 210 of the mobile phone 1 may generate the answer command and transmit the answer command to the mobile communications module 230 of the mobile phone 1. The mobile communications module 230 of the mobile phone 1 may send the answer command to the mobile phone 2 through the network device.

In some embodiments, in response to the received answer command, the mobile phone 1 may display a call interface.

In some embodiments, the method may further include step 603: The mobile phone 1 sends the answer command to the notebook computer through the Bluetooth link.

For example, the processor 210 of the mobile phone 1 may further transmit the generated answer command to the Bluetooth module 240-2 of the mobile phone 1. The Bluetooth module 240-2 of the mobile phone 1 sends the answer command to the Bluetooth module 304-2 of the notebook computer through the Bluetooth link. The Bluetooth module 304-2 of the notebook computer transmits the answer command to the processor 301 of the notebook computer. In response to the answer command, the notebook computer may inform that the call is answered.

In some embodiments, in response to the answer command, the notebook computer may display a call interface through the display device.

After the mobile phone 2 receives the answer command, the mobile phone 1 and the mobile phone 2 can establish a connection. Based on the established connection, the user of the mobile phone 1 and the user of the mobile phone 2 can talk to each other. The method may include the following steps.

Step 604: The mobile phone 1 receives a downlink audio signal sent by the mobile phone 2.

Step 605: The mobile phone 1 converts the downlink audio signal into a sound signal and plays the sound signal.

For example, the mobile communications module 230 of the mobile phone 1 may receive the downlink audio signal sent by the mobile phone 2 through the network device, and transmit the downlink audio signal to the modem processor 210-2 of the mobile phone 1. The modem processor 210-2 of the mobile phone 1 transmits the downlink audio signal to an audio module 250 of the mobile phone 1. The audio module 250 of the mobile phone 1 transmits the downlink audio signal to a speaker 250A (or a receiver 250B) of the mobile phone 1. The speaker 250A (or the receiver 205B) of the mobile phone 1 converts the downlink audio signal into the sound signal and plays the sound signal. For example, after receiving the downlink audio signal, the modem processor 210-2 of the mobile phone 1 may demodulate the downlink audio signal, and transmit the demodulated downlink audio signal to the audio module 250 of the mobile phone 1. The audio module 250 of the mobile phone 1 may decode the received downlink audio signal, convert the decoded downlink audio signal from a digital audio signal to an analog audio signal, and transmit the analog audio signal to the speaker 250A (or the receiver 250B) of the mobile phone 1. The speaker 250A (or the receiver 250B) of the mobile phone 1 may convert the received analog audio signal into the sound signal and play the sound signal.

In some other embodiments, the method may further include the following steps.

Step 606: The mobile phone 1 collects a sound signal input by the user, and converts the sound signal into an uplink audio signal.

Step 607: The mobile phone 1 transmits the uplink audio signal to the mobile phone 2.

For example, a microphone 250C of the mobile phone 1 may collect the sound signal from the user, and convert the sound signal into the uplink audio signal. The microphone 250C of the mobile phone 1 transmits the uplink audio signal to the modem processor 210-2 of the mobile phone 1 through the audio module 250. The modem processor 210-2 of the mobile phone 1 transmits the uplink audio signal to the mobile communications module 230 of the mobile phone 1. The mobile communications module 230 of the mobile phone 1 transmits the uplink audio signal to the mobile phone 2 through the network device. For example, when the user speaks, the microphone 250C of the mobile phone 1 may collect the sound signal from the user, convert the collected sound signal into the uplink audio signal, and transmit the uplink audio signal to the audio module 250 of the mobile phone 1. The audio module 250 of the mobile phone 1 may convert the received uplink audio signal from a digital audio signal to an analog audio signal, code the analog audio signal, and transmit the coded analog audio signal to the modem processor 210-2 of the mobile phone 1. The modem processor 210-2 of the mobile phone 1 may modulate the received uplink audio signal, and then transmit the modulated uplink audio signal to the mobile communications module 230 of the mobile phone 1, so that the mobile communications module 230 transmits the uplink audio signal to the mobile phone 2 through the network device.

Figure 7:
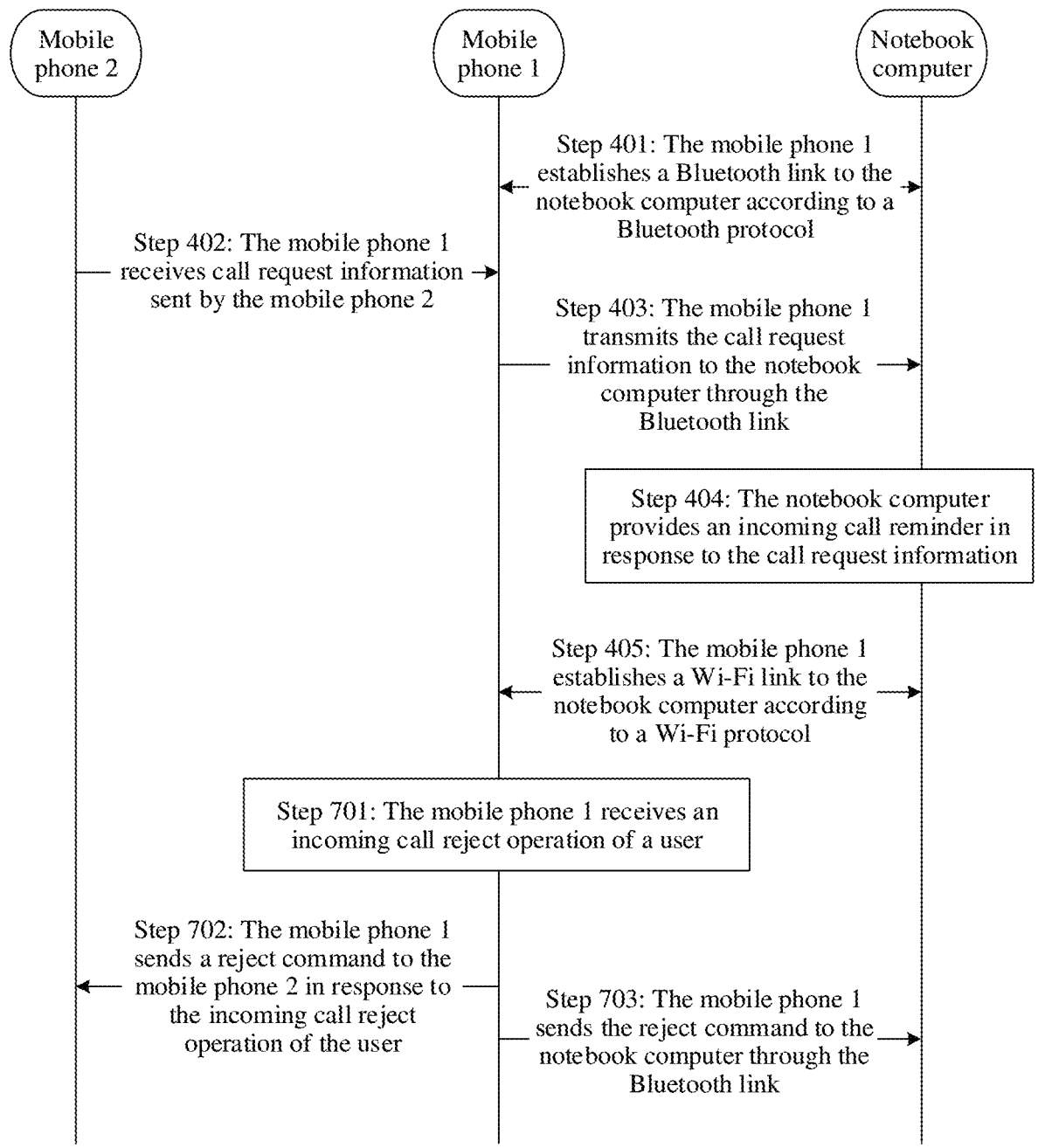
FIG. 7 is a schematic flowchart of still another call answer method according to another embodiment.

In some other embodiments, if the user chooses to reject the incoming call on the mobile phone 1, as shown in FIG. 7, the call answer method may further include the following steps.

Step 701: The mobile phone 1 receives an incoming call reject operation of the user.

For example, the incoming call reject operation may be a trigger operation performed by the user on a "decline" button included in the incoming call reminder interface displayed on the display of the mobile phone 1, or the incoming call reject operation may be a trigger operation performed by the user on a predetermined physical button on the mobile phone 1, and the predetermined physical button may be used to reject the incoming call.

Step 702: The mobile phone 1 sends a reject command to the mobile phone 2 in response to the incoming call reject operation of the user.

For example, in response to the incoming call reject operation of the user, the processor 210 of the mobile phone 1 may generate the reject command and transmit the reject command to the mobile communications module 230 of the mobile phone 1. The mobile communications module 230 of the mobile phone 1 sends the reject command to the mobile phone 2 through the network device.

In some embodiments, in response to the incoming call reject operation of the user, the mobile phone 1 may display a corresponding interface on the display to inform a peer party that the incoming call is rejected and the call ends.

Step 703: The mobile phone 1 sends the reject command to the notebook computer through the Bluetooth link.

For example, the processor 210 of the mobile phone 1 may further transmit the generated reject command to the Bluetooth module 240-2 of the mobile phone 1. The Bluetooth module 240-2 of the mobile phone 1 sends the reject command to the Bluetooth module 304-2 of the notebook computer through the Bluetooth link. The Bluetooth module 304-2 of the notebook computer transmits the reject command to the processor 301 of the notebook computer. In response to the reject command, the notebook computer informs that the incoming call is rejected.

In some embodiments, in response to the reject command, the notebook computer may inform, through the display device, the peer party that the incoming call is rejected and the call ends.

It should be noted that, in this embodiment, step 405 may be performed after call request information of a calling device such as the mobile phone 2 is received. Step 405 may alternatively be performed after the notebook computer receives the incoming call answer operation of the user. To be specific, if the notebook computer receives the incoming call answer operation of the user, step 405 is performed, or if the notebook computer receives the incoming call reject operation of the user, or the mobile phone 1 receives the incoming call answer operation or the incoming call reject operation of the user, step 405 is not performed.

In the technical solutions provided in this embodiment, control signaling is transmitted through the Bluetooth link established between the mobile phone 1 and the notebook computer, so that reliability is high. In addition, because power consumption of the established Bluetooth link is low, a persistent connection may be maintained. In addition, when the mobile phone 1 is connected to the peripheral device such as the notebook computer, the call request information is transmitted to the notebook computer, so that the user may choose, based on a requirement of the user, to answer or reject the incoming call on the mobile phone 1, or to answer or reject the incoming call on the notebook computer. This reduces a fragment time for switching a call channel by the user between the mobile phone 1 and the peripheral device, and improves user experience.

In addition, it should be noted that, in this embodiment, the mobile phone 1 may not perform step 401. In other words, the mobile phone 1 may not establish the Bluetooth link to the notebook computer. In this case, the call request information and control signaling such as the answer command or the reject command may be transmitted through the Wi-Fi link established between the mobile phone 1 and the notebook computer.

Figure 8:
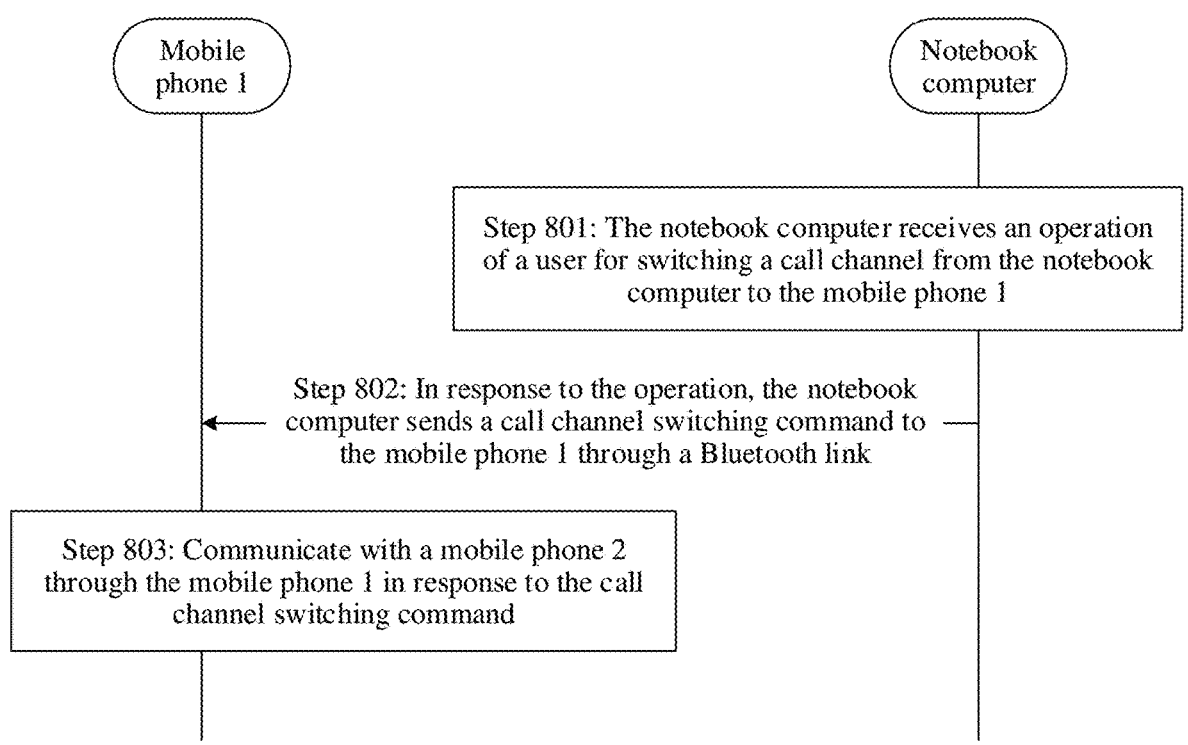
FIG. 8 is a schematic flowchart of still another call answer method according to another embodiment.

In some embodiments, during the call between the user of the mobile phone 1 and the user of the mobile phone 2, the user of the mobile phone 1 may switch the call between the mobile phone 1 and the notebook computer. For example, with reference to FIG. 4a and FIG. 4b, an example in which the user chooses to answer the incoming call on the notebook computer and the user currently talks to the user of the mobile phone 2 through the notebook computer is used. As shown in FIG. 8, the method may further include the following steps.

Step 801: The notebook computer receives an operation of the user for switching a call channel from the notebook computer to the mobile phone 1.

Step 802: In response to the operation, the notebook computer sends a call channel switching command to the mobile phone 1 through the Bluetooth link.

The call channel switching command is used to instruct to switch the call from the notebook computer to the mobile phone 1. For example, in response to the foregoing operation, the processor 301 of the notebook computer may generate the call channel switching command and transmit the call channel switching command to the Bluetooth module 304-2 of the notebook computer. The Bluetooth module 304-2 of the notebook computer sends the call channel switching command to the Bluetooth module 240-2 of the mobile phone 1 through the Bluetooth link.

Figure 9A:
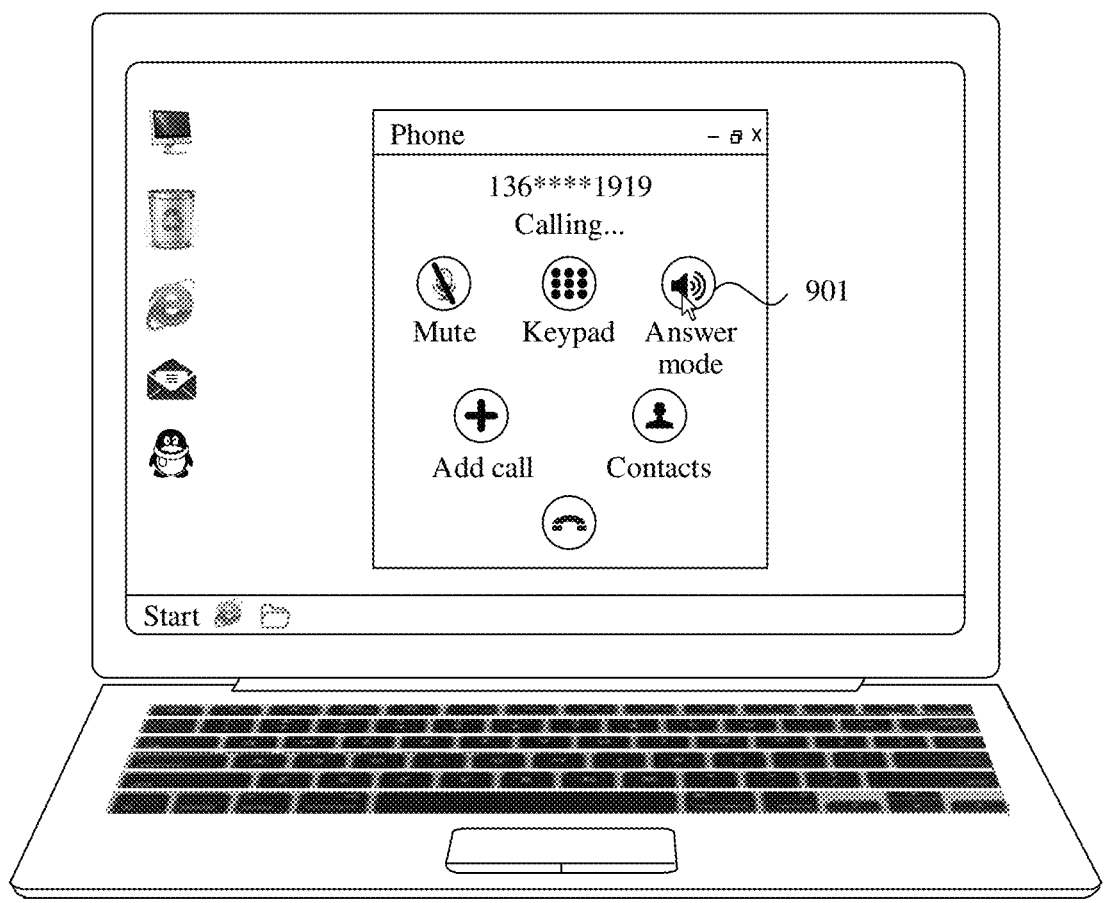
FIG. 9A and FIG. 9B are schematic diagrams of some graphical user interfaces displayed on a second electronic device according to an embodiment.
Figure 9B:
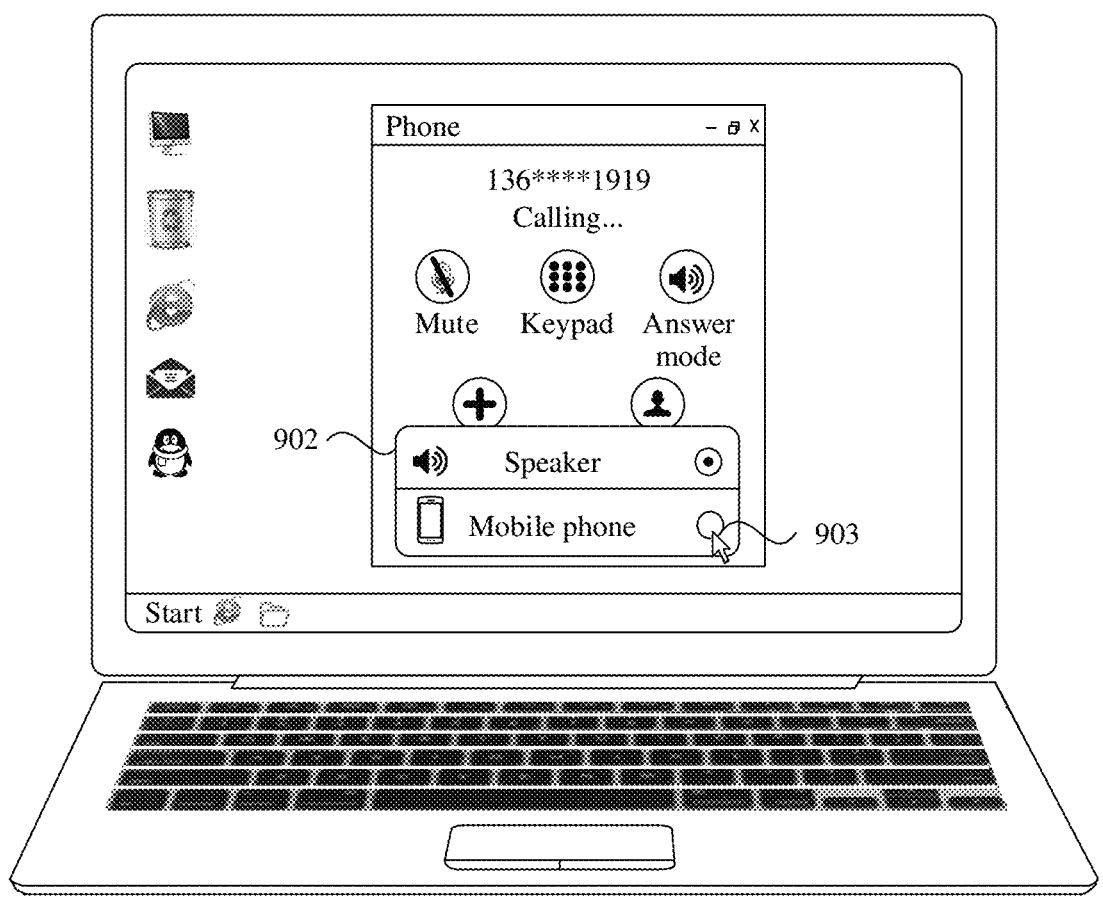

For example, the operation of switching the call channel from the notebook computer to the mobile phone 1 may be a trigger operation performed by the user on a predetermined button in an interface displayed on the display device of the notebook computer. For example, as shown in FIG. 9A, a call interface displayed on the display device of the notebook computer includes an option button 901 for selecting an answer mode. When the user expects to switch the call channel, the user may perform a trigger operation on the option button 901. In response to the trigger operation performed on the option button 901, as shown in FIG. 9B, the notebook computer may display an answer mode selection interface 902 in the call interface. The answer mode selection interface 902 includes selectable call channels, for example, the speaker of the notebook computer and the mobile phone 1. If the user expects to switch the call channel from the notebook computer to the mobile phone 1, the user may perform a selection operation on an option button 903 corresponding to the mobile phone 1 in the answer mode selection interface 902. The selection operation performed by the user on the option button 903 corresponding to the mobile phone 1 in the answer mode selection interface 902 is the operation of switching the call channel from the notebook computer to the mobile phone 1. Alternatively, the operation of switching the call channel from the notebook computer to the mobile phone 1 may be a trigger operation performed by the user on a predetermined physical button on the notebook computer, and the predetermined physical button is used to switch the call channel.

Step 803: Communicate with the mobile phone 2 through the mobile phone 1 in response to the call channel switching command.

For example, the Bluetooth module 240-2 of the mobile phone 1 may send the call channel switching command to the AP 210-1 of the mobile phone 1, and the AP 210-1 of the mobile phone 1 sends the call channel switching command to the modem processor 210-2 of the mobile phone 1. In this way, the modem processor 210-2 of the mobile phone 1 may control the mobile phone 1 to perform communication through the speaker 250A (or the receiver 250B) and the microphone 250C of the mobile phone 1.

For specific descriptions of communicating with the mobile phone 2 through the mobile phone 1, refer to the specific descriptions of the corresponding content in step 604 to step 607 in the foregoing embodiment. Details are not described herein again.

For another example, with reference to FIG. 6, an example in which the user chooses to answer the incoming call on the mobile phone 1 and the user currently talks to the user of the mobile phone 2 through the mobile phone 1 is used. When the user expects to speak through the notebook computer, similarly, the user may perform a call channel switching operation on the mobile phone 1. For example, as shown in FIG. 10A, a call interface displayed on the display of the mobile phone 1 includes an option button 1001 for selecting an answer mode. When the user expects to switch the call channel, the user may perform a trigger operation on the option button 1001. In response to the trigger operation performed on the option button 1001, as shown in FIG. 10B, the notebook computer may display an answer mode selection interface 1002 in the call interface. The answer mode selection interface 1002 includes selectable call channels, for example, the speaker of the mobile phone 1 and an earpiece (namely, the receiver) of the mobile phone 1. For example, the user currently speaks through the microphone of the mobile phone 1. If the user expects to switch the call channel from the microphone of the mobile phone 1 to the notebook computer, the user may perform a selection operation on an option button 1003 corresponding to the notebook computer in the answer mode selection interface 1002. After the mobile phone 1 receives an operation of the user for switching the call channel from the microphone of the mobile phone 1 to the notebook computer, the mobile phone 1 may generate a corresponding call channel switching command in response to the operation. In response to the call channel switching command, communication is performed with the mobile phone 2 through the speaker 305-1 and the microphone 306-1 of the notebook computer. For specific descriptions of communicating with the mobile phone 2 through the speaker 305-1 and the microphone 306-1 of the notebook computer, refer to the specific descriptions of the corresponding content in step 409 to step 414 in the foregoing embodiment. Details are not described herein again.

In this way, in a call process, the user may flexibly select, based on a requirement of the user, a call channel that the user expects to use between the mobile phone 1 and the notebook computer, so that user experience is improved.

In some other embodiments, if the user chooses to answer the incoming call, the user may choose to hang up the incoming call on the mobile phone 1 or the notebook computer, to end the call.

If the user chooses to hang up the incoming call on the notebook computer, the notebook computer may receive an incoming call hang-up operation of the user. For example, the incoming call hang-up operation may be a trigger operation performed by the user through a mouse (or a finger) on a hang-up button included in the call interface displayed on the display device of the notebook computer, or the incoming call hang-up operation may be a trigger operation performed by the user on a predetermined physical button on the notebook computer, and the predetermined physical button is used to hang up the incoming call. In response to the incoming call hang-up operation of the user, the notebook computer may send a hang-up command to the mobile phone 1 through the Bluetooth link. For example, the processor 301 of the notebook computer may generate the hang-up command and transmit the hang-up command to the Bluetooth module 304-2 of the notebook computer. The Bluetooth module 304-2 of the notebook computer sends the hang-up command to the Bluetooth module 240-2 of the mobile phone 1 through the Bluetooth link. The notebook computer may also inform, through the display device, the user that the incoming call is hung up and ends. The mobile phone 1 may send the received hang-up command to the mobile phone 2. For example, the Bluetooth module 240-2 of the mobile phone 1 may transmit the received hang-up command to the mobile communications module 230 of the mobile phone 1 through the processor. The mobile communications module 230 of the mobile phone 1 sends the hang-up command to the mobile phone 2 through the network device. The mobile phone 1 may also display a corresponding interface on the display 260 to inform the user that the incoming call is hung up and ends. Similarly, if the user chooses to hang up the incoming call on the mobile phone 1, the mobile phone 1 receives an incoming call hang-up operation of the user. In response to the incoming call hang-up operation, the processor 210 of the mobile phone 1 may generate a corresponding hang-up command, and transmit the hang-up command to the mobile phone 2 through the mobile communications module 230 of the mobile phone 1, to end the call. The mobile phone 1 may also send the hang-up command to the notebook computer through the Bluetooth link, so that the notebook computer informs the user that the call ends.

Figure 11A:
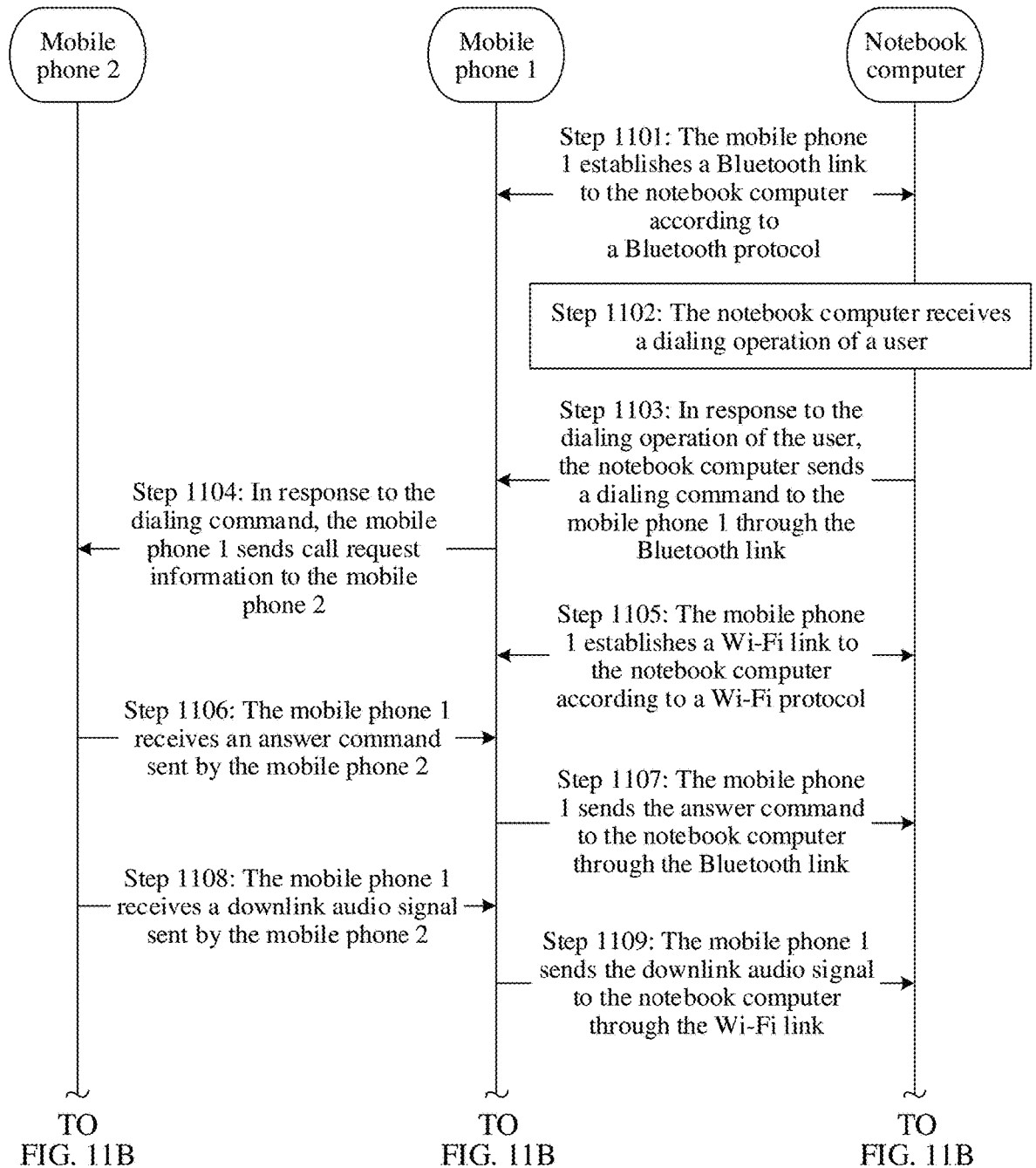
FIG. 11A and FIG. 11B are a schematic flowchart of a calling method according to another embodiment.
Figure 11B:
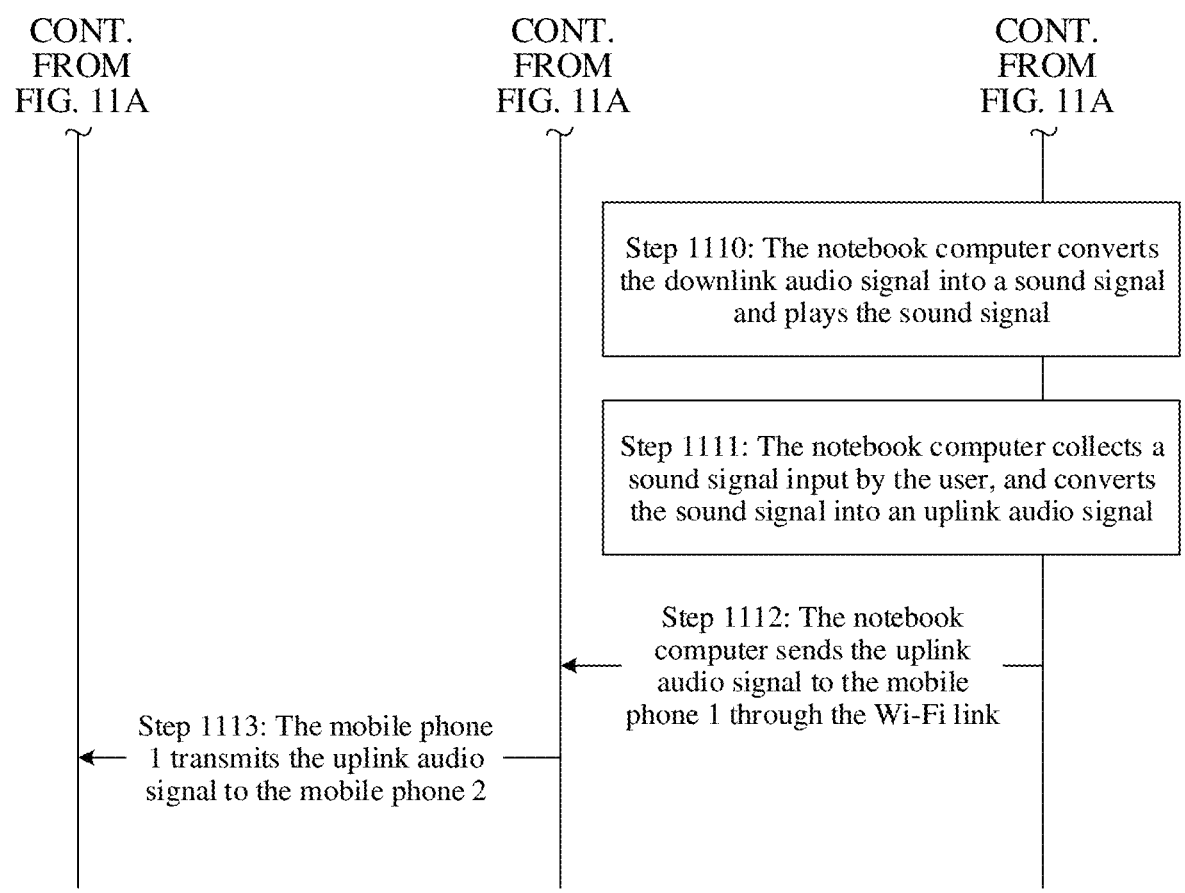

Referring to FIG. 11A and FIG. 11B, the calling method provided in the embodiments is described by using an example in which the first electronic device 101 (for example, a mobile phone 1) is used as a calling device, a mobile phone 2 is used as a called device, and a user performs a dialing operation on the second electronic device 102 (for example, a notebook computer) connected to the first electronic device 101. As shown in FIG. 11A and FIG. 11B, the method may include the following steps.

Step 1101: The mobile phone 1 establishes a Bluetooth link to the notebook computer according to a Bluetooth protocol.

For example, a Bluetooth module 240-2 of the mobile phone 1 establishes the Bluetooth link to a Bluetooth module 304-2 of the notebook computer according to the Bluetooth protocol.

Step 1102: The notebook computer receives the dialing operation of the user.

Figure 12:
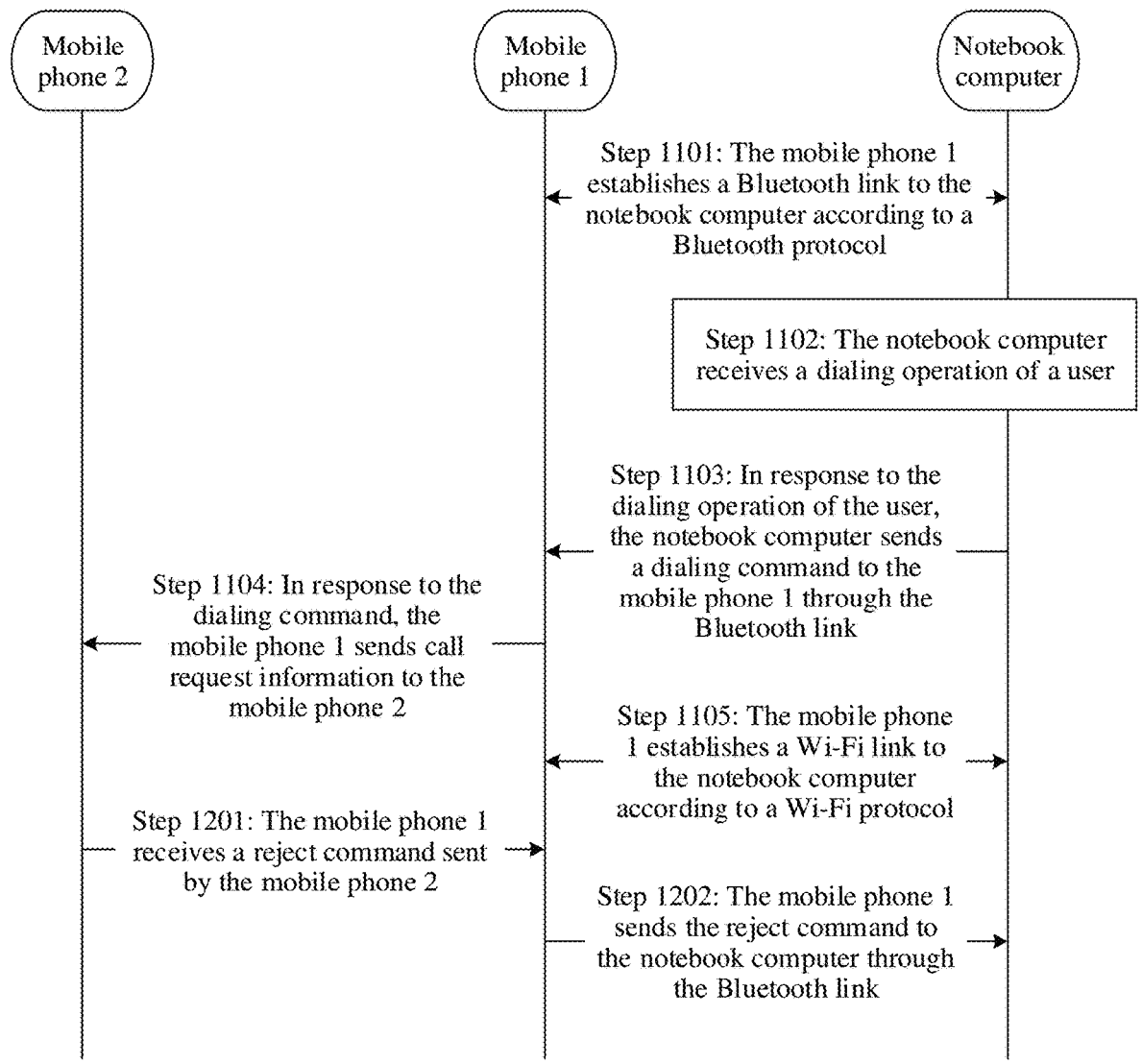
FIG. 12 is a schematic flowchart of another calling method according to another embodiment.

For example, the dialing operation may be a series of operations performed by the user in a dialing interface displayed on a display device of the notebook computer, for example, an operation of entering a phone number that the user expects to call and a trigger operation performed on a dialing button. As shown in FIG. 12, a dialing interface 1201 is displayed on the display device of the notebook computer, and the user may enter, in the dialing interface, the phone number that the user expects to call. After entering the phone number, the user performs a trigger operation on a dialing button 1202, to complete the dialing operation. Alternatively, the dialing operation may be a voice instruction entered by the user.

Step 1103: In response to the dialing operation of the user, the notebook computer sends a dialing command to the mobile phone 1 through the Bluetooth link.

For example, in response to the dialing operation of the user, a processor 301 of the notebook computer may generate the dialing command and transmit the dialing command to the Bluetooth module 304-2 of the notebook computer. The Bluetooth module 304-2 of the notebook computer sends the dialing command to the mobile phone 1, for example, the Bluetooth module 240-2 of the mobile phone 1, through the Bluetooth link.

In step 1102, if the user performs the dialing operation in the dialing interface displayed on the display device of the notebook computer, the notebook computer may display a connection waiting interface through the display device in response to the dialing operation of the user.

Step 1104: In response to the dialing command, the mobile phone 1 sends call request information to the mobile phone 2.

For example, the Bluetooth module 240-2 of the mobile phone 1 may send the dialing command to a processor 210 of the mobile phone 1. In response to the dialing command, the processor 210 of the mobile phone 1 generates the call request information, and transmits the call request information to a mobile communications module 230 of the mobile phone 1. The mobile communications module 230 of the mobile phone 1 sends the call request information to the mobile phone 2 through a network device.

In some embodiments, the mobile phone 1 may display a connection waiting interface in response to the call request information. The mobile phone 1 and the notebook computer may further play ring back tones through respective speakers (or receivers).

Step 1105: The mobile phone 1 establishes a Wi-Fi link to the notebook computer according to a Wi-Fi protocol.

For example, a Wi-Fi module 240-1 of the mobile phone 1 establishes the Wi-Fi link to a Wi-Fi module 304-1 of the notebook computer according to the Wi-Fi protocol. Specific descriptions of step 1105 are the same as the specific descriptions of step 405 in the embodiments, and details are not described herein again.

A user of the mobile phone 2 may choose to answer or reject an incoming call. In some embodiments, if the user of the mobile phone 2 answers the incoming call, as shown in FIG. 11A and FIG. 11B, the calling method may farther include the following steps.

Step 1106: The mobile phone 1 receives an answer command sent by the mobile phone 2.

For example, the mobile communications module 230 of the mobile phone 1 may receive the answer command sent by the mobile phone 2 through the network device. The mobile communications module 230 of the mobile phone 1 sends the answer command to the processor 210 of the mobile phone 1, and the mobile phone 1 establishes a connection to the mobile phone 2 in response to the answer command.

In some embodiments, the mobile phone 1 may further display a call interface in response to the answer command.

Step 1107: The mobile phone 1 sends the answer command to the notebook computer through the Bluetooth link.

For example, the processor 210 of the mobile phone 1 may transmit the answer command to the Bluetooth module 240-2 of the mobile phone 1. The Bluetooth module 240-2 of the mobile phone 1 sends the answer command to the Bluetooth module 304-2 of the notebook computer through the Bluetooth link.

In some embodiments, the Bluetooth module 304-2 of the notebook computer may transmit the answer command to the processor 301 of the notebook computer. In response to the answer command, the processor 301 of the notebook computer informs, through an output device 305 of the notebook computer, that the call is connected. For example, the processor 301 of the notebook computer may send indication information to the display device of the notebook computer, so that the display device displays a call interface according to the indication information.

Based on the connection established between the mobile phone 1 and the mobile phone 2, the user of the mobile phone 1 and the user of the mobile phone 2 can talk to each other. Specifically, step 1108 to step 1113 may be included. Step 1108 to step 1113 are respectively the same as step 409 to step 414 in the foregoing embodiment, and details are not described herein again.

In some other embodiments, if the user of the mobile phone 2 rejects the incoming call, as shown in FIG. 12, the calling method may further include the following steps.

Step 1201: The mobile phone 1 receives a reject command sent by the mobile phone 2.

For example, the mobile communications module 230 of the mobile phone 1 may receive the reject command sent by the mobile phone 2 through the network device.

Step 1202: The mobile phone 1 sends the reject command to the notebook computer through the Bluetooth link.

For example, the mobile communications module 230 of the mobile phone 1 may send the reject command to the processor 210 of the mobile phone 1. The processor 210 of the mobile phone 1 transmits the reject command to the Bluetooth module 240-2 of the mobile phone 1. The Bluetooth module 240-2 of the mobile phone 1 sends the reject command to the notebook computer, for example, the Bluetooth module 304-2 of the notebook computer, through the Bluetooth link.

In some embodiments, the Bluetooth module 304-2 of the notebook computer sends the reject command to the processor 301 of the notebook computer. In response to the reject command, the processor 301 of the notebook computer informs, through an output device 305 of the notebook computer, that a peer end rejects the call.

In response to the reject command, the mobile phone 1 and the notebook computer may inform the user that the peer end rejects the call. For example, the mobile phone 1 and the notebook computer play rejection-related ring back tones through respective speakers (or receivers). Alternatively, the mobile phone 1 and the notebook computer display corresponding interfaces through respective display devices to inform that the peer end of the call rejects the call and the call ends.

In some embodiments, during the call between the user of the mobile phone 1 and the user of the mobile phone 2, with reference to FIG. 11A and FIG. 11B, a call channel may be switched from the notebook computer to the mobile phone 1. A specific implementation process is the same as that in step 801 to step 803 in the foregoing embodiment, and details are not described herein again.

In some other embodiments, the user may alternatively perform a dialing operation on the mobile phone 1, to implement a call with the user of the mobile phone 2. When the mobile phone 1 is connected to a peripheral device such as the second electronic device (for example, the notebook computer), the mobile phone 1 may transmit, to the notebook computer, a dialing command generated in response to the dialing operation, so that the notebook computer also provides a dialing prompt. In addition, the mobile phone 1 may establish the Wi-Fi link to the notebook computer according to the Wi-Fi protocol. In this way, when the user of the mobile phone 1 expects to switch a call channel from the mobile phone 1 to the notebook computer, the user can implement a call on the notebook computer through the established Wi-Fi link.

It should be noted that, in this embodiment, step 1105 may be performed after the notebook computer receives the dialing operation of the user. Alternatively, step 1105 may be performed after the mobile phone 1 receives the answer command of the mobile phone 2. In other words, if the mobile phone 1 receives the answer command, step 1105 is performed, or if the mobile phone 1 receives the reject command, step 1105 is not performed.

According to the technical solutions provided in this embodiment, the mobile phone 1 may transmit an audio signal in a call process to the notebook computer through the Wi-Fi link established between the mobile phone 1 and the notebook computer. The call is implemented through the peripheral device, and an audio signal with a larger amount of data can be transmitted through the Wi-Fi link. Therefore, call requirements in more scenarios are met. Moreover, call efficiency and call quality are improved. In addition, when the notebook computer further establishes a Bluetooth link to a peripheral device such as a Bluetooth headset or a Bluetooth keyboard according to a Bluetooth protocol to transmit data, the mobile phone 1 and the notebook computer transmit audio signals through the Wi-Fi link established according to the Wi-Fi protocol. This can avoid interference to the peripheral device such as the Bluetooth headset or the Bluetooth keyboard connected to the notebook computer. Further, in the technical solutions provided in this embodiment, control signaling is transmitted through the Bluetooth link established between the mobile phone 1 and the notebook computer, so that reliability is high. In addition, because power consumption of the established Bluetooth link is low, a persistent connection may be maintained.

In addition, it should be noted that, in this embodiment, the mobile phone 1 may alternatively not perform step 1101. In other words, the mobile phone 1 may not establish the Bluetooth link to the notebook computer. In this case, control signaling such as the dialing command, the answer command, or the reject command may be transmitted through the Wi-Fi link established between the mobile phone 1 and the notebook computer.

In some other embodiments, after the mobile phone 1 establishes a call with the mobile phone 2, if the mobile phone 1 receives call request information from a mobile phone 3, the mobile phone 1 may transmit the call request information to the notebook computer, and the user can still choose to answer or reject an incoming call on the notebook computer, or choose to answer or reject an incoming call on the mobile phone 1. A specific execution process thereof is similar to that in the embodiment shown in FIG. 4a and FIG. 4b to FIG. 8, and a difference lies in that the foregoing step 401 and step 405 do not need to be performed.

In the embodiments, a software system of the first electronic device 101 may use a layered architecture, an event-driven architecture, a microkernel architecture, a micro service architecture, or a cloud architecture. In the embodiments, an Android system with a layered architecture is used as an example to describe a software structure of the first electronic device 101.

Figure 13:
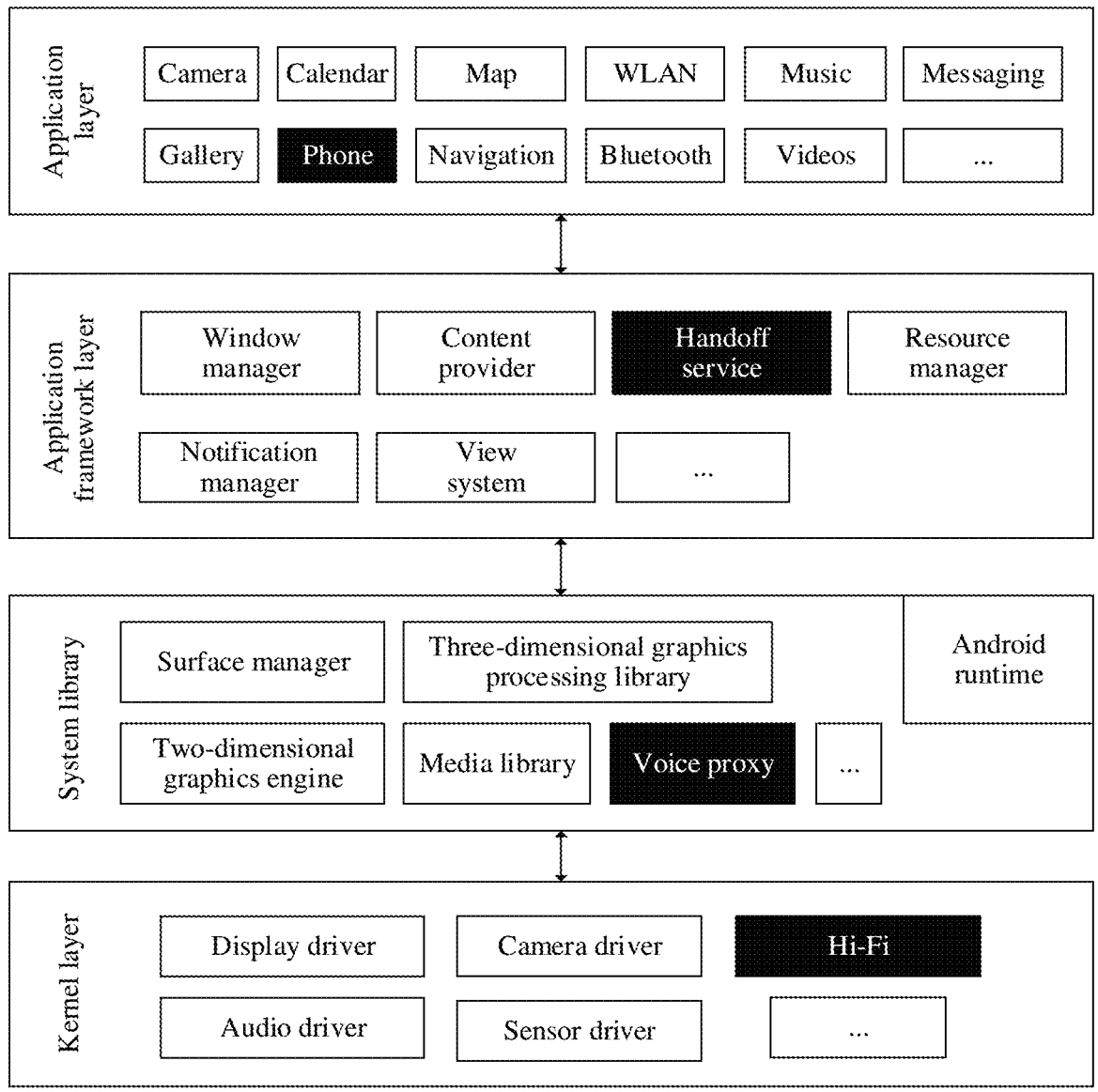
FIG. 13 is a block diagram of a software structure of a first electronic device 101 according to an embodiment.

FIG. 13 is a block diagram of the software structure of the first electronic device 101 according to an embodiment.

Software is divided into several layers by using the layered architecture, and each layer has a clear role and task. The layers communicate with each other through software interfaces. In some embodiments, the Android system is divided into four layers: an application layer, an application framework layer, a layer of Android runtime and a system library, and a kernel layer from top to bottom.

The application layer may include a series of application packages.

As shown in FIG. 13, the application packages may include applications such as "camera", "gallery", "calendar", "phone", "map", "navigation", "WLAN", "Bluetooth", "music", "video", and "messaging".

The application framework layer provides an application programming interface (API) and a programming framework for an application at the application layer. The application framework layer includes some predefined functions.

As shown in FIG. 13, the application framework layer may include a window manager, a content provider, a view system, a handoff service, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and make the data accessible to an application. The data may include a video, an image, audio, calls that are made and received, a browsing history and bookmarks, an address book, and the like.

The view system includes visual controls such as a control for displaying a text and a control for display an image. The view system may be configured to construct an application. A display interface may include one or more views. For example, a display interface including an SMS message notification icon may include a text display view and an image display view.

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to notify download completion, provide a message reminder, and the like. The notification manager may further be a notification that appears in a top status bar of the system in a form of a graph or a scroll bar text, for example, a notification of an application running on the background, or may be a notification that appears on the screen in a form of a dialog window. For example, text information is displayed in the status bar, a prompt tone is played, the electronic device vibrates, or an indicator light blinks.

In this embodiment, the handoff service is configured to provide a communication function of the first electronic device 101, for example, management of call statuses (including a connected state, a disconnected state, and the like). Specifically, the handoff service may include a call module and a connection management module. The call module may be configured to monitor a call status such as an incoming call, and may transmit, through the connection management module, corresponding control signaling such as call request information to a peripheral device such as a notebook computer connected to the first electronic device 101. The connection management module may receive a call-related control command from the peripheral device (such as the notebook computer), for example, an answer command, a reject command, a hang-up command, a dialing command, or a call channel switching command.

The Android runtime includes a core library and a virtual machine. The Android runtime is responsible for scheduling and management of the Android system.

The core library includes two parts: a function that needs to be invoked in java language and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager a media library, a three-dimensional graphics processing library (for example, OpenGL ES), and a 2D graphics engine (for example, SGL).

The surface manager is configured to manage a display subsystem, and provide fusion of 2D and 3D image layers for a plurality of applications.

The media library supports playback and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In this embodiment, the system library may further include a voice proxy. The voice proxy may send a corresponding command to high fidelity (Hi-Fi) at the kernel layer under control of the handoff service, and the command is used to control a voice transmission mode of the Hi-Fi. The voice proxy may be further configured to forward an audio signal between a peripheral device and the Hi-Fi at the kernel layer.

The kernel layer is a layer between hardware and software. The kernel layer includes at least a display driver, a camera driver, an audio driver, and a sensor driver. In this embodiment, the kernel layer further includes the Hi-Fi. The Hi-Fi may determine, according to the corresponding command sent by the voice proxy, whether an audio signal is to be locally played or is to be forwarded to the voice proxy, so that the voice proxy forward the audio signal to the peripheral device for playing.

For example, with reference to the first electronic device 101 shown in FIG. 13 and an application scenario, the following describes in detail the call answer method in the embodiments by using an example in which the first electronic device 101 is a mobile phone and the second electronic device 102 is a notebook computer.

Figure 14A:
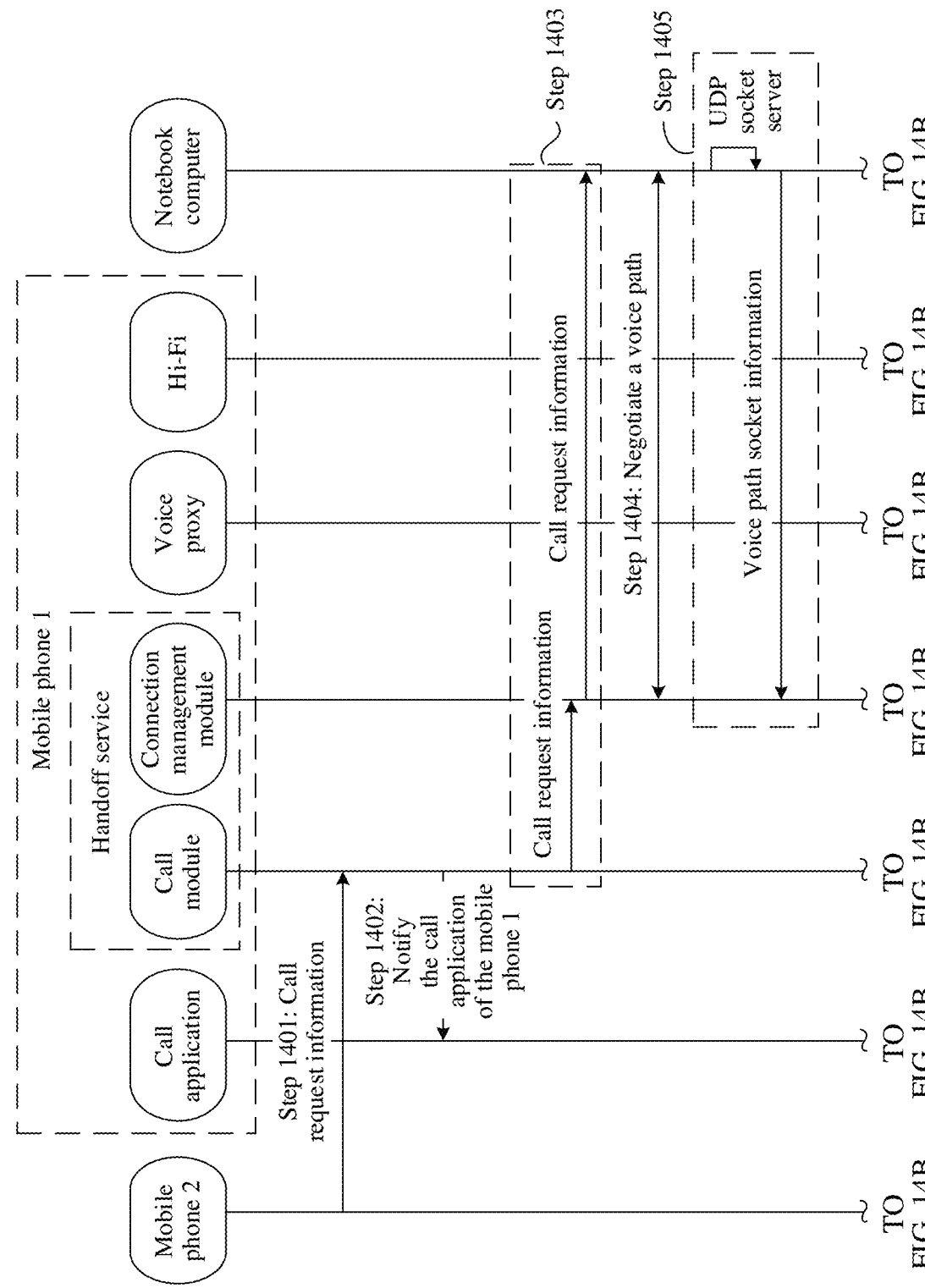
FIG. 14A to FIG. 14C are a schematic flowchart of still another call answer method according to another embodiment.
Figure 14B:
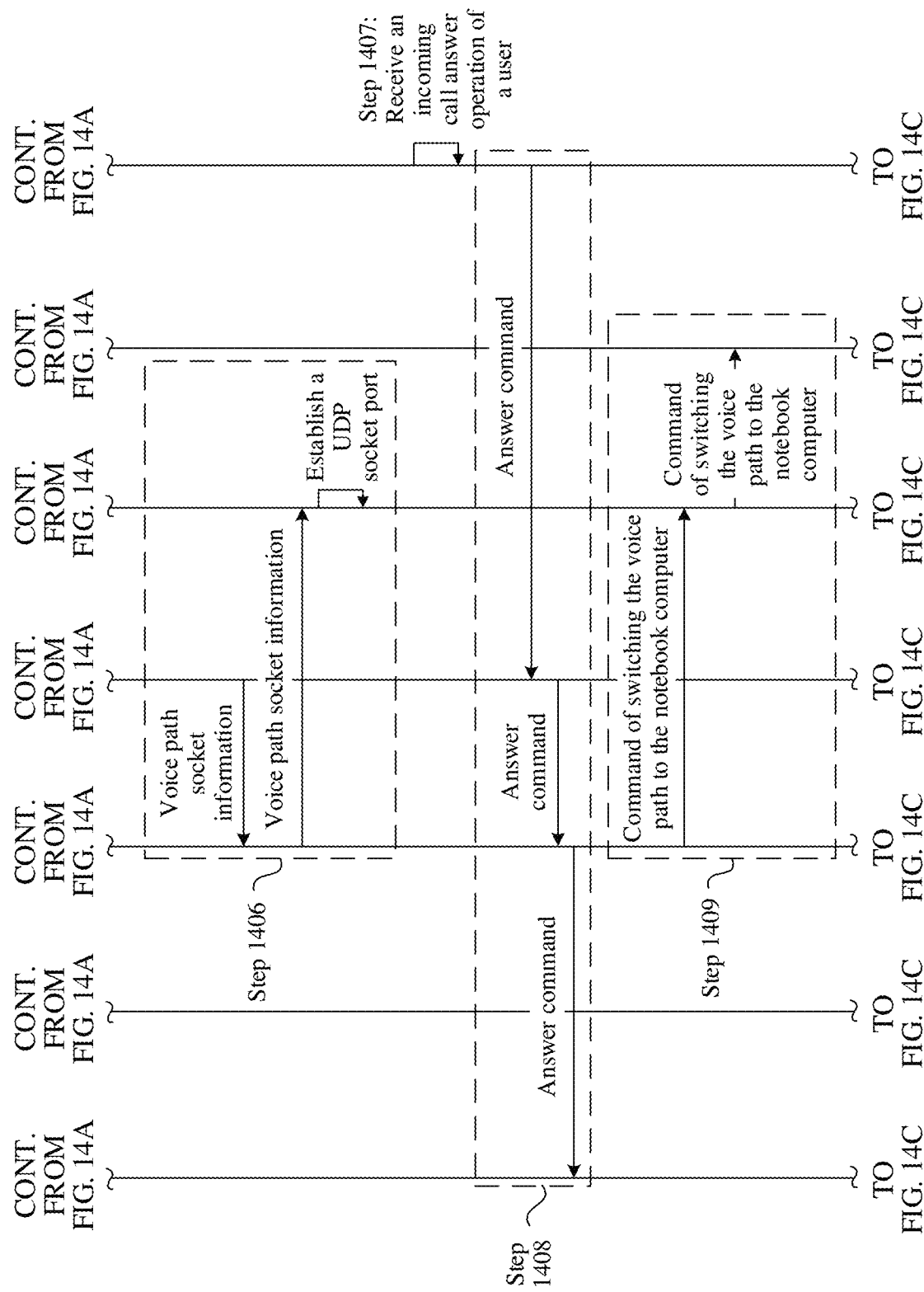
Figure 14C:
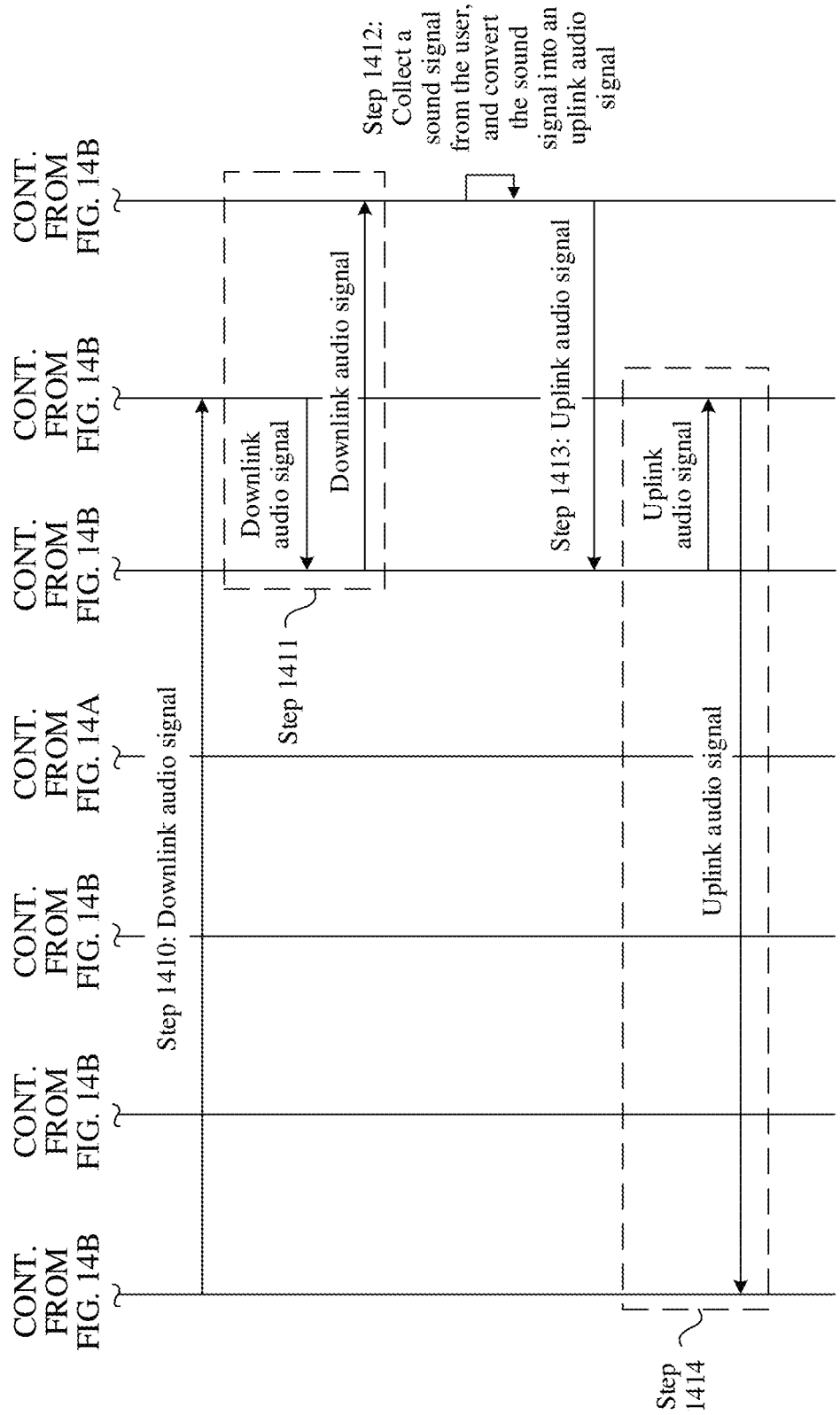

Referring to FIG. 14A to FIG. 14C, the call answer method provided in the embodiments is described with reference to FIG. 13 by using an example in which the first electronic device 101 (for example, a mobile phone 1) is used as a called device and a mobile phone 2 is used as a called device. The method may include the following steps.

The mobile phone 1 establishes a Bluetooth link to the notebook computer according to a Bluetooth protocol.

Step 1401: A call module included in a handoff service of the mobile phone 1 monitors call request information sent by the mobile phone 2.

For example, the call module included in the handoff service of the mobile phone 1 may monitor a call status such as an incoming call. After a user of the mobile phone 2 expects to call a user of the mobile phone 1, and performs dialing on the mobile phone 2, the mobile phone 2 may send the call request information to the mobile phone 1. In this case, the call module may monitor the call request information.

Step 1402: The call module included in the handoff service of the mobile phone 1 notifies a call application of the mobile phone 1, and the call application provides an incoming call reminder by accessing a related service provided by an application framework layer.

For example, the call application accesses a view system, to display an incoming call reminder interface on a display of the mobile phone 1. For another example, the call application accesses a notification manager, so that the mobile phone 1 plays a prompt tone and vibrates, and an indicator light blinks.

Step 1403: The call module included in the handoff service of the mobile phone 1 transmits the call request information to a connection management module included in the handoff service. The connection management module transmits, through the Bluetooth link, the call request information to a peripheral device, namely, the notebook computer, connected to the mobile phone 1.

The notebook computer may provide an incoming call reminder in response to the call request information.

Step 1404: The connection management module included in the handoff service of the mobile phone 1 negotiates a voice path with the notebook computer.

For example, the connection management module included in the handoff service of the mobile phone 1 may establish a Wi-Fi link to the notebook computer according to a Wi-Fi protocol. Before establishing the Wi-Fi link, the connection management module included in the handoff service of the mobile phone 1 may negotiate the voice path with the notebook computer, to determine whether to use a Wi-Fi local area network or a P2P connection to transmit an audio signal.

Step 1405: The notebook computer establishes a user datagram protocol (UDP) socket server, and transmits related voice path socket information for establishing the UDP socket server to the connection management module included in the handoff service of the mobile phone 1.

The voice path socket information may include information such as an internet protocol (IP) address of the notebook computer, a port number, and a coding/decoding manner used to transmit an audio signal.

Step 1406: The connection management module included in the handoff service of the mobile phone 1 may transmit the voice path socket information to the call module included in the handoff service. The call module included in the handoff service transmits the voice path socket information to a voice proxy of the mobile phone 1. The voice proxy of the mobile phone 1 may establish a UDP socket port based on the IP address and the port number in the received voice path socket information.

The mobile phone 1 and the notebook computer may transmit audio signals through the established UDP socket port.

After the mobile phone 1 and the notebook computer provide incoming call reminders, the user may choose to answer an incoming call on the mobile phone 1 or the notebook computer. In some embodiments, if the user chooses to answer the incoming call on the notebook computer, as shown in FIG. 14A to FIG. 14C, the call answer method may further include the following steps.

Step 1407: The notebook computer receives an incoming call answer operation of the user.

Step 1408: In response to the incoming call answer operation of the user, the notebook computer sends an answer command to the connection management module included in the handoff service of the mobile phone 1 through the Bluetooth link. The connection management module transmits the answer command to the call module included in the handoff service of the mobile phone 1. The call module sends the answer command to the mobile phone 2, and the mobile phone 1 establishes a connection to the mobile phone 2.

After receiving the answer command, the call module may manage a call status, that is, connect the call. In some embodiments, the call module may further notify the call application of the mobile phone 1. The call application may display a call interface on the display of the mobile phone 1 by accessing a related service provided by the application framework layer.

Step 1409: The call module included in the handoff service of the mobile phone 1 sends a command of switching the voice path to the notebook computer to the voice proxy of the mobile phone 1. The voice proxy transmits the command of switching the voice path to the notebook computer to Hi-Fi of the mobile phone 1.

The Hi-Fi may determine, according to the command of switching the voice path to the notebook computer, that a subsequently received downlink audio signal needs to be forwarded to the voice proxy, and then the voice proxy forwards the downlink audio signal to the notebook computer for playing.

After the mobile phone 1 establishes the connection to the mobile phone 2, the user of the mobile phone 1 and the user of the mobile phone 2 can talk to each other. The method may specifically include the following steps.

Step 1410: The Hi-Fi of the mobile phone 1 receives a downlink audio signal sent by the mobile phone 2.

Step 1411: The Hi-Fi of the mobile phone 1 transmits the downlink audio signal to the voice proxy of the mobile phone 1. The voice proxy may send the downlink audio signal to the notebook computer through the Wi-Fi link.

For example, the Hi-Fi of the mobile phone 1 may determine, according to the command of switching the voice path to the notebook computer, that the downlink audio signal needs to be transmitted to the voice proxy of the mobile phone 1. The voice proxy may encrypt the received downlink audio signal. The voice proxy may send the encrypted downlink audio signal to the notebook computer through the Wi-Fi link. The notebook computer may convert the received downlink audio signal into a sound signal and play the sound signal.

In some embodiments, the method may further include the following steps.

Step 1412: The notebook computer collects a sound signal from the user, and converts the sound signal into an uplink audio signal.

Step 1413: The voice proxy of the mobile phone 1 receives the uplink audio signal sent by the notebook computer through the Wi-Fi link.

Step 1414: The voice proxy of the mobile phone 1 transmits the uplink audio signal to the Hi-Fi of the mobile phone 1. The Hi-Fi of the mobile phone 1 may send the uplink audio signal to the mobile phone 2.

For example, the voice proxy of the mobile phone 1 may decrypt the received uplink audio signal, and transmit the decrypted uplink audio signal to the Hi-Fi of the mobile phone 1. The Hi-Fi of the mobile phone 1 may code the received uplink audio signal, and then send the coded uplink audio signal to the mobile phone 2 through a network device.

In some other embodiments, during the call between the user of the mobile phone 1 and the user of the mobile phone 2, the user of the mobile phone 1 may further switch the voice path from the notebook computer to the mobile phone 1. For example, the notebook computer receives an operation of the user for switching a call channel from the notebook computer to the mobile phone 1. In response to the operation, the notebook computer sends a call channel switching command to the mobile phone 1. Specifically, the call module included in the handoff service of the mobile phone 1 may receive the call channel switching command. The call module included in the handoff service of the mobile phone 1 transmits the call channel switching command to the voice proxy of the mobile phone 1. The voice proxy transmits the command to the Hi-Fi of the mobile phone 1, so that the Hi-Fi can determine, according to the command, that a downlink audio signal is to be locally played on the mobile phone 1. In this case, if the downlink audio signal is received subsequently, a corresponding sound signal may be directly played locally on the mobile phone 1. In addition, a sound signal from the user is collected locally on the mobile phone 1, and is converted into an uplink audio signal. Then, the uplink audio signal is transmitted to the Hi-Fi of the mobile phone 1. The Hi-Fi may code the uplink audio signal, and then send the coded uplink audio signal to the mobile phone 2 through the network device.

In some other embodiments, the user may alternatively choose to reject the incoming call on the notebook computer. In this case, the notebook computer may receive an incoming call reject operation of the user. The notebook computer may send a reject command to the mobile phone 1 through the Bluetooth link in response to the operation. Specifically, the connection management module included in the handoff service of the mobile phone 1 may receive the reject command sent by the notebook computer through the Bluetooth link. The connection management module transmits the reject command to the call module included in the handoff service of the mobile phone 1, so that the call module manages a call status, that is, rejects the call. The mobile phone 1 may further send the reject command to the mobile phone 2, so that the mobile phone 2 informs the user of the mobile phone 2 that the call is rejected.

In some other embodiments, the user may choose to hang up the call on the notebook computer, to end the call. The notebook computer may receive an incoming call hang-up operation of the user. For example, the operation may be a single-click operation performed by the user through a mouse on a corresponding control (for example, a hang-up button) in an interface displayed on a display device of the notebook computer, or may be a touch operation performed by a finger of the user on the foregoing control (for example, the hang-up button). In response to the operation, the notebook computer may send a hang-up command to the mobile phone 1 through the Bluetooth link. The connection management module included in the handoff service of the mobile phone 1 may receive the hang-up command. The connection management module transmits the hang-up command to the call module included in the handoff service of the mobile phone 1, so that the call module manages a call status, that is, hangs up the call. In another embodiment, the mobile phone 1 may further send the hang-up command to the mobile phone 2, so that the mobile phone 2 informs the user of the mobile phone 2 that the call is hung up. The mobile phone 1 and the mobile phone 2 may be disconnected from each other. In some embodiments, the call module may further notify the call application of the mobile phone 1. The call application may display a call end prompt interface on the display of the mobile phone 1 by accessing a related service provided by the application framework layer. In addition, the voice proxy of the mobile phone 1 may farther destroy the previously established UDP socket port, to release a corresponding resource.

In some other embodiments, the user may alternatively choose to answer the incoming call on the mobile phone 1. In this case, the mobile phone 1 may receive an incoming call answer operation of the user. In response to the operation, the call module included in the handoff service of the mobile phone 1 may manage a call status, that is, connect the call. In response to the operation, the mobile phone 1 may further send an answer command to the mobile phone 2, so that the mobile phone 1 establishes a connection to the mobile phone 2, and then the user of the mobile phone 1 and the user of the mobile phone 2 talk to each other based on the established connection. In another embodiment, the mobile phone 1 may also transmit the answer command to the notebook computer, so that the notebook computer informs the user that the incoming call is answered. In addition, the call module included in the handoff service of the mobile phone 1 may further send a command indicating that a voice path is the mobile phone 1 to the voice proxy of the mobile phone 1. The voice proxy transmits the command to the Hi-Fi of the mobile phone 1, so that the Hi-Fi can determine, according to the command, that a downlink audio signal is to be locally played on the mobile phone 1. In other words, when receiving the downlink audio signal, the Hi-Fi of the mobile phone 1 may determine, according to the command, that a corresponding sound signal is to be played locally. After the mobile phone 1 locally collects a sound signal from the user, and converts the sound signal into an uplink audio signal, the Hi-Fi of the mobile phone 1 may code the uplink audio signal and send the coded uplink audio signal to the mobile phone 2.

In some other embodiments, the user may alternatively choose to reject the incoming call on the mobile phone 1. In this case, the mobile phone 1 may receive an incoming call reject operation of the user. In response to the operation, the call module included in the handoff service of the mobile phone 1 manages a call status, that is, rejects the call. The mobile phone 1 may further send a reject command to the mobile phone 2, so that the mobile phone 2 informs the user of the mobile phone 2 that the call is rejected. Optionally, the mobile phone 1 may also transmit the reject command to the notebook computer, so that the notebook computer informs the user that the incoming call is rejected.

According to the technical solutions provided in this embodiment, after the user chooses to answer the incoming call on the notebook computer, the mobile phone 1 may transmit an audio signal in a call process to the notebook computer through the Wi-Fi link established between the mobile phone 1 and the notebook computer. The call is implemented through the peripheral device, and an audio signal with a larger amount of data can be transmitted through the Wi-Fi link. Therefore, call requirements in more scenarios are met. Moreover, call efficiency and call quality are improved. In addition, when the notebook computer further establishes a Bluetooth link to a peripheral device such as a Bluetooth headset or a Bluetooth keyboard according to a Bluetooth protocol to transmit data, the mobile phone 1 and the notebook computer transmit audio signals through the Wi-Fi link established according to the Wi-Fi protocol. This can avoid interference to the peripheral device such as the Bluetooth headset or the Bluetooth keyboard connected to the notebook computer. Control signaling is transmitted through the Bluetooth link established between the mobile phone 1 and the notebook computer, so that reliability is high. In addition, because power consumption of the established Bluetooth link is low, a persistent connection may be maintained. Further, in a call process, the user may flexibly select, based on a requirement of the user, a call channel that the user expects to use between the mobile phone 1 and the notebook computer, so that user experience is improved.

Figure 15A:
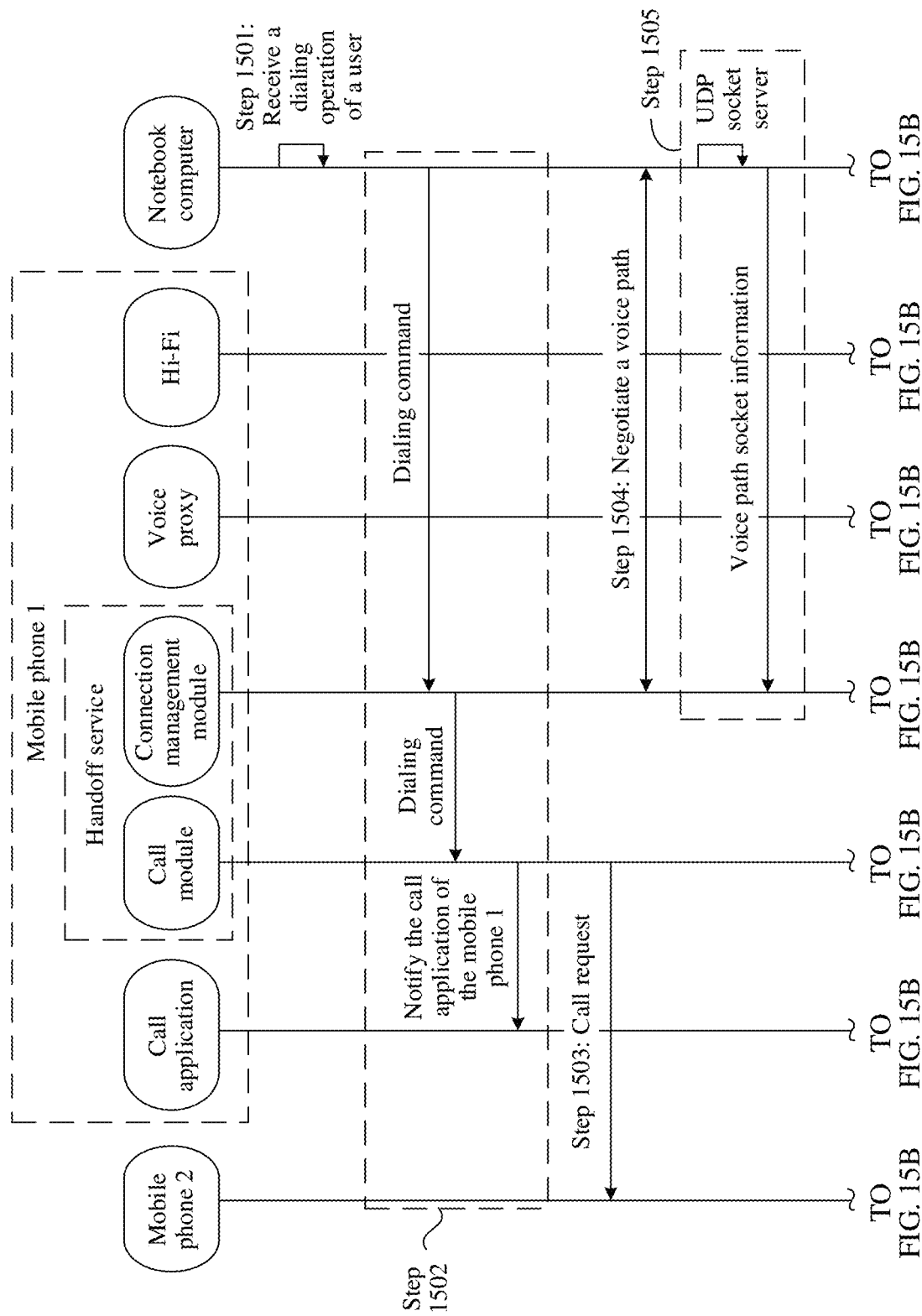
Figure 15B:
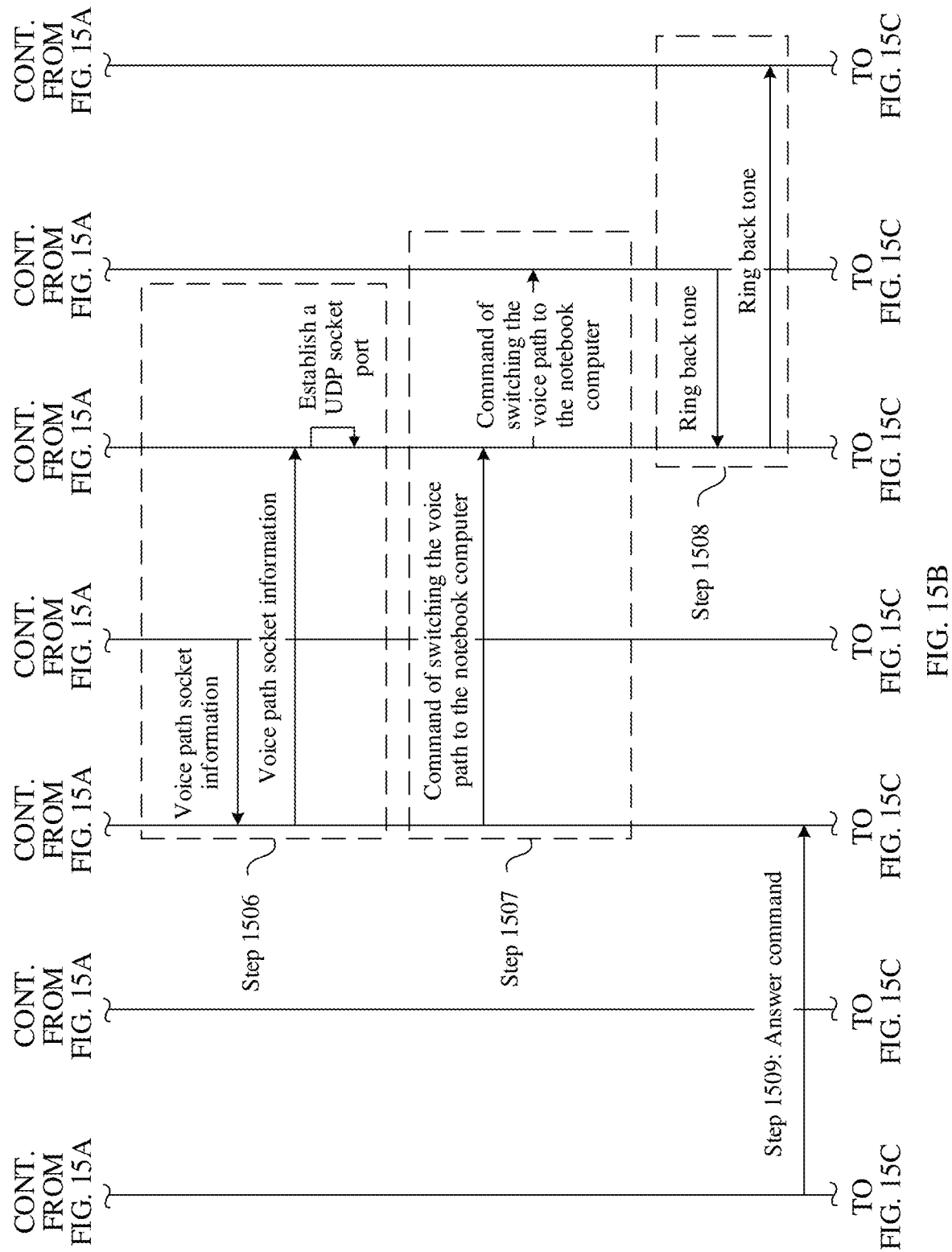

Referring to FIG. 15A to FIG. 15C, the calling method provided in the embodiments is described with reference to FIG. 13 by using an example in which the first electronic device 101 (for example, a mobile phone 1) is used as a calling device, a mobile phone 2 is used as a called device, and a user performs a dialing operation on the second electronic device 102 (for example, a notebook computer) connected to the first electronic device 101. The method may include the following steps.

The mobile phone 1 establishes a Bluetooth link to the notebook computer according to a Bluetooth protocol.

Step 1501: The notebook computer receives the dialing operation of the user.

For example, when the user expects to make a call, the user may perform the dialing operation on the notebook computer. In response to the dialing operation of the user, the notebook computer may send a dialing command to the mobile phone 1 through the Bluetooth link.

Step 1502: A connection management module included in a handoff service of the mobile phone 1 receives the dialing command sent by the notebook computer through the Bluetooth link. The connection management module transmits the dialing command to a call module of the mobile phone 1. The call module may notify a call application of the mobile phone 1, and the call application may display a connection waiting interface by accessing a related service provided by an application framework layer.

Step 1503: The call module included in the handoff service of the mobile phone 1 sends call request information to the mobile phone 2 in response to the dialing command.

Step 1504 to step 1506 are respectively the same as step 1404 to step 1406 in the foregoing embodiment.

Step 1507: The call module included in the handoff service of the mobile phone 1 sends a command of switching the voice path to the notebook computer to the voice proxy of the mobile phone 1. The voice proxy transmits the command of switching the voice path to the notebook computer to Hi-Fi of the mobile phone 1.

The Hi-Fi may subsequently determine, according to the command, that a downlink audio signal needs to be forwarded to the voice proxy, and then the voice proxy forwards the downlink audio signal to the notebook computer for playing.

Step 1508: The Hi-Fi of the mobile phone 1 receives a ring back tone. The Hi-Fi of the mobile phone 1 transmits the ring back tone to the voice proxy of the mobile phone 1. The voice proxy of the mobile phone 1 sends the ring back tone to the notebook computer through the Wi-Fi link.

After the mobile phone 1 sends the call request information to the mobile phone 2, if the Hi-Fi of the mobile phone 1 receives the ring back tone, the Hi-Fi of the mobile phone 1 may transmit the ring back tone to the voice proxy of the mobile phone 1 according to the command of switching the voice path to the notebook computer. The voice proxy of the mobile phone 1 may encrypt the ring back tone, and send the encrypted ring back tone to the notebook computer through the Wi-Fi link.

A user of the mobile phone 2 may choose to answer or reject an incoming call. In some embodiments, if the user of the mobile phone 2 answers the incoming call, as shown in FIG. 15A to FIG. 15C, the calling method may further include the following steps.

Step 1509: The call module included in the handoff service of the mobile phone 1 monitors an answer command.

For example, the call module included in the handoff service of the mobile phone 1 may monitor a call status such as an incoming call. After the user of the mobile phone 2 chooses to answer the incoming call, the call module included in the handoff service of the mobile phone 1 may monitor the answer command. The call module included in the handoff service of the mobile phone 1 may further notify the call application of the mobile phone 1 when monitoring the answer command. The call application may display a call interface by accessing a related service provided by the application framework layer. In response to the answer command, the mobile phone 1 establishes a connection to the mobile phone 2.

Step 1510: The call module included in the handoff service of the mobile phone 1 transmits the answer command to the connection management module included in the handoff service. The connection management module may transmit the answer command to the notebook computer through the Bluetooth link.

After the mobile phone 1 establishes the connection to the mobile phone 2, the user of the mobile phone 1 and the user of the mobile phone 2 can talk to each other. Specifically, step 1511 to step 1515 may be included. Step 1511 to step 1515 are respectively the same as step 1410 to step 1414 in the foregoing embodiment, and details are not described herein again.

In some embodiments, during the call between the user of the mobile phone 1 and the user of the mobile phone 2, the user of the mobile phone 1 may further switch the voice path from the notebook computer to the mobile phone 1. A specific implementation thereof is the same as that in the specific descriptions of corresponding content in the embodiment shown in FIG. 14A to FIG. 14C, and details are not described herein again.

In some other embodiments, the user may choose to hang up the call on the notebook computer, to end the call. The notebook computer may receive an incoming call hang-up operation of the user. In response to the operation, the notebook computer may send a hang-up command to the mobile phone 1 through the Bluetooth link. The connection management module included in the handoff service of the mobile phone 1 may receive the hang-up command. The connection management module transmits the hang-up command to the call module included in the handoff service of the mobile phone 1, so that the call module manages a call status, that is, hangs up the call. The mobile phone 1 may further send the hang-up command to the mobile phone 2, so that the mobile phone 2 informs the user of the mobile phone 2 that the call is hung up. The mobile phone 1 and the mobile phone 2 may be disconnected from each other. In some embodiments, the call module may further notify the call application of the mobile phone 1. The call application may display a call end prompt interface on a display of the mobile phone 1 by accessing a related service provided by the application framework layer. In addition, the voice proxy of the mobile phone 1 may further destroy the previously established UDP socket port, to release a corresponding resource.

In some other embodiments, if the user of the mobile phone 2 rejects the incoming call, the mobile phone 1 may receive a reject command sent by the mobile phone 2. For example, after the user of the mobile phone 2 chooses to reject the incoming call, the call module included in the handoff service of the mobile phone 1 may monitor the reject command. When monitoring the reject command, the call module included in the handoff service of the mobile phone 1 may transmit the reject command to the connection management module included in the handoff service. The connection management module may transmit the answer command to the notebook computer through the Bluetooth link, so that the notebook computer informs the user that a peer end rejects the call. The call module included in the handoff service of the mobile phone 1 may further notify the call application of the mobile phone 1. The call application may inform, by accessing a related service provided by the application framework layer, the user that the peer end rejects the call.

According to the technical solutions provided in this embodiment, the mobile phone 1 may transmit an audio signal in a call process to the notebook computer through the Wi-Fi link established between the mobile phone 1 and the notebook computer. The call is implemented through a peripheral device, and an audio signal with a larger amount of data can be transmitted through the Wi-Fi link. Therefore, call requirements in more scenarios are met. Moreover, call efficiency and call quality are improved. In addition, when the notebook computer further establishes a Bluetooth link to a peripheral device such as a Bluetooth headset or a Bluetooth keyboard according to a Bluetooth protocol to transmit data, the mobile phone 1 and the notebook computer transmit audio signals through the Wi-Fi link established according to the Wi-Fi protocol. This can avoid interference to the peripheral device such as the Bluetooth headset or the Bluetooth keyboard connected to the notebook computer. In the technical solutions provided in this embodiment, control signaling is transmitted through the Bluetooth link established between the mobile phone 1 and the notebook computer, so that reliability is high. In addition, because power consumption of the established Bluetooth link is low, a persistent connection may be maintained.

Further, it should be noted that, in this embodiment, the mobile phone 1 may alternatively not establish the Bluetooth link to the notebook computer. In this case, control signaling such as the dialing command, the answer command, or the reject command may be transmitted through the Wi-Fi link established between the mobile phone 1 and the notebook computer.

It should be understood that descriptions of technical features, technical solutions, or similar words in this application do not imply that all features can be implemented in any individual embodiment. Further, the technical features and the technical solutions described in the embodiments may be combined in any proper manner.

Figure 16A:
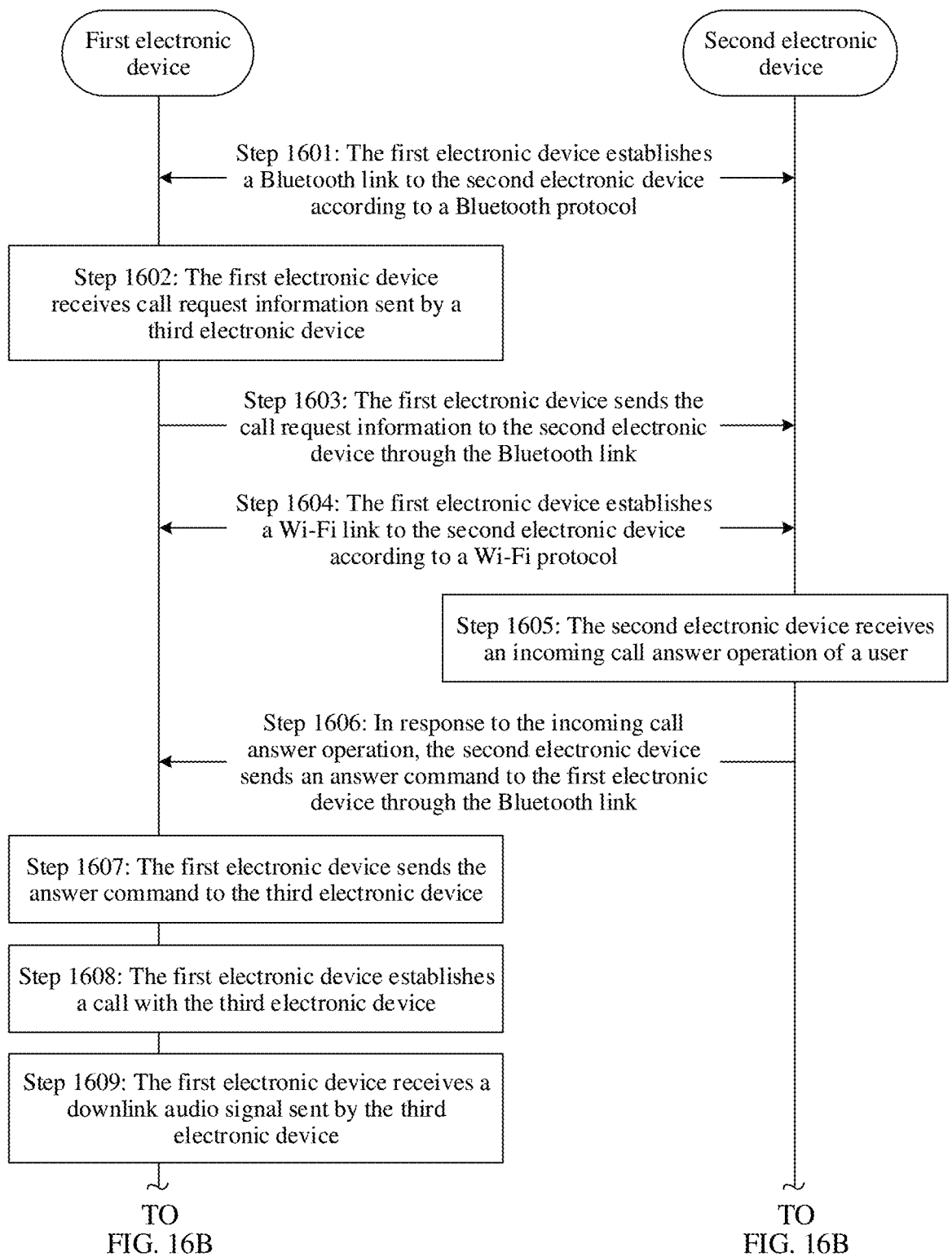
FIG. 16A and FIG. 16B are a schematic flowchart of another call answer method according to another embodiment.
Figure 16B:
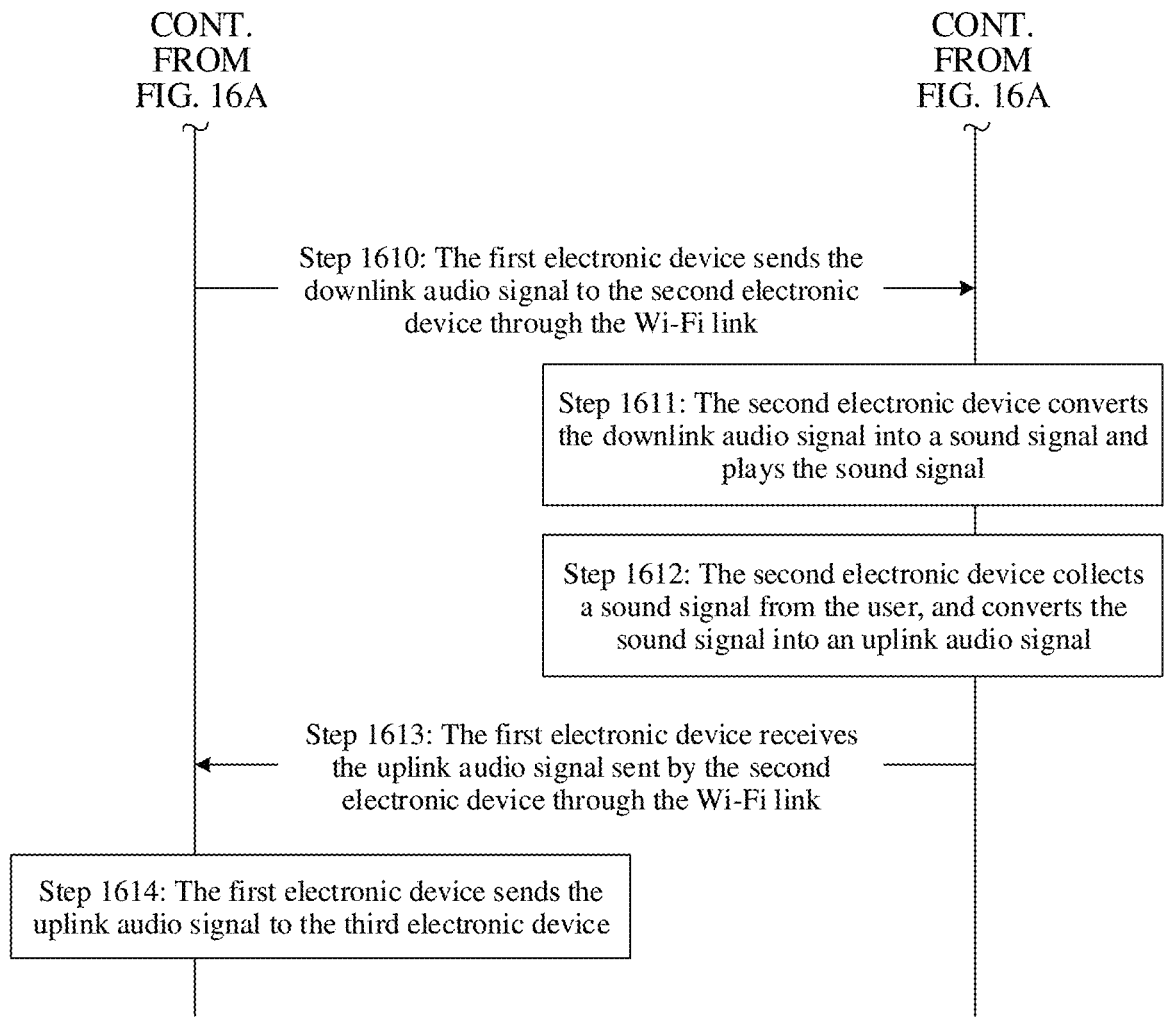

With reference to the foregoing embodiments and corresponding accompanying drawings, another embodiment of this application provides a call answer method. The method may be implemented in a first electronic device that has the hardware structure shown in FIG. 2 or the software architecture shown in FIG. 13. As shown in FIG. 16A and FIG. 16B, the method may include the following steps.

Step 1601: The first electronic device establishes a Bluetooth link to a second electronic device according to a Bluetooth protocol.

Step 1602: The first electronic device receives call request information sent by a third electronic device.

Step 1603: The first electronic device sends the call request information to the second electronic device through the Bluetooth link.

Step 1604: The first electronic device establishes a Wi-Fi link to the second electronic device according to a Wi-Fi protocol.

In some embodiments, a user may choose to answer an incoming call on the second electronic device. For example, the method includes the following steps.

Step 1605: The second electronic device receives an incoming call answer operation of the user.

Step 1606: In response to the incoming call answer operation, the second electronic device sends an answer command to the first electronic device through the Bluetooth link.

Step 1607: The first electronic device sends the answer command to the third electronic device.

Step 1608: The first electronic device establishes a call with the third electronic device.

Step 1609: The first electronic device receives a downlink audio signal sent by the third electronic device.

Step 1610: The first electronic device sends the downlink audio signal to the second electronic device through the Wi-Fi link.

Step 1611: The second electronic device converts the downlink audio signal into a sound signal and plays the sound signal.

In some other embodiments, the method may further include the following steps.

Step 1612: The second electronic device collects a sound signal from the user, and converts the sound signal into an uplink audio signal.

Step 1613: The first electronic device receives the uplink audio signal sent by the second electronic device through the Wi-Fi link.

Step 1614: The first electronic device sends the uplink audio signal to the third electronic device.

In this way, after the user chooses to answer the incoming call on the second electronic device, the first electronic device may transmit an audio signal in a call process to the second electronic device through the Wi-Fi link established between the first electronic device and the second electronic device. The call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference to the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

Figure 17:
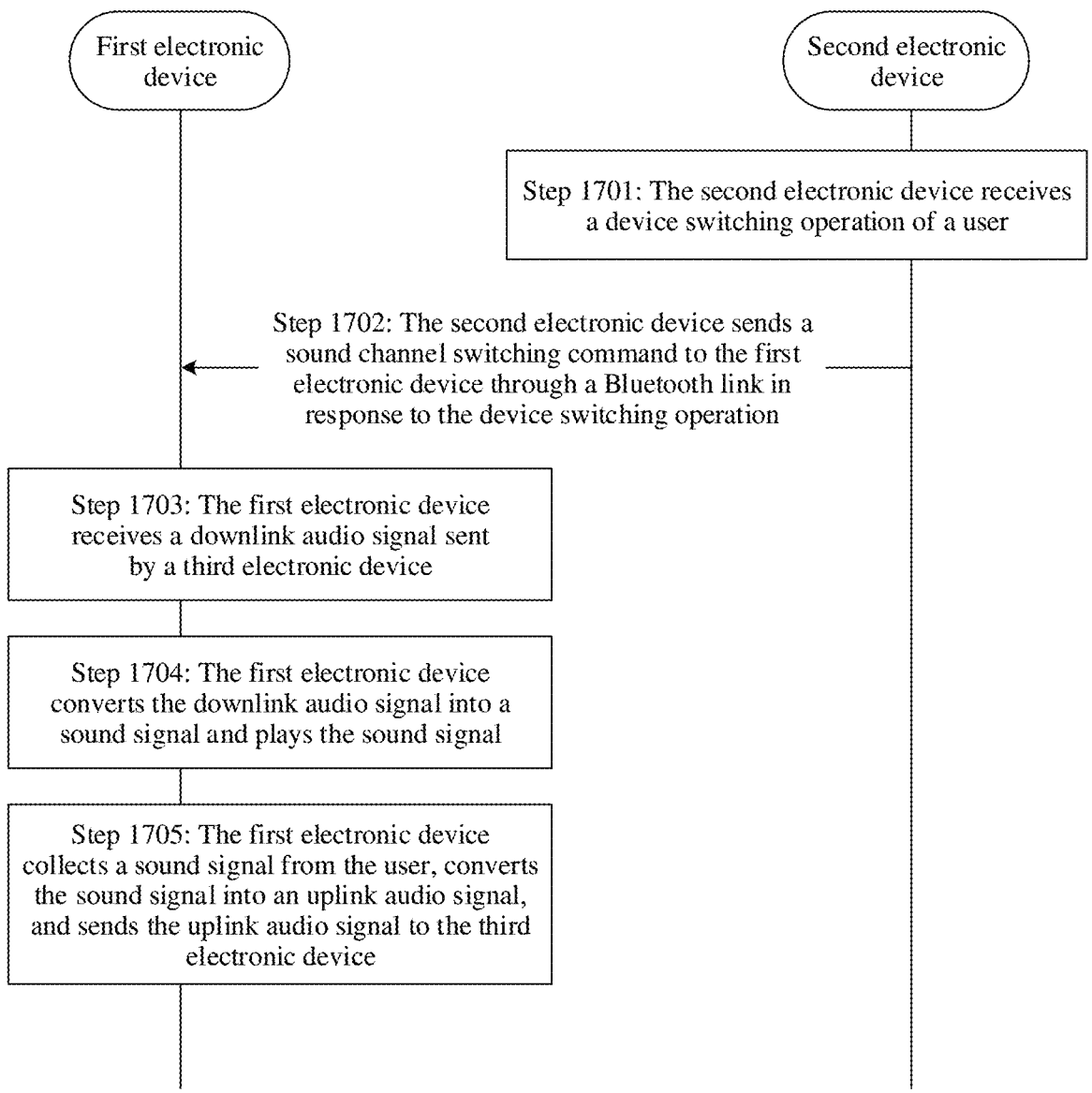
FIG. 17 is a schematic flowchart of still another call answer method according to another embodiment.

In some embodiments, as shown in FIG. 17, the method may further include the following steps.

Step 1701: The second electronic device receives a device switching operation of the user.

After the second electronic device receives the incoming call answer operation, the second electronic device may further display a first interface in response to the incoming call answer operation. The first interface may include a device switching button. In this case, that the second electronic device receives a device switching operation of the user may specifically include the second electronic device receives a trigger operation performed by the user on the device switching button. For example, with reference to FIG. 9A and FIG. 9B in the foregoing embodiment, the first interface may be a call interface including the answer mode selection interface 902. The device switching button may be the option button 903 corresponding to the mobile phone 1.

Step 1702: The second electronic device sends a sound channel switching command to the first electronic device through the Bluetooth link in response to the device switching operation.

Step 1703: The first electronic device receives a downlink audio signal sent by the third electronic device.

Step 1704: The first electronic device converts the downlink audio signal into a sound signal and plays the sound signal.

In some other embodiments, the method may further include the following step.

Step 1705: The first electronic device collects a sound signal from the user, converts the sound signal into an uplink audio signal, and sends the uplink audio signal to the third electronic device.

In this way, in a call process, the user may flexibly select, based on a requirement of the user, a call channel that the user expects to use between the first electronic device and the second electronic device, so that user experience is improved.

Figure 18:
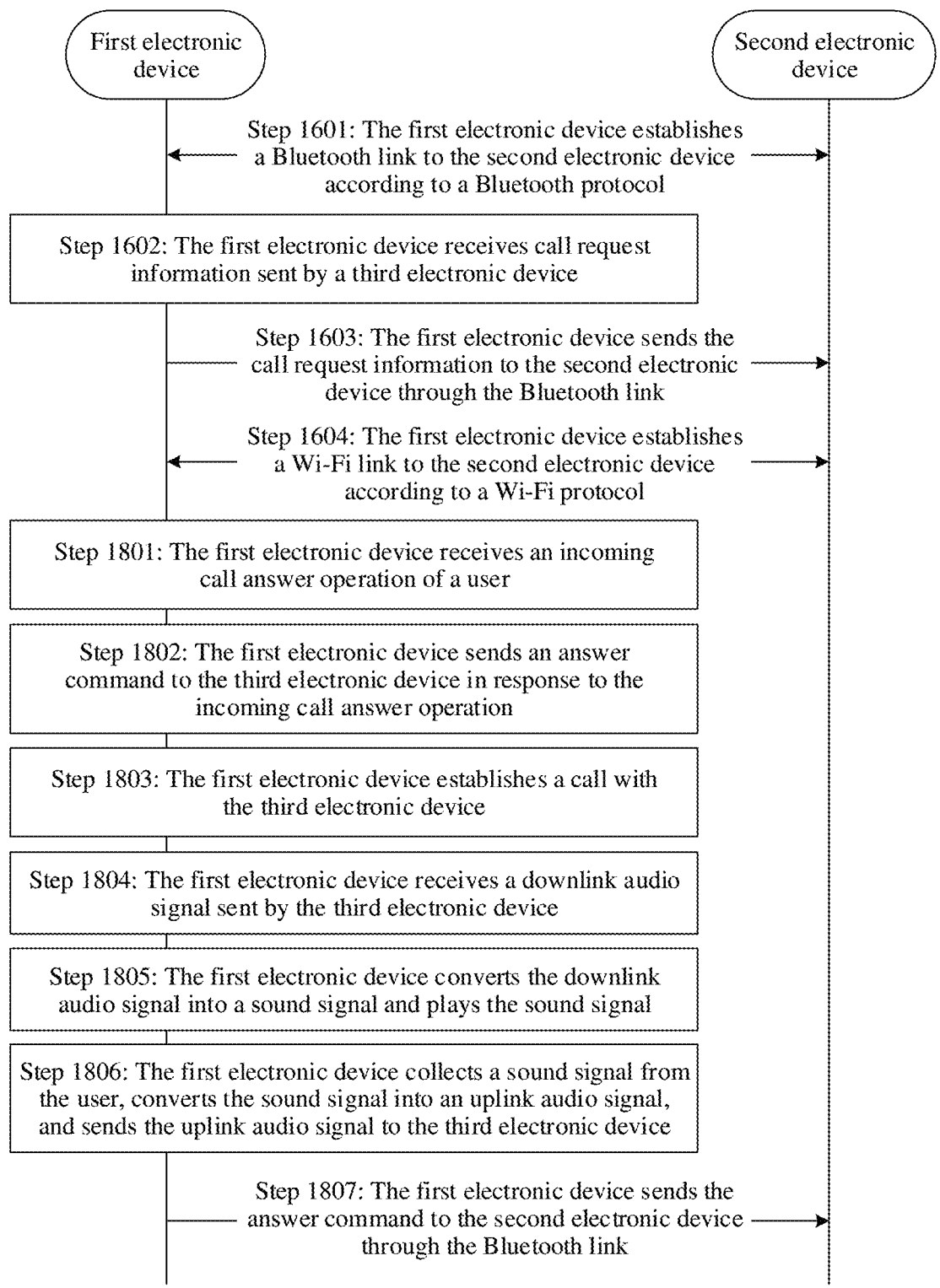
FIG. 18 is a schematic flowchart of still another call answer method according to another embodiment.

In some other embodiments, a user may choose to answer an incoming call on the first electronic device. As shown in FIG. 18, the method may further include the following steps.

Step 1801: The first electronic device receives an incoming call answer operation of the user.

Step 1802: The first electronic device sends an answer command to the third electronic device in response to the incoming call answer operation.

Step 1803: The first electronic device establishes a call with the third electronic device.

Step 1804: The first electronic device receives a downlink audio signal sent by the third electronic device.

Step 1805: The first electronic device converts the downlink audio signal into a sound signal and plays the sound signal.

In some other embodiments, the method may further include the following step.

Step 1806: The first electronic device collects a sound signal from the user, converts the sound signal into an uplink audio signal, and sends the uplink audio signal to the third electronic device.

In some embodiments, the method may further include step 1807: The first electronic device sends the answer command to the second electronic device through the Bluetooth link.

After receiving the answer command, the second electronic device may display a call interface. In this way, a call status on the second electronic device may be synchronized with a call status on the first electronic device.

Figure 19:
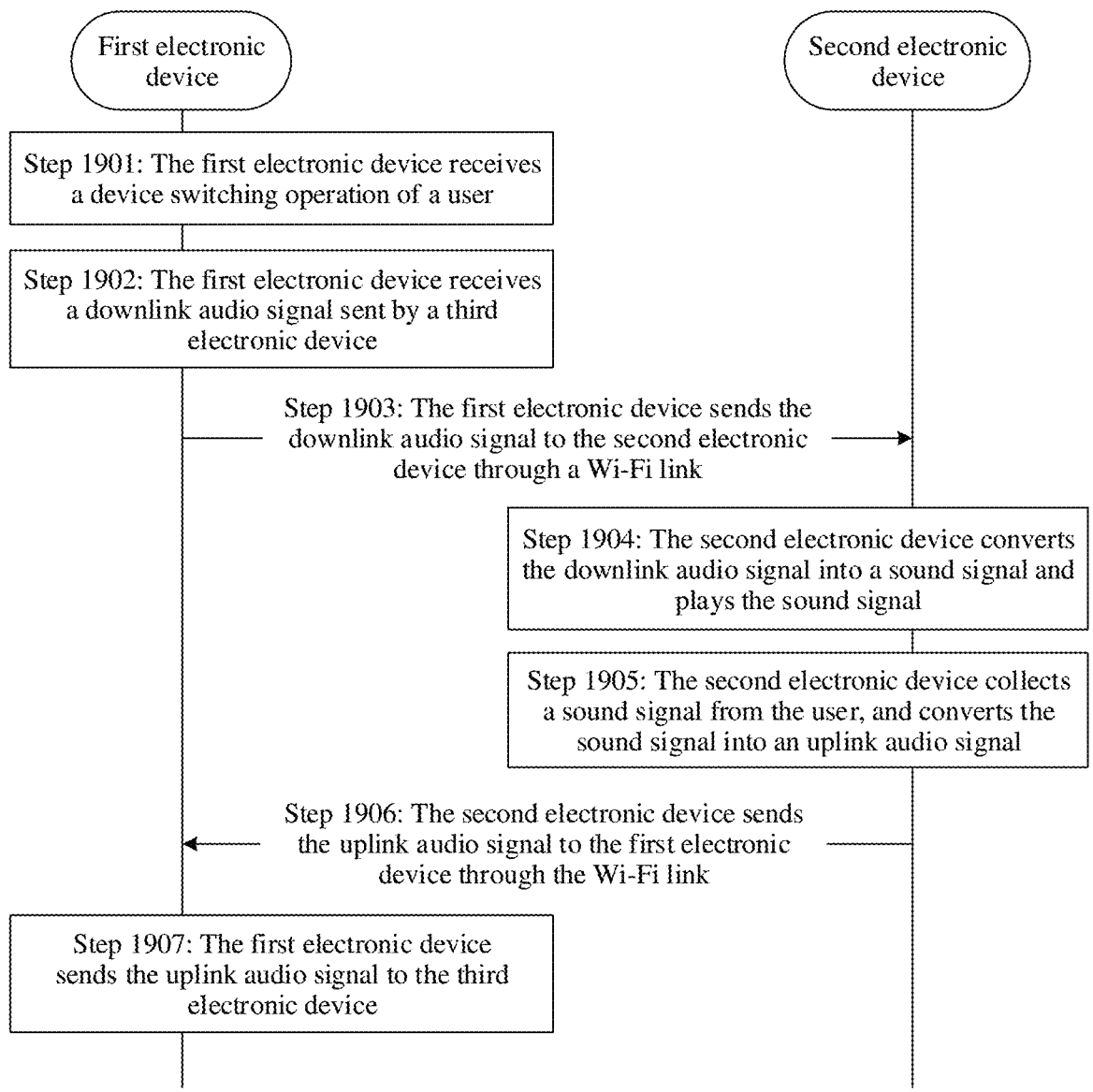
FIG. 19 is a schematic flowchart of still another call answer method according to another embodiment.

In some other embodiments, as shown in FIG. 19, the method may further include the following steps.

Step 1901: The first electronic device receives a device switching operation of the user.

Specifically, the first electronic device displays a first interface in response to the incoming call answer operation. The first interface includes a device switching button. That the first electronic device receives a device switching operation of the user may specifically include the first electronic device receives a trigger operation performed by the user on the device switching button. For example, with reference to FIG. 10A and FIG. 10B in the foregoing embodiment, the first interface may be a call interface including the answer mode selection interface 1002. The device switching button may be the option button 1003 corresponding to the notebook computer.

Step 1902: The first electronic device receives a downlink audio signal sent by the third electronic device.

Step 1903: The first electronic device sends the downlink audio signal to the second electronic device through the Wi-Fi link.

Step 1904: The second electronic device converts the downlink audio signal into a sound signal and plays the sound signal.

In some other embodiments, the method may further include the following steps.

Step 1905: The second electronic device collects a sound signal from the user, and converts the sound signal into an uplink audio signal.

Step 1906: The second electronic device sends the uplink audio signal to the first electronic device through the Wi-Fi link.

Step 1907: The first electronic device sends the uplink audio signal to the third electronic device.

In some other embodiments, a user may alternatively choose to reject an incoming call on the second electronic device. The method may further include the second electronic device receives an incoming call reject operation of the user. In response to the incoming call reject operation, the second electronic device sends a reject command to the first electronic device through the Bluetooth link. The first electronic device sends the reject command to the third electronic device. In some other embodiments, a user may alternatively choose to reject an incoming call on the first electronic device. The method further includes the first electronic device receives an incoming call reject operation of the user. In response to the incoming call reject operation, the first electronic device sends a reject command to the third electronic device. The first electronic device sends the reject command to the second electronic device through the Bluetooth link. In some other embodiments, the user may further choose to hang up the call on the first electronic device or the second electronic device, to end the call.

It should be noted that, for specific descriptions of the steps in FIG. 16A and FIG. 16B to FIG. 19, refer to the specific descriptions of corresponding content in the embodiments shown in any one of FIG. 4*a* and FIG. 4*b* to FIG. 8 and FIG. 14A to FIG. 14C. Details are not described in this embodiment again.

Figure 20A:
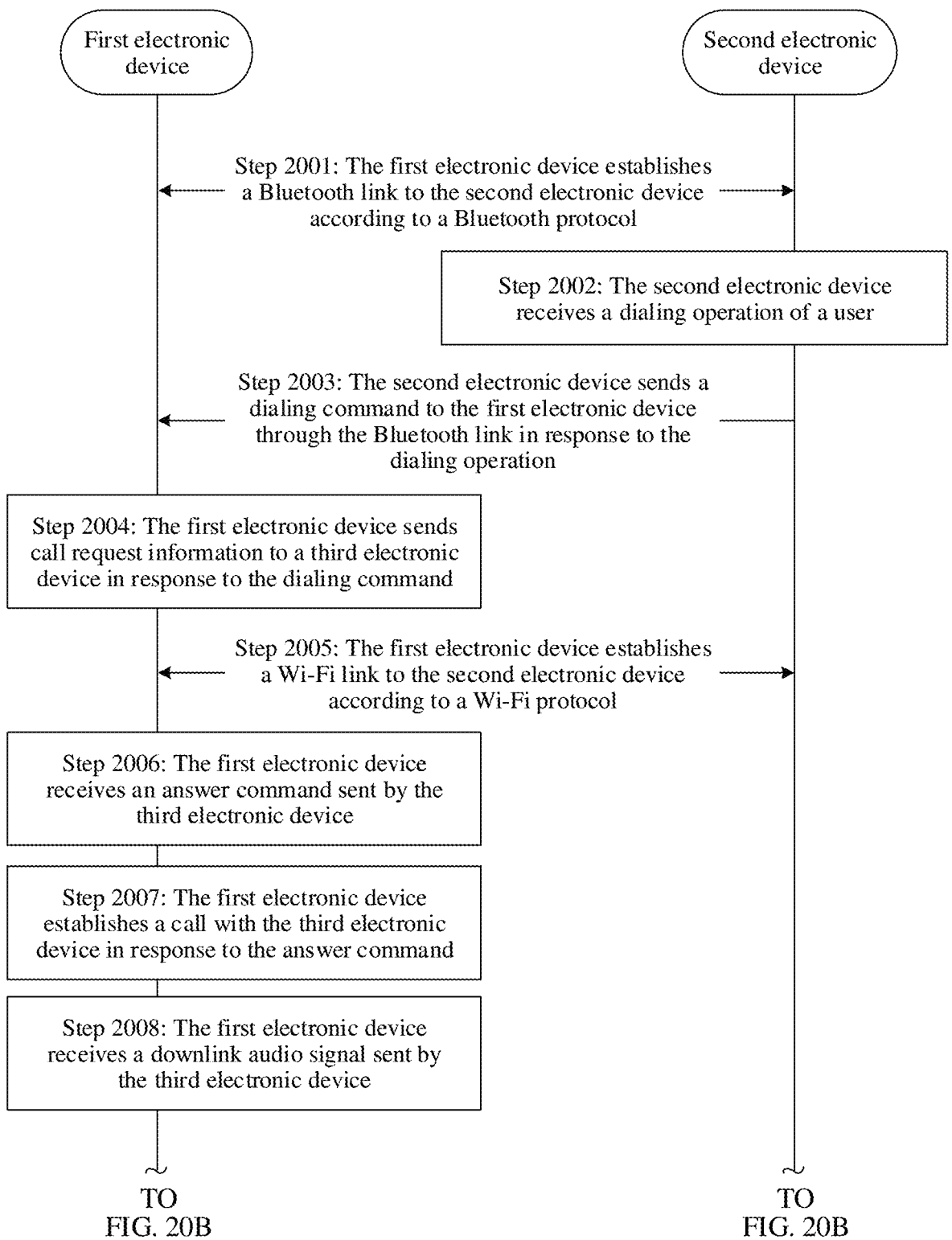

With reference to the foregoing embodiments and corresponding accompanying drawings, another embodiment of this application provides a calling method. The method may be implemented in a first electronic device that has the hardware structure shown in FIG. 2 or the software architecture shown in FIG. 13. As shown in FIG. 20A and FIG. 20B, the method may include the following steps.

Step 2001: The first electronic device establishes a Bluetooth link to a second electronic device according to a Bluetooth protocol.

Step 2002: The second electronic device receives a dialing operation of a user.

Step 2003: The second electronic device sends a dialing command to the first electronic device through the Bluetooth link in response to the dialing operation.

Step 2004: The first electronic device sends call request information to a third electronic device in response to the dialing command.

Step 2005: The first electronic device establishes a Wi-Fi link to the second electronic device according to a Wi-Fi protocol.

In some embodiments, a user of the third electronic device may choose to answer an incoming call. After the user chooses to answer the incoming call, the method may include the following steps.

Step 2006: The first electronic device receives an answer command sent by the third electronic device.

Step 2007: The first electronic device establishes a call with the third electronic device in response to the answer command.

Step 2008: The first electronic device receives a downlink audio signal sent by the third electronic device.

Step 2009: The first electronic device sends the downlink audio signal to the second electronic device through the Wi-Fi link.

Step 2010: The second electronic device converts the downlink audio signal into a sound signal and plays the sound signal.

In some other embodiments, the method may further include the following steps.

Step 2011: The second electronic device collects a sound signal from the user, and converts the sound signal into an uplink audio signal.

Step 2012: The first electronic device receives the uplink audio signal sent by the second electronic device through the Wi-Fi link.

Step 2013: The first electronic device sends the uplink audio signal to the third electronic device.

In some other embodiments, the method farther includes the first electronic device sends the answer command to the second electronic device through the Bluetooth link.

In this way, the first electronic device may transmit an audio signal in a call process to the second electronic device through the Wi-Fi link established between the first electronic device and the second electronic device. The call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference to the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

In some other embodiments, the method may further include the second electronic device receives a device switching operation of the user. The second electronic device sends a sound channel switching command to the first electronic device through the Bluetooth link in response to the device switching operation. The first electronic device receives a downlink audio signal sent by the third electronic device. The first electronic device converts the downlink audio signal into a sound signal and plays the sound signal. In some other embodiments, the method may further include the first electronic device collects a sound signal from the user, converts the sound signal into an uplink audio signal, and sends the uplink audio signal to the third electronic device.

In some other embodiments, the user may further re-switch the call from the first electronic device to the second electronic device. In some other embodiments, if a user of the second electronic device chooses to reject the incoming call, the first electronic device may receive a reject command sent by the second electronic device. The first electronic device may send the reject command to the second electronic device through the Bluetooth link.

In this way, in a call process, the user may flexibly select, based on a requirement of the user, a call channel that the user expects to use between the mobile phone 1 and the notebook computer, so that user experience is improved.

It should be noted that, for specific descriptions of the steps in FIG. 20A and FIG. 20B, refer to the specific descriptions of corresponding content in the embodiment shown in FIG. 11A and FIG. 11B and FIG. 12 or FIG. 15A to FIG. 15C. Details are not described in this embodiment again.

Figure 21A:
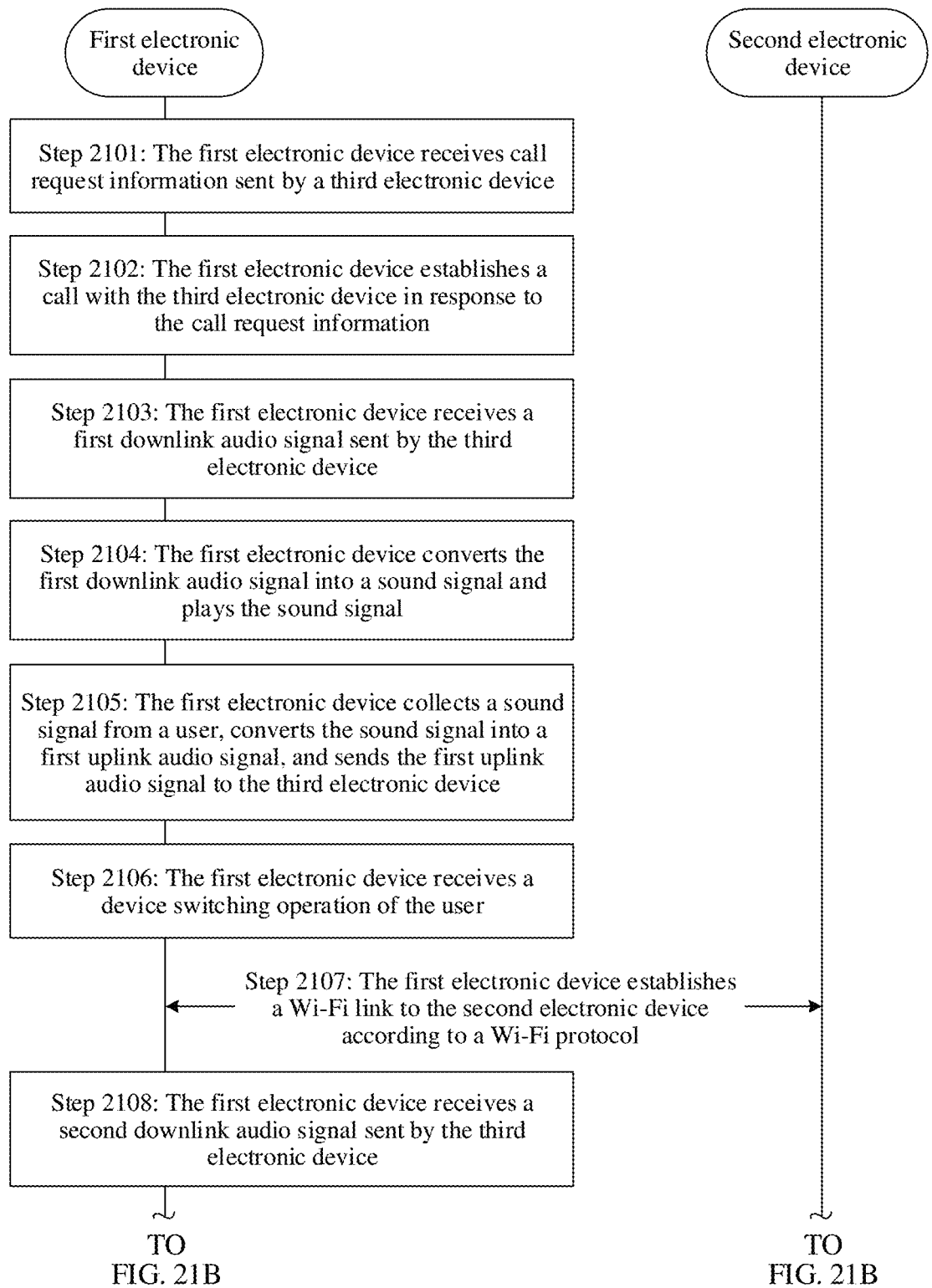
FIG. 21A and FIG. 21B are a schematic flowchart of still another call answer method according to another embodiment.
Figure 21B:
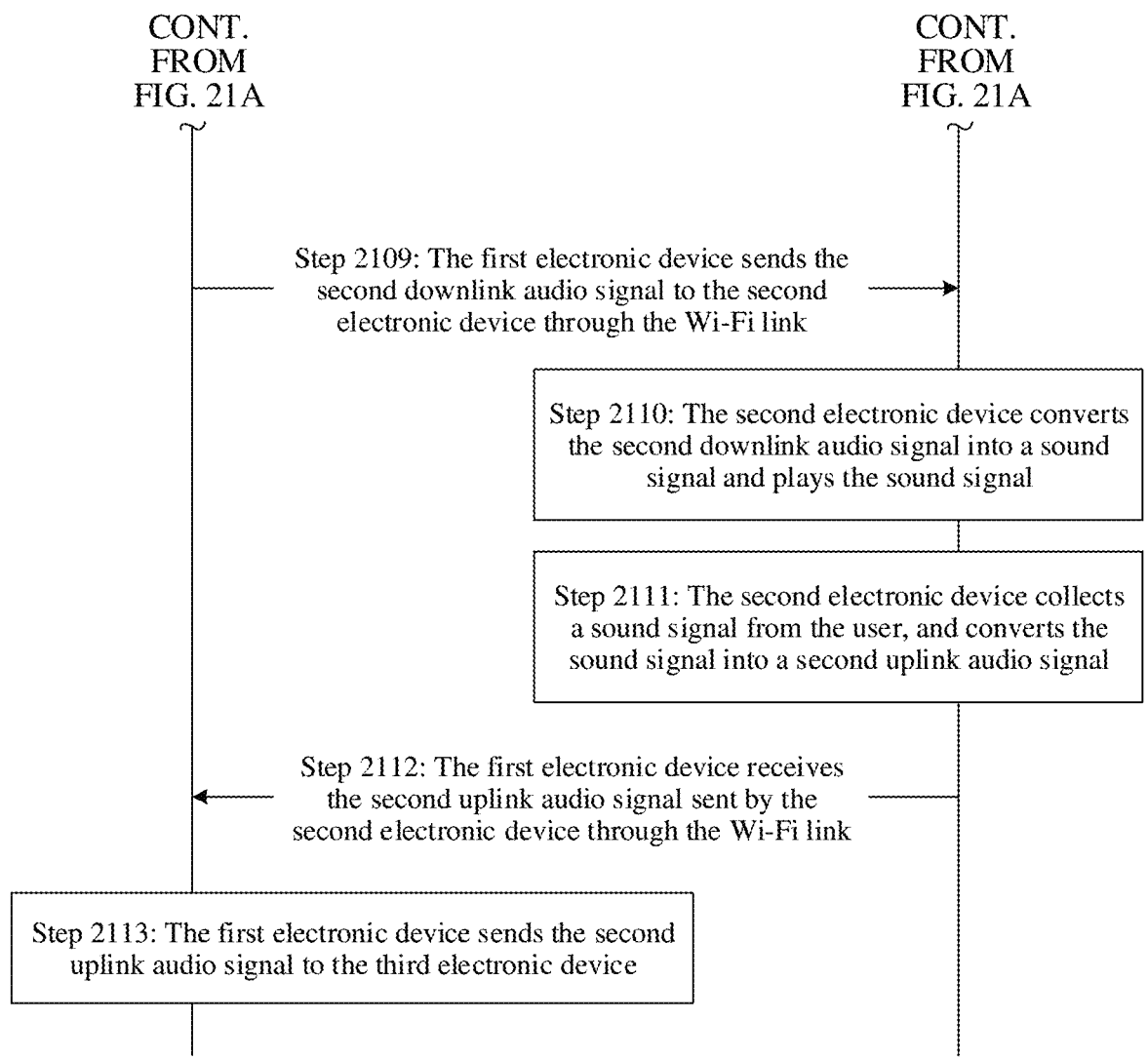

With reference to the foregoing embodiments and corresponding accompanying drawings, another embodiment of this application provides a call answer method. The method may be implemented in a first electronic device that has the hardware structure shown in FIG. 2 or the software architecture shown in FIG. 13. As shown in FIG. 21A and FIG. 21B, the method may include the following steps.

Step 2101: The first electronic device receives call request information sent by a third electronic device.

Step 2102: The first electronic device establishes a call with the third electronic device in response to the call request information.

Step 2103: The first electronic device receives a first downlink audio signal sent by the third electronic device.

Step 2104: The first electronic device converts the first downlink audio signal into a sound signal and plays the sound signal.

In some other embodiments, the method may further include step 2205.

Step 2105: The first electronic device collects a sound signal from a user, converts the sound signal into a first uplink audio signal, and sends the first uplink audio signal to the third electronic device.

Step 2106: The first electronic device receives a device switching operation of the user.

Step 2107: The first electronic device establishes a Wi-Fi link to a second electronic device according to a Wi-Fi protocol.

Step 2107 may be performed after step 2106. In other words, the first electronic device may establish the Wi-Fi link to the second electronic device according to the Wi-Fi protocol in response to the device switching operation. Alternatively, step 2107 may be performed before step 2106. In this way, a delay of establishing the Wi-Fi link can be avoided, and a data loss in a call process can be avoided.

Step 2108: The first electronic device receives a second downlink audio signal sent by the third electronic device.

Step 2109: The first electronic device sends the second downlink audio signal to the second electronic device through the Wi-Fi link.

Step 2110: The second electronic device converts the second downlink audio signal into a sound signal and plays the sound signal.

In some other embodiments, the method may further include step 2111 to step 2113.

Step 2111: The second electronic device collects a sound signal from the user, and converts the sound signal into a second uplink audio signal.

Step 2112: The first electronic device receives the second uplink audio signal sent by the second electronic device through the Wi-Fi link.

Step 2113: The first electronic device sends the second uplink audio signal to the third electronic device.

In this way, the first electronic device may transmit an audio signal in a call process to the second electronic device through the Wi-Fi link established between the first electronic device and the second electronic device. The call is implemented through a peripheral device, and an audio signal with a larger amount of data can be transmitted through the Wi-Fi link. Therefore, call requirements in more scenarios are met. Moreover, call efficiency and call quality are improved. In addition, when the second electronic device further establishes a Bluetooth link to a peripheral device such as a Bluetooth headset or a Bluetooth keyboard according to a Bluetooth protocol to transmit data, the first electronic device and the second electronic device transmit audio signals through the Wi-Fi link established according to the Wi-Fi protocol. This can avoid interference to the peripheral device such as the Bluetooth headset or the Bluetooth keyboard connected to the second electronic device. Further, in the technical solutions provided in this embodiment, control signaling is transmitted through the Bluetooth link established between the first electronic device and the second electronic device, so that reliability is high. In addition, because power consumption of the established Bluetooth link is low, a persistent connection may be maintained.

It can be understood that, to implement the foregoing functions, the electronic device (for example, the first electronic device or the second electronic device) includes corresponding hardware structures and/or software modules for performing the functions. A person skilled in the art should easily be aware that, in combination with the examples described in the embodiments disclosed in this specification, units and algorithm steps can be implemented by hardware or a combination of hardware and computer software in the embodiments. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments.

The embodiments further provide an electronic device for implementing the foregoing method embodiments. Specifically, the electronic device may be divided into function modules. For example, each function module may be obtained through division based on each function, or two or more functions may be integrated into one processing module. The integrated module may be implemented in a form of hardware, or may be implemented in a form of a software function module. It should be noted that, in the embodiments, division into modules is an example, and is merely logical function division. In actual implementation, there may be another division manner.

Figure 22:
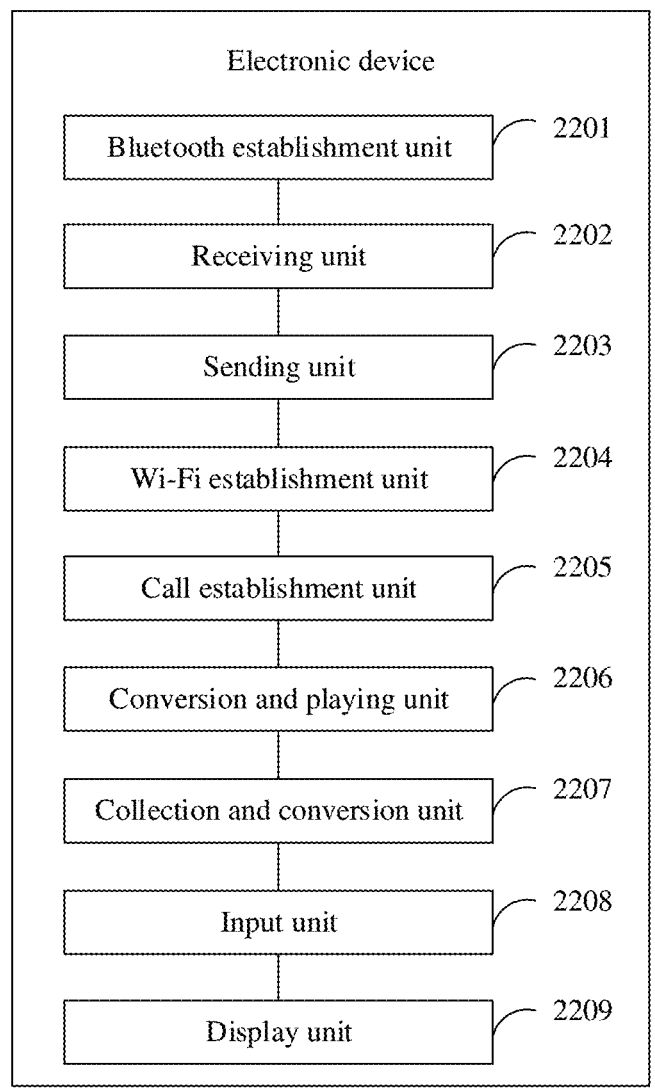
FIG. 22 is a schematic structural diagram of an electronic device according to another embodiment.

When each function module is obtained through division based on each corresponding function, FIG. 22 is a possible schematic structural diagram of the electronic device in the foregoing embodiments. The electronic device may be the foregoing first electronic device. The electronic device may include a Bluetooth establishment unit 2201, a receiving unit 2202, a sending unit 2203, a Wi-Fi establishment unit 2204, and a call establishment unit 2205.

The Bluetooth establishment unit 2201 is configured to support the electronic device in performing step 401, step 1101, step 1601, and step 2001 in the foregoing embodiments, and/or another process of the technology described in this specification.

The receiving unit 2202 is configured to support the electronic device in performing step 402, step 409, step 604, step 1106, step 1108, step 1201, step 1602, step 1609, step 1703, step 1804, step 1902, step 2006, step 2008, step 2101, step 2103, and step 2108 in the foregoing embodiments, and/or another process of the technology described in this specification.

The sending unit 2203 is configured to support the electronic device in performing step 403, step 408, step 410, step 414, step 503, step 602, step 603, step 607, step 702, step 703, step 1104, step 1107, step 1109, step 1113, step 1202, step 1603, step 1607, step 1610, step 1614, step 1802, step 1807, step 1903, step 1907, step 2004, step 2009, step 2013, step 2109, and step 2113 in the foregoing embodiments, and/or another process of the technology described in this specification.

The Wi-Fi establishment unit 2204 is configured to support the electronic device in performing step 405, step 1105, step 1604, step 2005, and step 2107 in the foregoing embodiments, and/or another process of the technology described in this specification.

The call establishment unit 2205 is configured to support the electronic device in performing step 1608, step 1803, step 2007, and step 2102 in the foregoing embodiments, and/or another process of the technology described in this specification.

Further, as shown in FIG. 22, the electronic device may further include a conversion and playing unit 2206 or a collection and conversion unit 2207.

The conversion and playing unit 2206 is configured to support the electronic device in performing step 605, step 1704, step 1805, and step 2104 in the foregoing embodiments, and/or another process of the technology described in this specification.

The collection and conversion unit 2207 is configured to support the electronic device in performing step 606, the operation of collecting a sound signal and converting the sound signal into an audio signal in step 1705, the operation of collecting a sound signal and converting the sound signal into an audio signal in step 1806, and the operation of collecting a sound signal and converting the sound signal into an audio signal in step 2105 in the foregoing method embodiments, and/or another process of the technology described in this specification.

Further, as shown in FIG. 22, the electronic device may further include an input unit 2208.

The input unit 2208 is configured to receive input, such as touch input, voice input, gesture input, or a floating operation, of a user in a display interface of the electronic device. The input unit 2208 is configured to support the electronic device in performing step 601, step 701, step 1801, step 1901, and step 2106 in the foregoing method embodiments, and/or another process of the technology described in this specification. The input unit 2208 may be a touchscreen, other hardware, or a combination of hardware and software.

Further, as shown in FIG. 22, the electronic device may further include a display unit 2209.

The display unit 2209 is configured to support the electronic device in performing a display operation in the foregoing method embodiments, and/or another process of the technology described in this specification.

All related content of the steps in the foregoing method embodiments may be cited in function descriptions of corresponding function modules. Details are not described herein again.

Certainly, the electronic device includes but is not limited to the unit modules listed above. For example, the electronic device may further include a storage unit configured to store program code and data.

Figure 23:
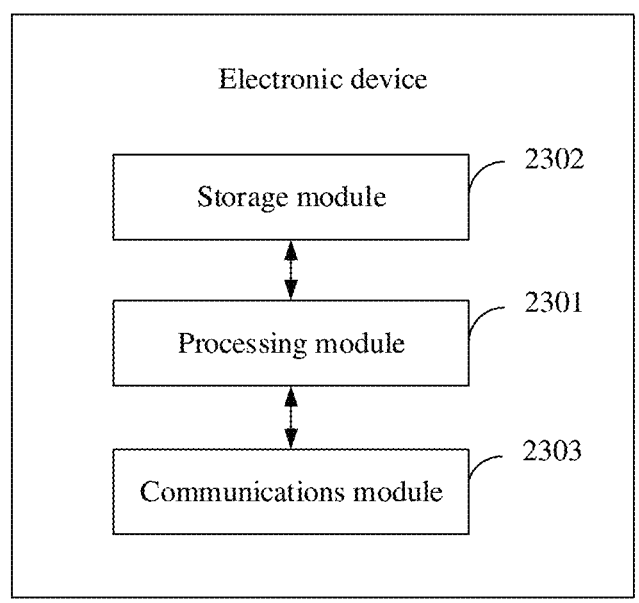
FIG. 23 is a schematic structural diagram of another electronic device according to another embodiment.

When an integrated unit is used, FIG. 23 is a possible schematic structural diagram of the electronic device in the foregoing embodiments. The electronic device may be the foregoing first electronic device. The electronic device may include a processing module 2301, a storage module 2302, and a communications module 2303. The processing module 2301 is configured to control and manage an action of the electronic device. For example, the processing module 2301 is configured to support the electronic device in performing step 605, step 606, step 1704, the operation of collecting a sound signal and converting the sound signal into an audio signal in step 1705, step 1805, the operation of collecting a sound signal and converting the sound signal into an audio signal in step 1806, step 2104, and the operation of collecting a sound signal and converting the sound signal into an audio signal in step 2105 in the foregoing embodiments. The storage module 2302 is configured to store program code and data of the electronic device. The communications module 2303 is configured to support communication between the electronic device and another network entity, to implement functions such as a call, data exchange, and internet access of the electronic device. For example, the communications module 2303 may be configured to support the electronic device in performing step 401, step 402, step 403, step 405, step 408, step 409, step 410, step 414, step 503, step 602, step 603, step 604, step 607, step 702, step 703, step 1101, step 1104, step 1105, step 1106, step 1107, step 1108, step 1109, step 1113, step 1201, step 1202, step 1601, step 1602, step 1603, step 1604, step 1607, step 1608, step 1609, step 1610, step 1614, step 1703, step 1802, step 1803, step 1804, step 1807, step 1902, step 1903, step 1907, step 2001, step 2004, step 2005, step 2006, step 2007, step 2008, step 2009, step 2013, step 2101, step 2102, step 2103, step 2107, step 2108, step 2109, step 2113, and the like in the foregoing embodiments. Further, the electronic device may further include an input module, a display module, and the like. The display module is configured to display content according to an indication of the processing module 2301. The input module may be configured to receive various types of input of the user, such as voice input and gesture input. For example, the input module is configured to support the electronic device in performing step 601, step 701, step 1801, step 1901, step 2106, and the like in the foregoing embodiments.

The processing module 2301 may be a processor or a controller. The communications module 2303 may be a transceiver, an RF circuit, a communications interface, or the like. The storage module 2302 may be a memory. The display module may be a screen or a display. The input module may be a touchscreen, a voice input apparatus, a fingerprint sensor, or the like.

When the processing module 2301 is a processor, the storage module 2302 is a memory, and the communications module 2303 is a communications interface, the electronic device provided in this embodiment may be the electronic device shown in FIG. 2. The communications module 2303 may include not only the RF circuit, but also a Wi-Fi module, an NFC module, and a Bluetooth module. The communications modules such as the RF circuit, the NFC module, the Wi-Fi module, and the Bluetooth module may be collectively referred to as a communications interface. The processor, the RF circuit, the touchscreen, and the memory may be coupled together through a bus.

In addition, in the embodiment shown in FIG. 23, functions of the processing module 2301 may be the same as functions of the conversion and playing unit 2206 and the collection and conversion unit 2207 in the embodiment shown in FIG. 22. Functions of the storage module 2302 may be the same as functions of the storage unit in the embodiment shown in FIG. 22. Functions of the communications module 2303 may be the same as functions of the Bluetooth establishment unit 2201, the receiving unit 2202, the sending unit 2203, the Wi-Fi establishment unit 2204, and the call establishment unit 2205 in the embodiment shown in FIG. 22. Functions of the input module may be the same as functions of the input unit 2208 in the embodiment shown in FIG. 22. Functions of the display module may be the same as functions of the display unit 2209 in the embodiment shown in FIG. 22.

Figure 24:
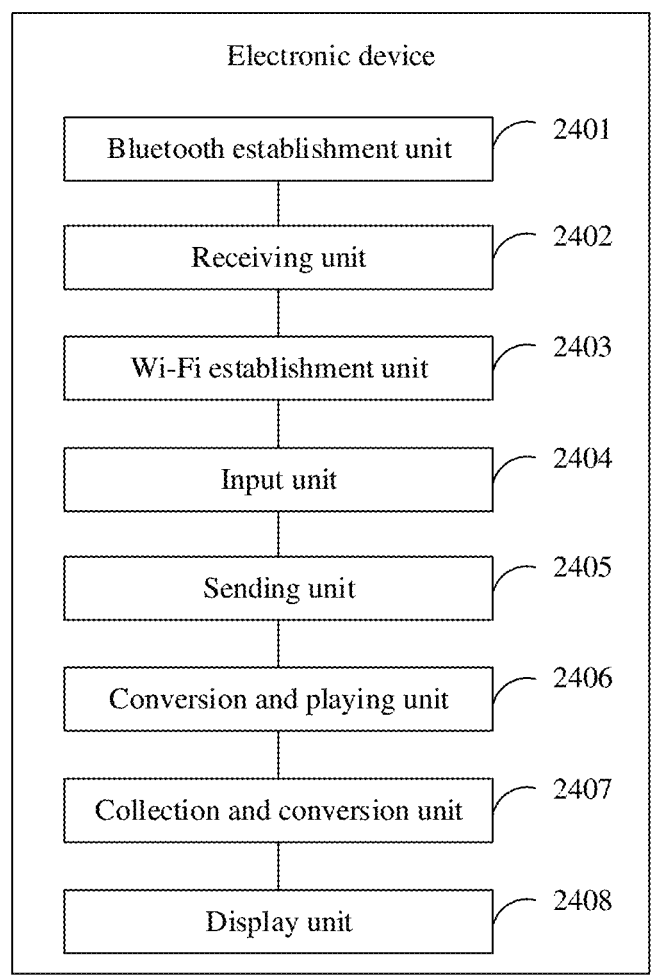
FIG. 24 is a schematic structural diagram of still another electronic device according to another embodiment.

When each function module is obtained through division based on each corresponding function, FIG. 24 is a possible schematic structural diagram of the electronic device in the foregoing embodiments. The electronic device may be the foregoing second electronic device. The electronic device may include a Bluetooth establishment unit 2401, a receiving unit 2402, a Wi-Fi establishment unit 2403, an input unit 2404, a sending unit 2405, a conversion and playing unit 2406, and a collection and conversion unit 2407.

The Bluetooth establishment unit 2401 is configured to support the electronic device in performing step 401, step 1101, step 1601, and step 2001 in the foregoing embodiments, and/or another process of the technology described in this specification.

The receiving unit 2402 is configured to support the electronic device in performing a receive operation in the foregoing embodiments, and/or another process of the technology described in this specification.

The Wi-Fi establishment unit 2403 is configured to support the electronic device in performing step 405, step 1105, step 1604, and step 2005 in the foregoing embodiments, and/or another process of the technology described in this specification.

The input unit 2404 is configured to receive input, such as touch input, voice input, gesture input, or a floating operation, of a user in a display interface of the electronic device. The input unit 2402 is configured to support the electronic device in performing step 406, step 501, step 801, step 1102, step 1605, step 1701, and step 2002 in the foregoing method embodiments, and/or another process of the technology described in this specification. The input unit 2405 may be a touchscreen, other hardware, or a combination of hardware and software.

The sending unit 2405 is configured to support the electronic device in performing step 407, step 413, step 502, step 802, step 1103, step 1112, step 1606, step 1613, step 1702, step 1906, step 2003, step 2012, and step 2112 in the foregoing method embodiments, and/or another process of the technology described in this specification.

The conversion and playing unit 2406 is configured to support the electronic device in performing step 411, step 1110, step 1611, step 1904, step 2010, and step 2110 in the foregoing method embodiments, and/or another process of the technology described in this specification.

The collection and conversion unit 2407 is configured to support the electronic device in performing step 412, step 1111, step 1612, step 1905, step 2011, and step 2111 in the foregoing method embodiments, and/or another process of the technology described in this specification.

Further, as shown in FIG. 24, the electronic device may further include a display unit 2408.

The display unit 2408 is configured to support the electronic device in performing a display operation in the foregoing method embodiments, and/or another process of the technology described in this specification.

All related content of the steps in the foregoing method embodiments may be cited in function descriptions of corresponding function modules. Details are not described herein again.

Certainly, the electronic device includes but is not limited to the unit modules listed above. For example, the electronic device may further include a storage unit configured to store program code and data.

Figure 25:
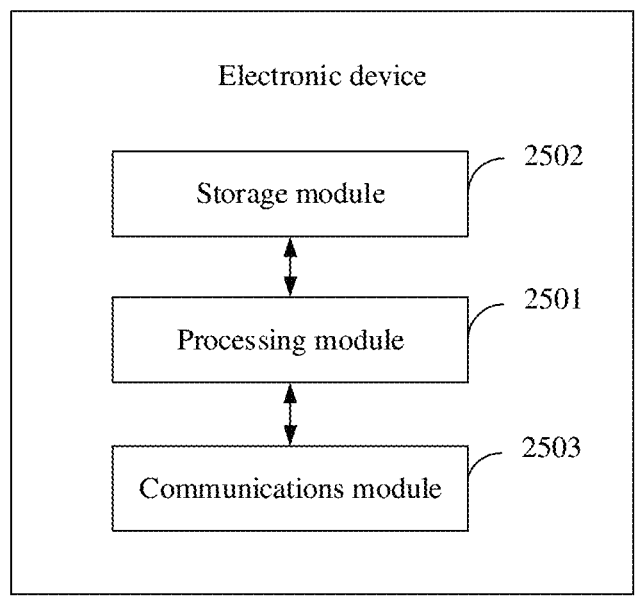
FIG. 25 is a schematic structural diagram of still another electronic device according to another embodiment.

When an integrated unit is used, FIG. 25 is a possible schematic structural diagram of the electronic device in the foregoing embodiments. The electronic device may be the foregoing second electronic device. The electronic device may include a processing module 2501, a storage module 2502, and a communications module 2503. The processing module 2501 is configured to control and manage an action of the electronic device. For example, the processing module 2501 is configured to support the electronic device in performing step 411, step 412, step 1110, step 1111, step 1611, step 1612, step 1904, step 1905, step 2010, step 2011, step 2110, step 2111, and the like in the foregoing embodiments. The storage module 2502 is configured to store program code and data of the electronic device. The communications module 2503 is configured to support communication between the electronic device and another network entity, to implement functions such as a call, data exchange, and internet access of the electronic device. For example, the communications module 2503 may be configured to support the electronic device in performing step 401, step 405, step 407, step 413, step 502, step 802, step 1101, step 1103, step 1105, step 1112, step 1601, step 1604, step 1606, step 1613, step 1702, step 1906, step 2001, step 2003, step 2005, step 2012, step 2112, a receive operation, and/or the like in the foregoing embodiments. Further, the electronic device may further include an input module, a display module, and the like. The display module is configured to display content according to an indication of the processing module 2501. The input module may be configured to receive various types of input of the user, such as voice input and gesture input. For example, the input module may be configured to support the electronic device in performing step 406, step 501, step 801, step 1102, step 1605, step 1701, step 2002, and the like in the foregoing method embodiments.

The processing module 2501 may be a processor or a controller. The communications module 2503 may be a transceiver, an RF circuit, a communications interface, or the like. The storage module 2502 may be a memory. The display module may be a screen or a display. The input module may be a touchscreen, a voice input apparatus, a fingerprint sensor, or the like.

When the processing module 2501 is a processor, the storage module 2502 is a memory, and the communications module 2503 is a communications interface, the electronic device provided in this embodiment may be the electronic device shown in FIG. 3. The communications module 2503 may include not only the RF circuit, but also a Wi-Fi module, a Bluetooth module, and an NFC module. The communications modules such as the RF circuit, the NFC module, the Wi-Fi module, and the Bluetooth module may be collectively referred to as a communications interface. The processor, the RF circuit, the touchscreen, and the memory may be coupled together through a bus.

In addition, in the embodiment shown in FIG. 25, functions of the processing module 2501 may be the same as functions of the conversion and playing unit 2406 and the collection and conversion unit 2407 in the embodiment shown in FIG. 24. Functions of the storage module 2502 may be the same as functions of the storage unit in the embodiment shown in FIG. 24. Functions of the communications module 2503 may be the same as functions of the Bluetooth establishment unit 2401, the receiving unit 2402, the Wi-Fi establishment unit 2403, and the sending unit 2405 in the embodiment shown in FIG. 24. Functions of the input module may be the same as functions of the input unit 2404 in the embodiment shown in FIG. 24. Functions of the display module may be the same as functions of the display unit 2408 in the embodiment shown in FIG. 24.

Figure 26:
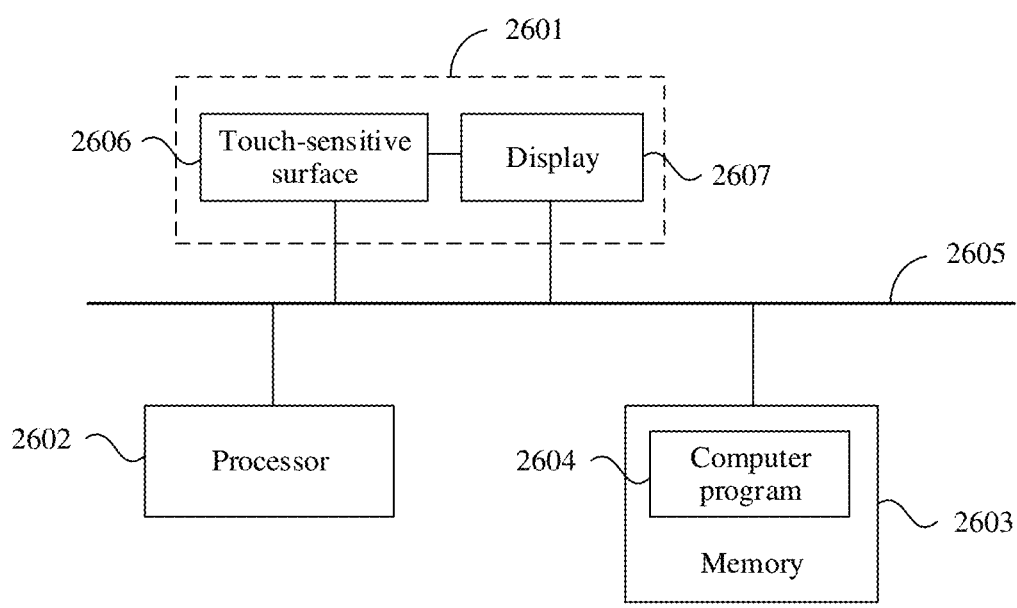
FIG. 26 is a schematic structural diagram of still another electronic device according to another embodiment.

As shown in FIG. 26, the embodiments further provide an electronic device. The electronic device may be the foregoing first electronic device, or may be the foregoing second electronic device. The electronic device may include a touchscreen 2601, one or more processors 2602, a memory 2603, and one or more computer programs 2604. The touchscreen 2601 may include a touch-sensitive surface 2606 and a display 2607. The components may be connected through one or more communications buses 2605. The one or more computer programs 2604 are stored in the memory 2603, and are configured to be executed by the one or more processors 2602. The one or more computer programs 2604 include an instruction. In some embodiments, the instruction may be used to perform steps performed by the first electronic device or the second electronic device in FIG. 4a and FIG. 4b and the corresponding embodiment. In some other embodiments, the instruction may be alternatively used to perform steps performed by the first electronic device or the second electronic device in FIG. 5 and the corresponding embodiment. In some other embodiments, the instruction may be alternatively used to perform steps performed by the first electronic device or the second electronic device in FIG. 6 and the corresponding embodiment. In some other embodiments, the instruction may be alternatively used to perform steps performed by the first electronic device or the second electronic device in FIG. 7 and the corresponding embodiment. In some other embodiments, the instruction may be alternatively used to perform steps performed by the first electronic device or the second electronic device in FIG. 8 and the corresponding embodiment. In some other embodiments, the instruction may be alternatively used to perform steps performed by the first electronic device or the second electronic device in FIG. 11A and FIG. 11B and the corresponding embodiment. In some other embodiments, the instruction may be alternatively used to perform steps performed by the first electronic device or the second electronic device in FIG. 12 and the corresponding embodiment. In some other embodiments, the instruction may be alternatively used to perform steps performed by the first electronic device or the second electronic device in FIG. 14A to FIG. 14C and the corresponding embodiment. In some other embodiments, the instruction may be alternatively used to perform steps performed by the first electronic device or the second electronic device in FIG. 15A to FIG. 15C and the corresponding embodiment. In some other embodiments, the instruction may be alternatively used to perform steps performed by the first electronic device or the second electronic device in FIG. 16A and FIG. 16B and the corresponding embodiment. In some other embodiments, the instruction may be alternatively used to perform steps performed by the first electronic device or the second electronic device in FIG. 17 and the corresponding embodiment. In some other embodiments, the instruction may be alternatively used to perform steps performed by the first electronic device or the second electronic device in FIG. 18 and the corresponding embodiment. In some other embodiments, the instruction may be alternatively used to perform steps performed by the first electronic device or the second electronic device in FIG. 19 and the corresponding embodiment. In some other embodiments, the instruction may be alternatively used to perform steps performed by the first electronic device or the second electronic device in FIG. 20A and FIG. 20B and the corresponding embodiment. In some other embodiments, the instruction may be alternatively used to perform steps performed by the first electronic device or the second electronic device in FIG. 21A and FIG. 21B and the corresponding embodiment. Certainly, the electronic device includes but is not limited to the components listed above. For example, the electronic device may further include a radio frequency circuit, a positioning apparatus, a sensor, and the like. When the electronic device includes another component, the electronic device may be the electronic device shown in FIG. 2 or the electronic device shown in FIG. 3.

The embodiments further provide a computer-readable storage medium. The computer-readable storage medium includes an instruction. When the instruction is run on a first electronic device, the first electronic device is enabled to perform related method steps in any one of FIG. 4a and FIG. 4b to FIG. 8, FIG. 11A and FIG. 11B, FIG. 12, and FIG. 14A to FIG. 14C to FIG. 21A and FIG. 21B, to implement the method in the foregoing embodiments.

The embodiments further provide a computer-readable storage medium. The computer-readable storage medium includes an instruction. When the instruction is run on a second electronic device, the second electronic device is enabled to perform related method steps in any one of FIG. 4a and FIG. 4b to FIG. 8, FIG. 11A and FIG. 11B, FIG. 12, and FIG. 14A to FIG. 14C to FIG. 21A and FIG. 21B, to implement the method in the foregoing embodiments.

The embodiments further provide a computer program product including an instruction. When the computer program product is run on a first electronic device, the first electronic device is enabled to perform related method steps in any one of FIG. 4a and FIG. 4b to FIG. 8, FIG. 11A and FIG. 11B, FIG. 12, and FIG. 14A to FIG. 14C to FIG. 21A and FIG. 21B, to implement the method in the foregoing embodiments.

The embodiments further provide a computer program product including an instruction. When the computer program product is run on a second electronic device, the second electronic device is enabled to perform related method steps in any one of FIG. 4a and FIG. 4b to FIG. 8, FIG. 11A and FIG. 11B, FIG. 12, and FIG. 14A to FIG. 14C to FIG. 21A and FIG. 21B, to implement the method in the foregoing embodiments.

The embodiments further provide a control device. The control device includes a processor and a memory. The memory is configured to store computer program code. The computer program code includes a computer instruction. When the processor executes the computer instruction, the control device performs related method steps in any one of FIG. 4a and FIG. 4b to FIG. 8, FIG. 11A and FIG. 11B, FIG. 12, and FIG. 14A to FIG. 14C to FIG. 21A and FIG. 21B, to implement the method in the foregoing embodiments. The control device may be an integrated circuit IC, or may be a system on chip SOC. The integrated circuit may be a universal integrated circuit, or may be a field programmable gate array FPGA, or may be an application-specific integrated circuit ASIC.

The embodiments further provide a voice call apparatus, and the apparatus has a function of implementing behavior of the first electronic device or the second electronic device in the foregoing method embodiments. The function may be implemented by hardware, or may be implemented by hardware executing corresponding software. The hardware or software includes one or more modules corresponding to the foregoing function.

The electronic device, the computer storage medium, the computer program product, the control device, and the voice call apparatus provided in the embodiments are all configured to perform corresponding methods provided above. Therefore, for beneficial effects that can be achieved by the electronic device, the computer storage medium, the computer program product, the control device, and the voice call apparatus, refer to the beneficial effects of the corresponding methods provided above. Details are not described herein again.

The foregoing descriptions about implementations allow a person skilled in the art to clearly understand that, for the purpose of convenient and brief description, only division into the foregoing function modules is taken as an example for illustration. In actual application, the foregoing functions can be allocated to different function modules for implementation based on a requirement. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in the embodiments, it should be understood that the disclosed system, apparatus, and method may be implemented in other manners. For example, the described apparatus embodiments are merely examples. For example, the division into the modules or units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of the embodiments essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A call answer method comprising:
    establishing, by a first electronic device, a Bluetooth link to a second electronic device according to a Bluetooth protocol;
    receiving, by the first electronic device, call request information sent by a third electronic device;
    sending, by the first electronic device, the call request information to the second electronic device through the Bluetooth link;
    establishing, by the first electronic device, a Wi-Fi link to the second electronic device according to a Wi-Fi protocol;
    sending, by the first electronic device in response to the first electronic device receiving an answer command sent by the second electronic device through the Bluetooth link, the answer command to the third electronic device;
    establishing, by the first electronic device, a call with the third electronic device;
    performing at least one of:
        receiving, by the first electronic device, a downlink audio signal sent by the third electronic device, and sending the downlink audio signal to the second electronic device through the Wi-Fi link; or
        receiving, by the first electronic device, an uplink audio signal sent by the second electronic device through the Wi-Fi link, and sending the uplink audio signal to the third electronic device;
    receiving, by the first electronic device, a sound channel switching command sent by the second electronic device through the Bluetooth link; and
    converting, by the first electronic device, in response to the sound channel switching command, and further in response to the first electronic device receiving a downlink audio signal sent by the third electronic device, the downlink audio signal into a sound signal, and playing the sound signal.

2. The method according to claim 1, wherein the Bluetooth link is established before the first electronic device receives the call request information.

3. The method according to claim 1, further comprising:
    sending, by the first electronic device, in response to the first electronic device receiving an incoming call answer operation of a user, an answer command to the third electronic device;
    establishing, by the first electronic device, a call with the third electronic device; and
    sending, by the first electronic device, the answer command to the second electronic device through the Bluetooth link.

4. The method according to claim 3, further comprising:
    receiving, by the first electronic device, a device switching operation of the user; and
    sending, by the first electronic device, in response to the device switching operation, a downlink audio signal to the second electronic device through the Wi-Fi link, wherein the downlink audio signal is sent by the third electronic device.

5. The method according to claim 4, further comprising:
    displaying, by the first electronic device, a first interface in response to the incoming call answer operation, wherein the first interface comprises a device switching button; and
    wherein the receiving the device switching operation of the user comprises:
        receiving, by the first electronic device, a trigger operation performed by the user on the device switching button.

6. The method according to claim 1, further comprising:
    sending, by the first electronic device, in response to the first electronic device receiving a reject command sent by the second electronic device through the Bluetooth link, the reject command to the third electronic device.

7. The method according to claim 1, further comprising:
    sending, by the first electronic device, in response to the first electronic device receiving an incoming call reject operation of a user, a reject command to the third electronic device in response to the incoming call reject operation; and
    sending, by the first electronic device, the reject command to the second electronic device through the Bluetooth link.

8. A call answer system, comprising:
    a first electronic device;

a second electronic device; and a third electronic device;

wherein the first electronic device establishes a Bluetooth link to the second electronic device according to a Bluetooth protocol;

wherein the first electronic device receives call request information sent by the third electronic device;

wherein the first electronic device sends the call request information to the second electronic device through the Bluetooth link;

wherein the first electronic device establishes a Wi-Fi link to the second electronic device according to a Wi-Fi protocol;

wherein the second electronic device sends an answer command to the first electronic device through the Bluetooth link in response to the second electronic device receiving an incoming call answer operation of a user;

wherein the first electronic device sends the answer command to the third electronic device;

wherein the first electronic device establishes a call with the third electronic device; and wherein the first electronic device receives a downlink audio signal sent by the third electronic device and sends the downlink audio signal to the second electronic device through the Wi-Fi link, and wherein the second electronic device converts the downlink audio signal into a sound signal and plays the sound signal;

wherein the second electronic device receives a device switching operation of the user;

wherein the second electronic device sends a sound channel switching command to the first electronic device through the Bluetooth link in response to the device switching operation; and wherein the first electronic device converts the downlink audio signal into a sound signal and plays the sound signal in response to the sound channel switching command, and further in response to the first electronic device receiving a downlink audio signal sent by the third electronic device.

9. The system according to claim 8, wherein the first electronic device further performs, in response to the sound channel switching command:

collecting a sound signal from the user;

converting the sound signal into an uplink audio signal; and sending the uplink audio signal to the third electronic device.

10. The system according to claim 8, wherein the first electronic device further performs:

receive an uplink audio signal sent by the second electronic device through the Wi-Fi link; and send the uplink audio signal to the third electronic device.

11. The system according to claim 10, wherein the second electronic device collects a sound signal from the user and converts the sound signal into the uplink audio signal.

12. The system according to claim 8, wherein the Bluetooth link is established before the first electronic device receives the call request information.

13. The system according to claim 8, wherein the first electronic device further:

displays a first interface in response to an incoming call answer operation, wherein the first interface comprises a device switching button; and receives a trigger operation performed by a user on the device switching button.

14. A first electronic device, comprising:

a touchscreen;

one or more processors coupled to the touchscreen; and a non-transitory computer readable memory coupled to the one or more processors and storing instructions which, when executed by the one or more processors, cause the first electronic device to:

establish a Bluetooth link to a second electronic device according to a Bluetooth protocol;

receive call request information sent by a third electronic device;

send the call request information to the second electronic device through the Bluetooth link;

establish a Wi-Fi link to the second electronic device according to a Wi-Fi protocol;

send, in response to the first electronic device receiving an answer command sent by the second electronic device through the Bluetooth link, the answer command to the third electronic device;

establish a call with the third electronic device;

receive a downlink audio signal sent by the third electronic device;

send the downlink audio signal to the second electronic device through the Wi-Fi link;

receive a sound channel switching command sent by the second electronic device through the Bluetooth link;

convert the downlink audio signal into a sound signal in response to the sound channel switching command when the first electronic device receives a downlink audio signal sent by the third electronic device; and play the sound signal.

15. The first electronic device according to claim 14, wherein the instructions further cause the first electronic device to:

receive a device switching operation of a user;

send the downlink audio signal to the second electronic device through the Wi-Fi link in response to the device switching operation, and further in response to the first electronic device receiving a downlink audio signal sent by the third electronic device.

16. The first electronic device according to claim 14, wherein the instructions further cause the first electronic device to:

receive a device switching operation of a user;

receive an uplink audio signal sent by the second electronic device through the Wi-Fi link in response to the device switching operation; and send the uplink audio signal to the third electronic device.

17. The first electronic device according to claim 14, wherein the instructions further cause the first electronic device to:

display a first interface in response to an incoming call answer operation, wherein the first interface comprises a device switching button; and receive a trigger operation performed by a user on the device switching button.

18. The first electronic device according to claim 14, wherein the Bluetooth link is established before the first electronic device receives the call request information.

\* \* \* \* \*